United States Patent
Yu et al.

(10) Patent No.: US 9,941,974 B2
(45) Date of Patent: Apr. 10, 2018

(54) TECHNIQUES FOR RECEIVING DFT SPREADING MODULATION SIGNALS

(71) Applicant: ZTE Corporation, Shenzhen (CN)

(72) Inventors: Jianjun Yu, Basking Ridge, NJ (US); Yuanquan Wang, Morristown, NJ (US); Xin Xiao, Morristown, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/387,404

(22) Filed: Dec. 21, 2016

(65) Prior Publication Data

US 2017/0180055 A1 Jun. 22, 2017

Related U.S. Application Data

(60) Provisional application No. 62/270,488, filed on Dec. 21, 2015.

(51) Int. Cl.
| | |
|---|---|
| *H04B 10/00* | (2013.01) |
| *H04B 10/61* | (2013.01) |
| *H04J 14/06* | (2006.01) |
| *H04J 14/00* | (2006.01) |

(52) U.S. Cl.
CPC ......... *H04B 10/612* (2013.01); *H04B 10/613* (2013.01); *H04B 10/6163* (2013.01); *H04B 10/6166* (2013.01); *H04J 14/06* (2013.01)

(58) Field of Classification Search
CPC .... H04B 10/61; H04B 10/612; H04B 10/613; H04B 10/614; H04B 10/616; H04B 10/6161; H04B 10/6162; H04B 10/6163; H04B 10/6166
See application file for complete search history.

(56) References Cited

U.S. PATENT DOCUMENTS

2013/0195459 A1* 8/2013 Shieh ............... H04L 27/2614
398/79
2013/0272719 A1 10/2013 Yan et al.

OTHER PUBLICATIONS

Li, F., et al., "Performance Comparison of DFT-Spread and Pre-Equalization for 8×244.2-Gb/s PDM-16QAM-OFDM," Journal of Lightwave Technology, 33(1):227-233, Jan. 2015.
(Continued)

*Primary Examiner* — Daniel Dobson
(74) *Attorney, Agent, or Firm* — Perkins Coie LLP

(57) ABSTRACT

Techniques for receiving a modulated optical signal which has undergone a digital Fourier transform spreading (DFTS), include generating digital samples of the modulated optical signal, performing resampling and synchronization of the digital samples to generate time-corrected digital samples from an input wireless signal, compensating the time-corrected digital samples for nonlinearity (NL) to produce NL-compensated digital samples, de-spreading the NL-compensated digital samples using an inverse digital Fourier transform to recover quadrature amplitude modulation (QAM) modulated signals, applying post-equalization to the QAM signals to generate equalized QAM signals, performing a decision directed least mean square (DD-LMS) equalization to generate blind-optimized QAM signals and demodulating the blind-optimized QAM signals to recover data bits.

34 Claims, 62 Drawing Sheets

(56) References Cited

OTHER PUBLICATIONS

Wang, Y., et al., "Demonstration of 575-Mb/s downlink and 225-Mb/s uplink bi-directional SCM-WDM visible light communication using RGB LED and phosphor-based LED," Optics Express, 21(1):1203-1208, Jan. 2013.
Wang, Y., et al., "Enhanced performance of visible light communication employing 512-QAM N-SC-FDE and DD-LMS," Optics Express, 22(13):15328-15334, Jun. 2014.
Zhang, J., et al., "Time-domain digital pre-equalization for band-limited signals based on receiver-side adaptive equalizers," Optics Express, 22(17):20515-20529, Aug. 2014.

* cited by examiner

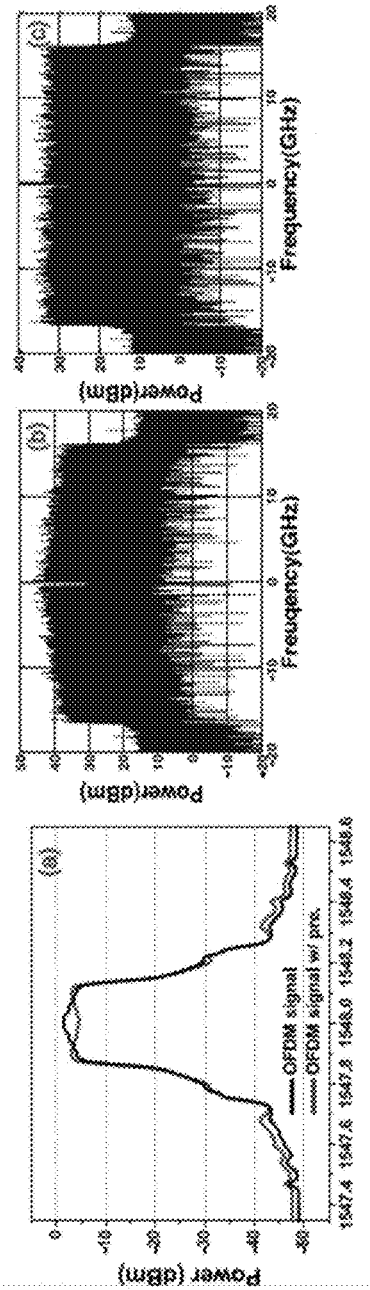
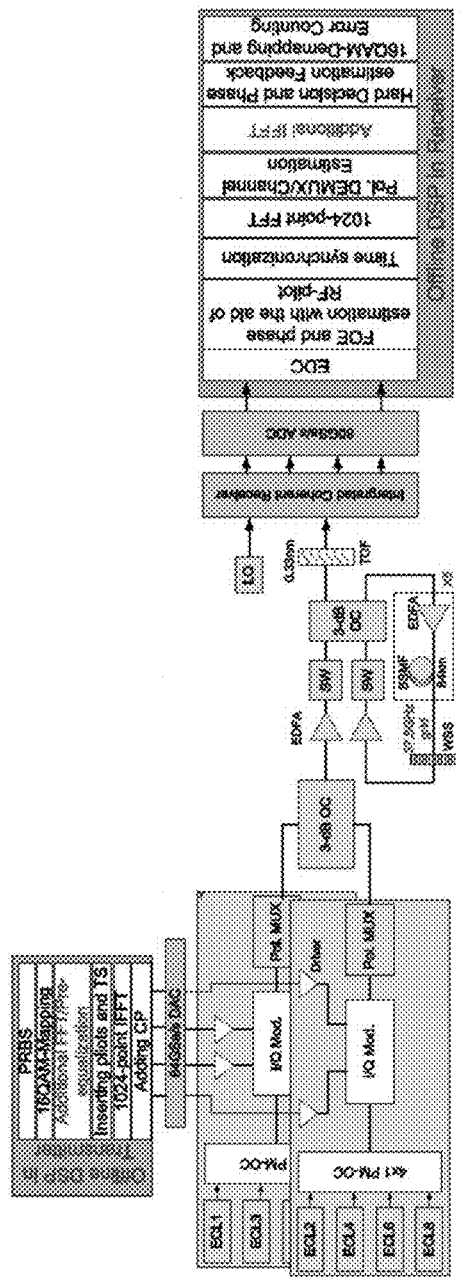
FIG. 21A  FIG. 21B  FIG. 21C  FIG. 21D

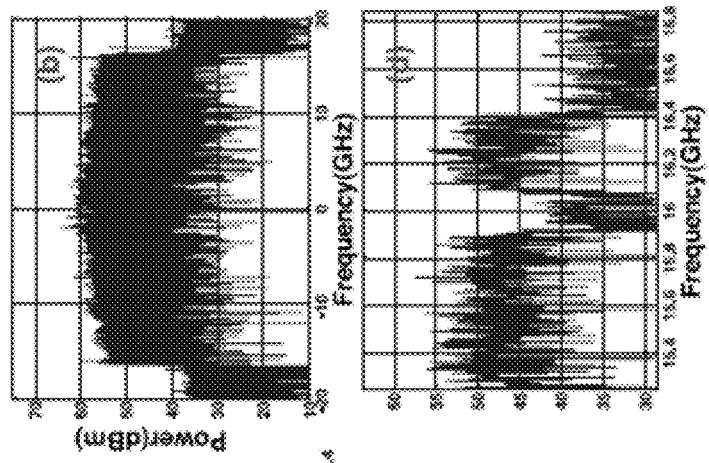
FIG. 23A   FIG. 23B
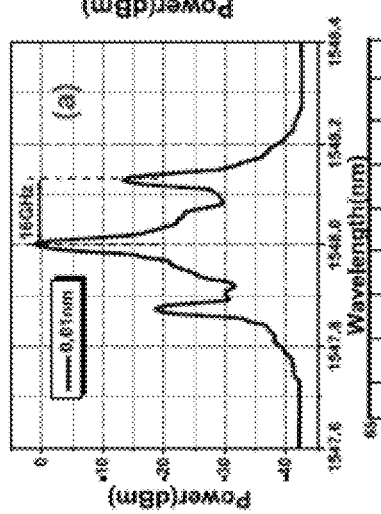 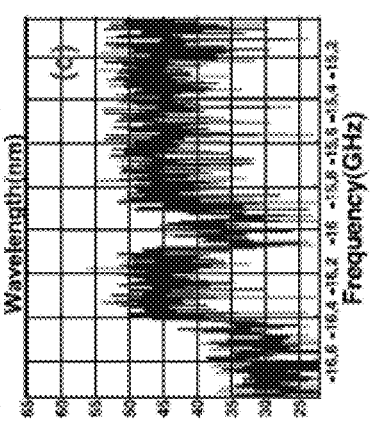
FIG. 23C   FIG. 23D

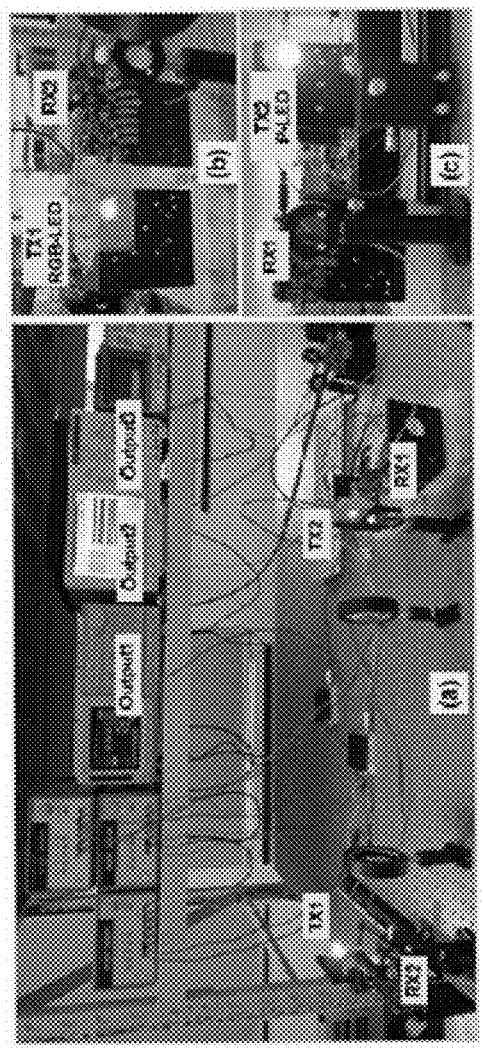

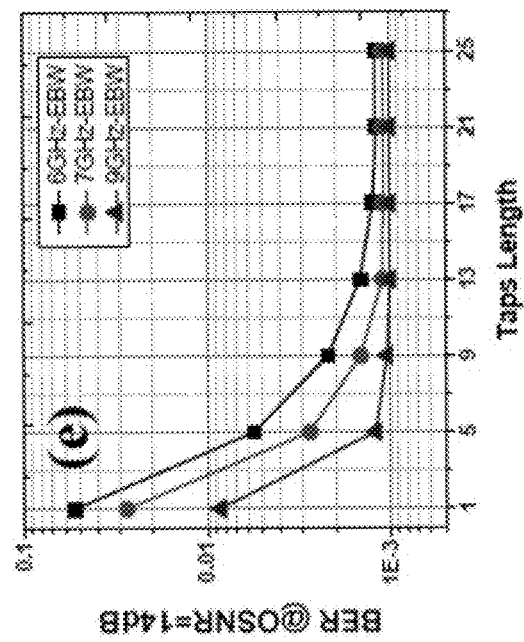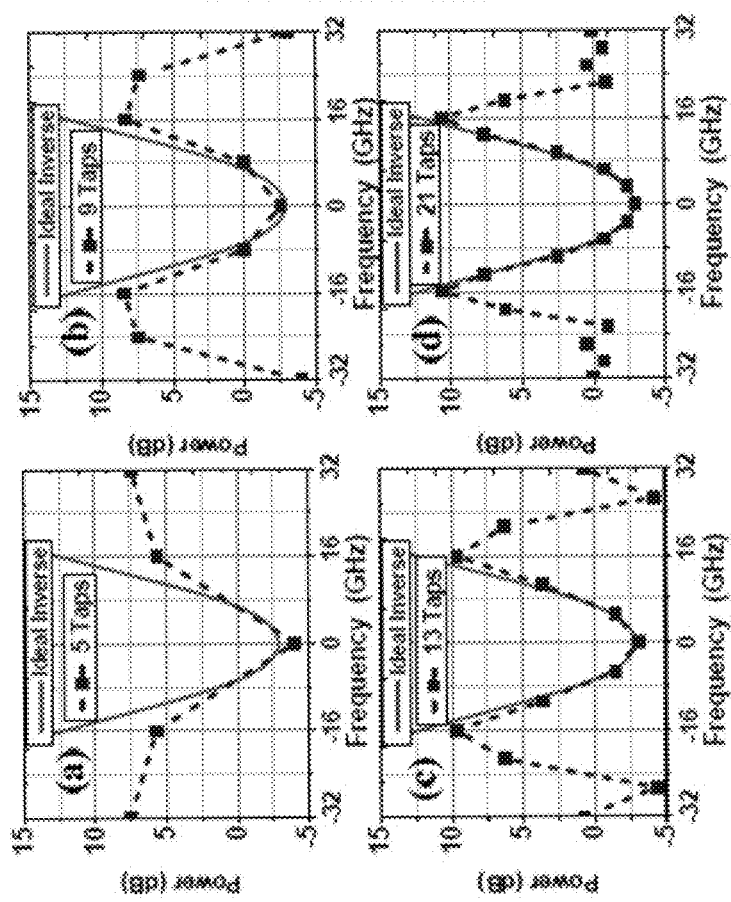
FIG. 46A  FIG. 46B
FIG. 46C  FIG. 46D
FIG. 46E

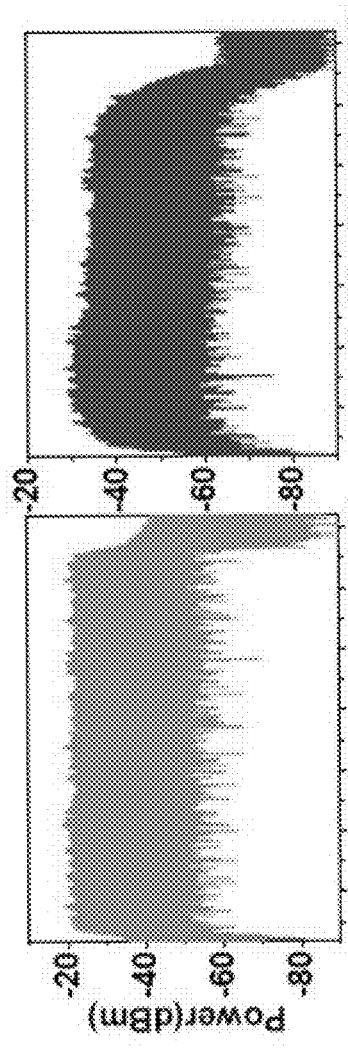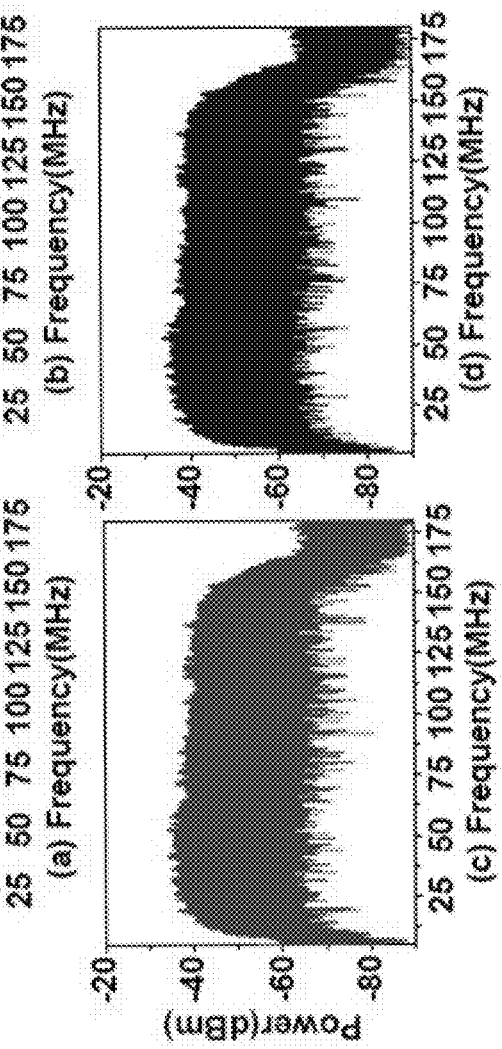
FIG. 58A  FIG. 58B  FIG. 58C  FIG. 58D

US 9,941,974 B2

TECHNIQUES FOR RECEIVING DFT SPREADING MODULATION SIGNALS

CROSS REFERENCE TO RELATED APPLICATIONS

This patent document claims the benefit of priority of U.S. Provisional Patent Application No. 62/270,488, filed on Dec. 21, 2015. The entire content of the before-mentioned patent application is incorporated by reference as part of the disclosure of this document.

BACKGROUND

This patent document relates to digital communication, and, in one aspect, optical communication systems.

There is an ever-growing demand for data communication in application areas such as wireless communication, fiber optic communication and so on. The demand on core networks is especially higher because not only are user devices such as smartphones and computers using more and more bandwidth due to multimedia applications, but also the total number of devices for which data is carried over core networks is increasing. For profitability and to meet increasing demand, equipment manufacturers and network operators are continually looking for ways in which transmission bandwidth can be increased while operational and capital expenditure can be reduced.

SUMMARY

The present document discloses techniques for improving the performance of a digital transmission network that uses DFT spreading modulation signals is improved by using described pre-equalization technique at the receiver and a post-equalization technique at the receiver.

In one example aspect, a method of optical communication, implemented at a receiver in an optical communication network for receiving a modulated optical signal that has undergone a digital Fourier transform spreading (DFTS), includes generating digital samples of the modulated optical signal, performing resampling and synchronization of the digital samples to generate time-corrected digital samples from an input signal, compensating the time-corrected digital samples for nonlinearity (NL) to produce NL-compensated digital samples, de-spreading the NL-compensated digital samples using an inverse digital Fourier transform to recover quadrature amplitude modulation (QAM) modulated signals, applying post-equalization to the QAM signals to generate equalized QAM signals, performing a decision directed least mean square (DD-LMS) equalization to generate blind-optimized QAM signals and demodulating the blind-optimized QAM signals to recover data bits.

In yet another aspect, an optical receiver apparatus for receiving a modulated optical signal that has undergone DFTS spreading is disclosed. The apparatus includes a photodiode capable of receiving the modulated optical signal and producing an electrical signal, an analog to digital conversion circuit that is capable of generating digital samples of the modulated optical signal, a memory that is capable of storing instructions, and a digital signal processor that is capable of reading the instructions from the memory and processing the digital samples to generate estimates of transmitted bits. The instructions include instructions for performing resampling and synchronization of the digital samples to generate time-corrected digital samples from an input signal, instructions for compensating the time-corrected digital samples for nonlinearity (NL) to produce NL-compensated digital samples, instructions for de-spreading the NL-compensated digital samples using an inverse digital Fourier transform to recover quadrature amplitude modulation (QAM) modulated signals, instructions for applying post-equalization to the QAM signals to generate equalized QAM signals, instructions for performing a decision directed least mean square (DD-LMS) equalization to generate blind-optimized QAM signals, and instructions for demodulating the blind-optimized QAM signals to recover transmitted data bits.

These and other aspects, and their implementations and variations are set forth in the drawings, the description and the claims.

BRIEF DESCRIPTION OF THE DRAWINGS

FIGS. 21A to 21D shows the experimental setup of the eight channels PDM-16QAM-OFDM generation with high-speed DAC, transmission and coherent detection on a 37.5-GHz WDM grid.

FIG. 23A is an optical spectrum of signal after I/Q modulator when the outputs of DAC are all set to 0.

FIG. 23B is a 32-GHz 16QAM-OFDM signal without frequency offset with null subcarriers at ±16 GHz.

FIG. 23C is the narrow band interference at −16 GHz.

FIG. 23D is the narrow band interference at +16 GHz.

FIG. 33A shows an experiment setup for the VLC system.

FIG. 33B shows a downlink transceiver.

FIG. 33C shows an uplink transceiver.

FIG. 46A shows the frequency response of DD-LMS taps compared with the ideal channel inverse for 5 taps.

FIG. 46B shows the frequency response of DD-LMS taps compared with the ideal channel inverse for 9 taps.

FIG. 46C shows the frequency response of DD-LMS taps compared with the ideal channel inverse for 13 taps.

FIG. 46D shows the frequency response of DD-LMS taps compared with the ideal channel inverse for 21 taps.

FIG. 46E shows the BER at OSNR of 14 dB for DPEQ based on different adaptive filter tap length under 6, 7 and 9-GHz channel filtering.

FIG. 58A shows the measured electric spectra of the original SC-FDE signal.

FIG. 58B shows the measured electric spectra after red color LED transmission.

FIG. 58C shows the measured electric spectra after green color LED transmission.

FIG. 58D shows the measured electric spectra after blue color LED transmission.

DETAILED DESCRIPTION

To meet the increasing demand on high data communication bandwidth, developers are continuously looking for new ways by which to carry a greater number of data bits over existing communication infrastructure. In optical communication, data is transmitted over optical carriers, e.g., glass or plastic optical fibers by modulating using a variety of different techniques. Some techniques implement data modulation in the electrical domain, e.g., by processing electronic signals. Alternatively or in addition, data modulation can also be achieved in the optical domain, e.g., using photonic signal processing.

Figure 19:
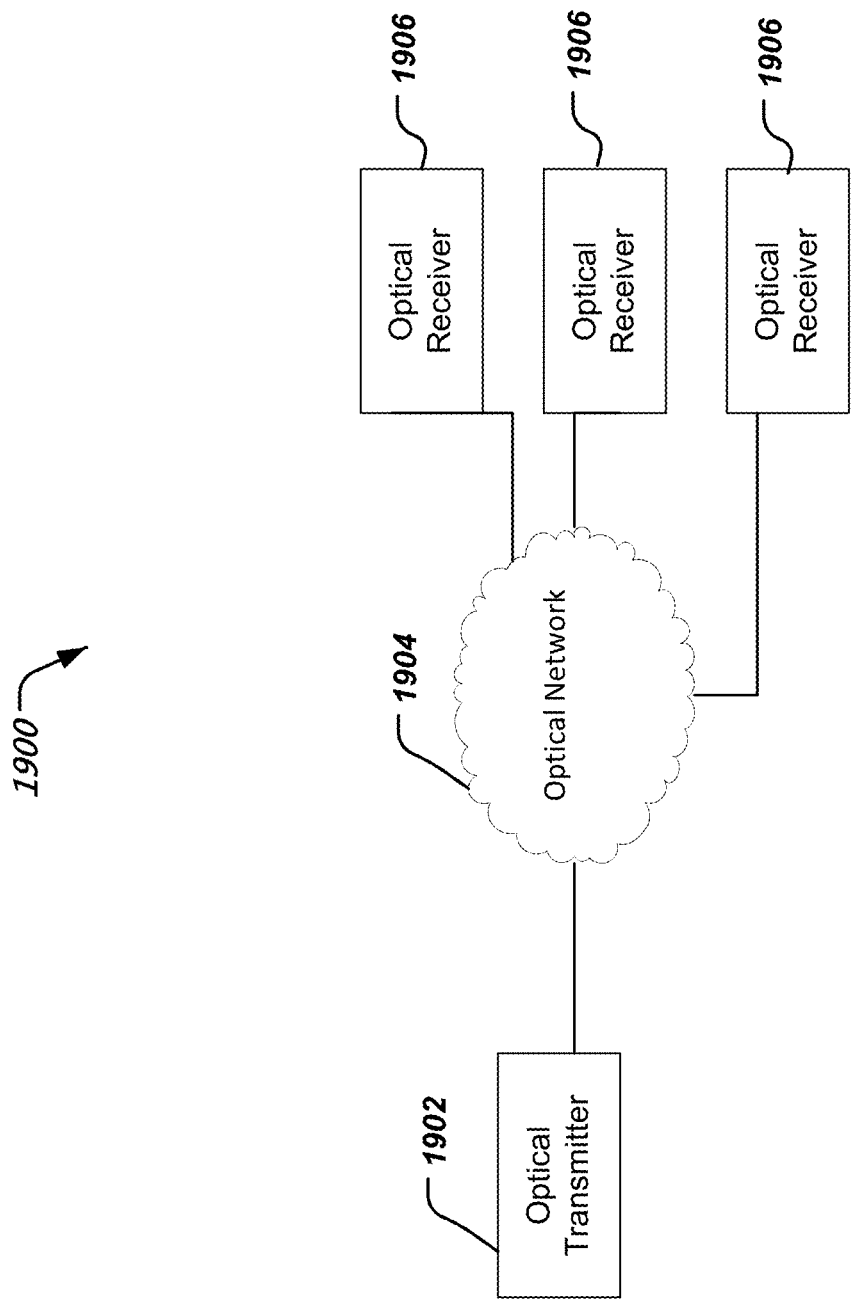
FIG. 19 is a flowchart representation of an example optical communication network.

FIG. 19 depicts an optical communication system 1900 in which the presently disclosed technology can be embodied. One or more optical transmitters 1902 are communicatively coupled via an optical network 1904 with one or more optical receivers 1906. The optical network 1904 may comprise optical fibers that extend in length from several hundred feet (e.g., last mile drop) to several thousands of kilometers (long haul networks). The transmitted optical signals may go through intermediate optical equipment such as amplifiers, repeaters, switch, etc., which are not shown in FIG. 19 for clarity. Various techniques disclosed in this document can be implemented by apparatus 1902, 1906 in the transmission network 1900.

Figure 1:
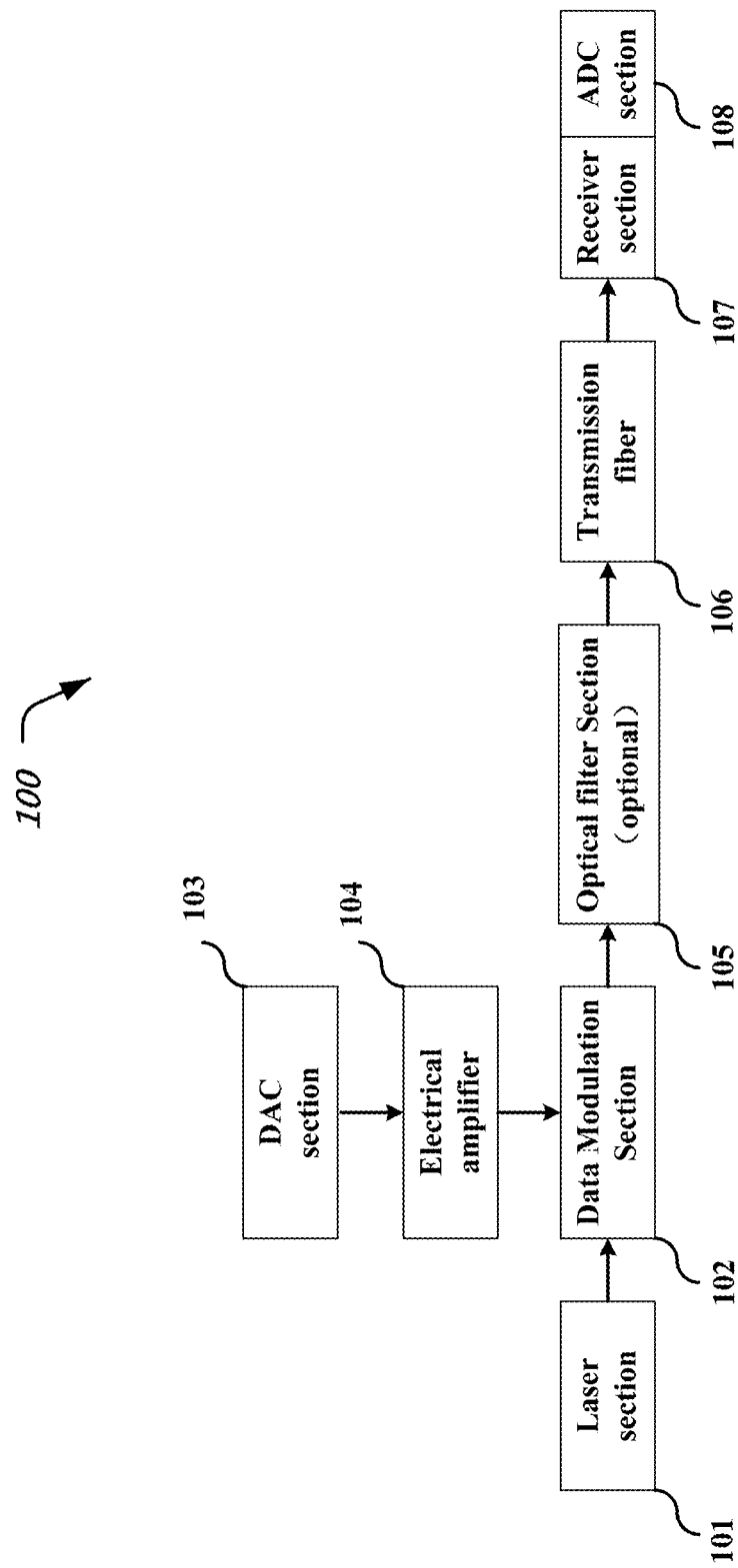
FIG. 1 shows an example block diagram of a portion of an optical communication system.

FIG. 1 shows an example block diagram of a portion of an optical communication system 100. At the transmitter-side, a Digital to Analog (DAC) section 103 receives digital data for transmission over an optical transmission fiber (106) and converts the digital signal into an electrical signal. The electrical signal may be amplified and conditioned (e.g., lowpass filtered) through an electrical amplifier 104 and the output may be used to modulate a light source output from the laser section 101. The modulation may be performed in the data modulation section 102. An input of an optional optical filter may be coupled to the output of the data modulation section. The output of the optical filter section may be coupled to the input of a transmission fiber 106. At the receiver-side, an input interface of the receiver section 107 is coupled to the transmission fiber 106 and receives transmitted optical signal. The output of the receiver section 107 is coupled to the input of the analog to digital conversion (ADC) section 108, whose output interface provides data output at the receiver.

Figure 2:
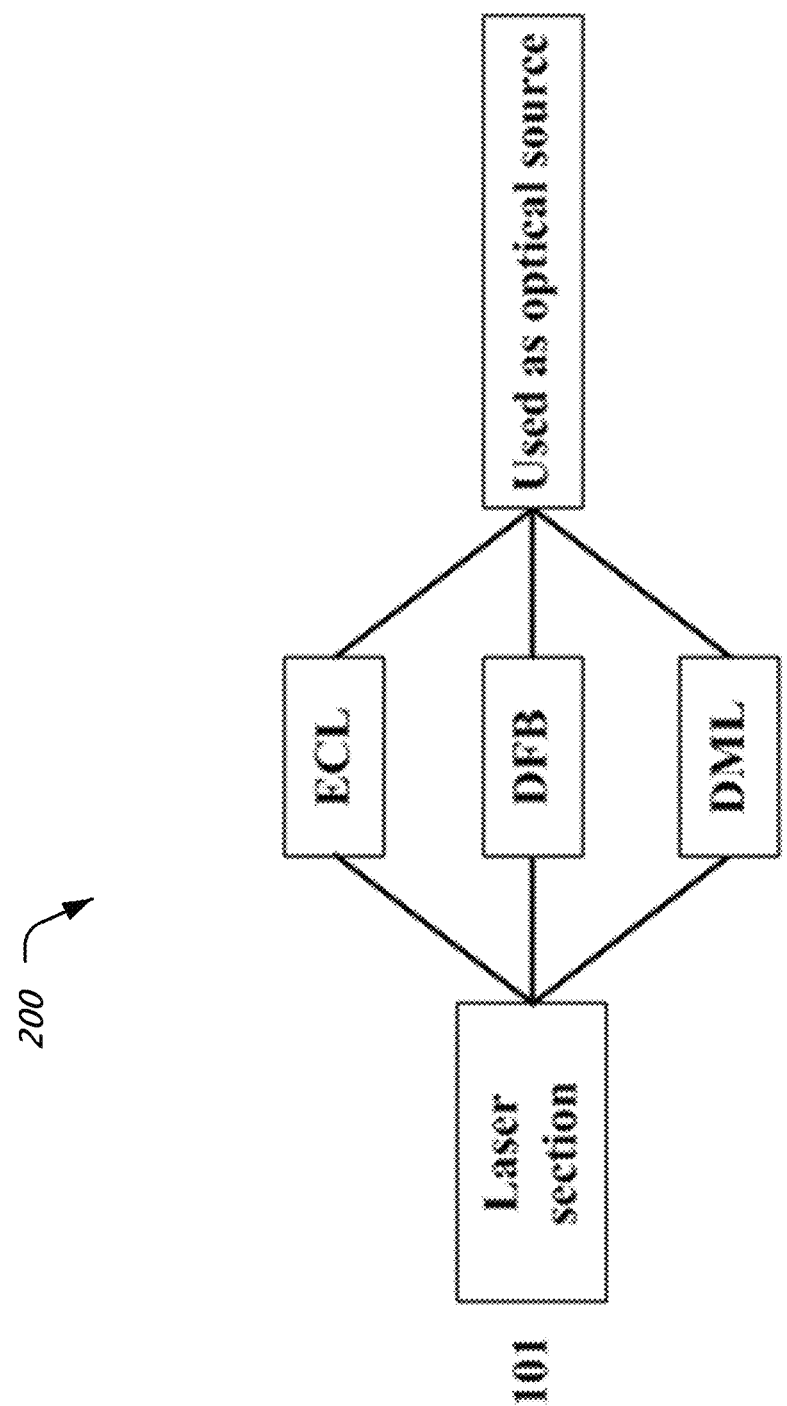
FIG. 2 shows an example block diagram of a laser source for an optical communication transmitter.

FIG. 2 shows an example block diagram 200 of possible options for a laser source 101 for an optical communication transmitter. In some embodiments, the laser source 101 may use an external cavity laser (ECL). In some embodiments, the laser source 101 may use a distributed feedback laser (DFB). In some embodiments, the laser source 101 may be a direct modulated laser (DML).

Figure 3:
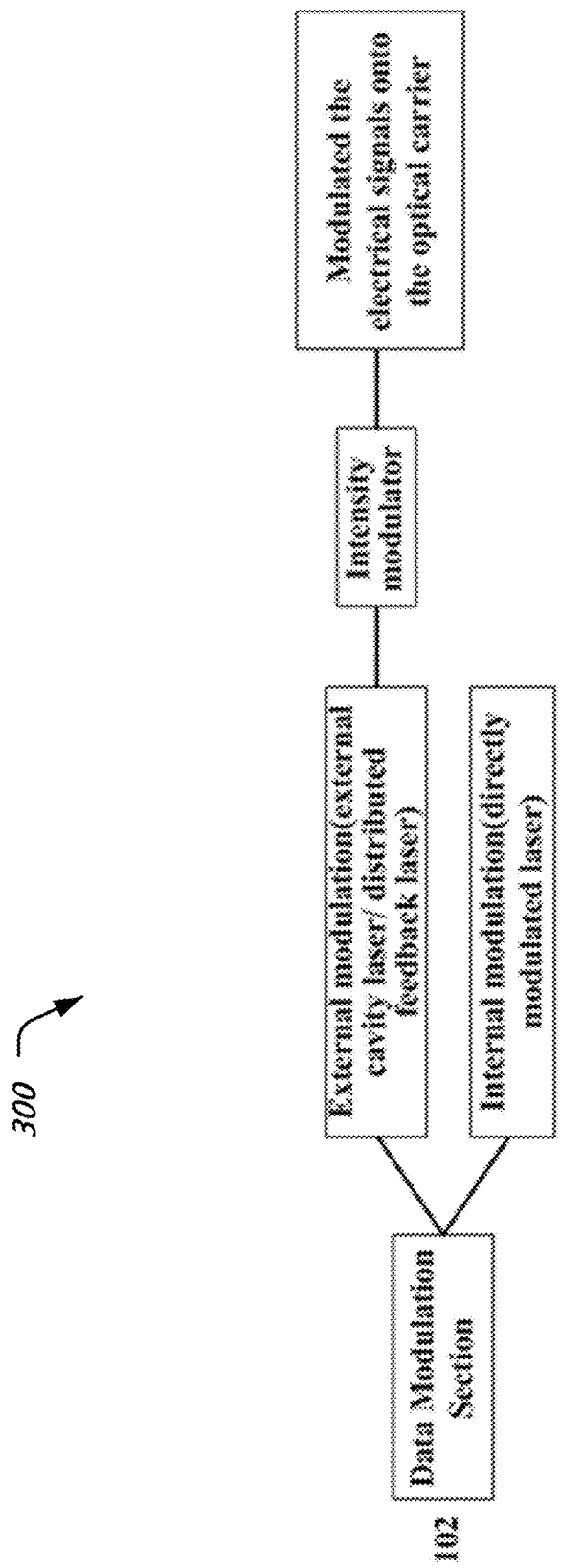
FIG. 3 shows an example block diagram of a data modulation section for an optical communication transmitter.

FIG. 3 shows an example block diagram 300 of possible options for a data modulation section 102 for an optical communication transmitter. In some embodiments data modulation may be achieved by using an internal modulation technique such as DML. In some embodiments, an external modulation technique may include using, for example, an external cavity laser (ECL) or a distributed feedback laser (DFB). In some embodiments, an external modulation technique may include using an intensity modulator to provide a modulated electrical signal onto an optical signal may be used.

Figure 4:
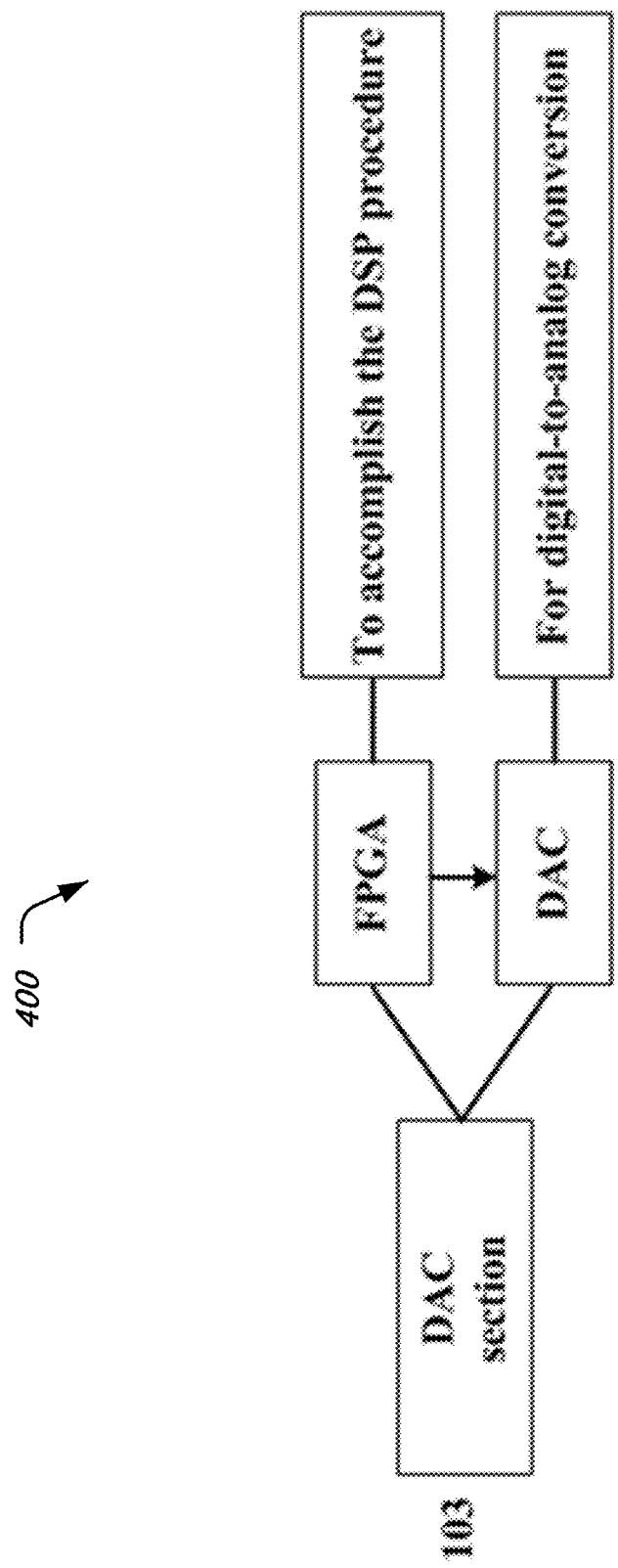
FIG. 4 shows an example block diagram of a digital to analog conversion portion in an optical communication transmitter.

FIG. 4 shows an example block diagram 400 of possible options for a digital to analog conversion portion 103 in an optical communication transmitter. It may include a field programmable gate array (FPGA) or another electronic circuit to accomplish tasks such as pre-filtering for reducing noise, post-filtering for filtering alias images, and so on. The DAC may include circuitry for converting digital data, which is to be transmitted, into an analog signal that is to be used to modulate the laser source signal.

Figure 5:
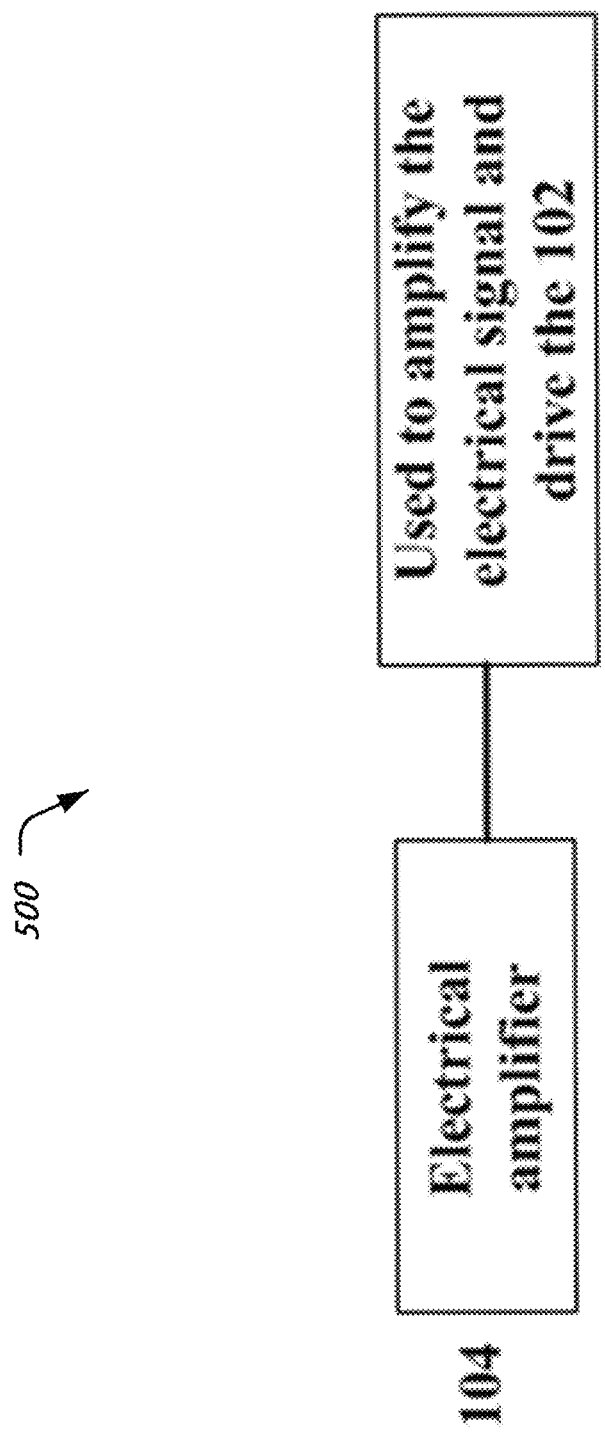
FIG. 5 shows an example block diagram of an electrical amplifier in an optical communication transmitter.

FIG. 5 shows an example block diagram 500 of possible options for an electrical amplifier 104 that is optionally used to amplify electrical signals. Many different amplifier design techniques, e.g., a current amplifier, a voltage amplifier, etc., are known in the art, and can be used by various embodiments.

Figure 6:
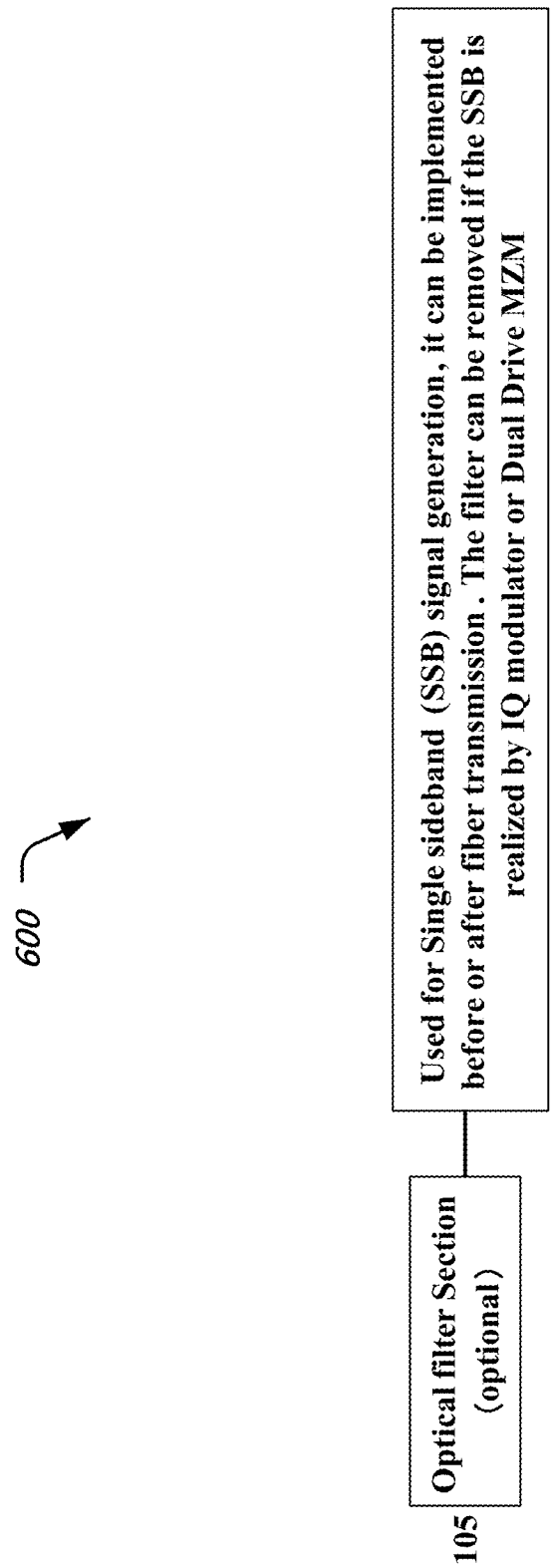
FIG. 6 shows an example block diagram of a data modulation section for an optical communication transmitter.

FIG. 6 shows an example block diagram 600 of possible options for a data modulation section (not shown) and an optional filter section 105 for an optical communication transmitter. Data modulation may be performed using a single sideband modulation technique (SSB). The SSB spectrum of signal that is used by a receiver for demodulating data bits could be generated at the transmitter prior to transmission over the fiber. The SSB technique may, e.g., provide a spectral efficiency by a factor of two. Alternatively, this may be accomplished through filtering at the output of the fiber, in the receiver section at the receiver. If SSB modulation is achieved by IQ modulation or using a dual drive Mach Zehnder modulator, then the SSB spectral image is already suppressed and thus an explicit optical filter may not be needed.

Figure 7:
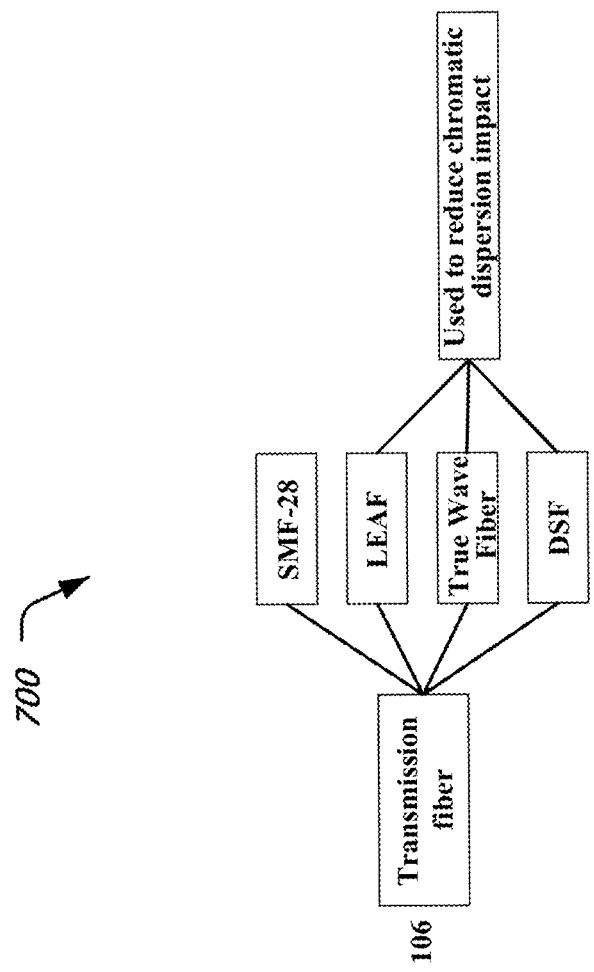
FIG. 7 shows an example block diagram of an optical transmission network.

FIG. 7 shows an example block diagram 700 of possible transmission fiber options. These fiber selections are exemplary and are not meant to be comprehensive or exhaustive. Example fiber material and technology includes single mode optical fiber (SMF-28), LEAF fiber by Corning, TrueWave fiber, dispersion shifted fiber (DSF), and so on, which may be selected to reduce chromatic mode dispersion occurring during signal transmission.

Figure 8:
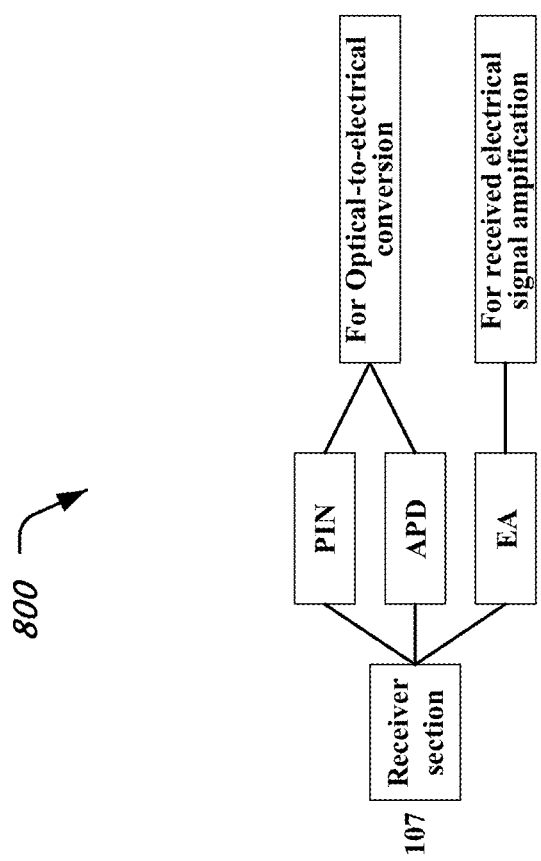
FIG. 8 shows an example block diagram of a portion of an optical communication receiver.

FIG. 8 shows an example block diagram 800 of possible options for a portion of an optical communication receiver 107. The receiver may use a PIN diode or an avalanche photodiode (APD) to convert optical signals into electrical signals. The receiver may also include an electrical amplifier to amplify the electrical signals.

Figure 9:
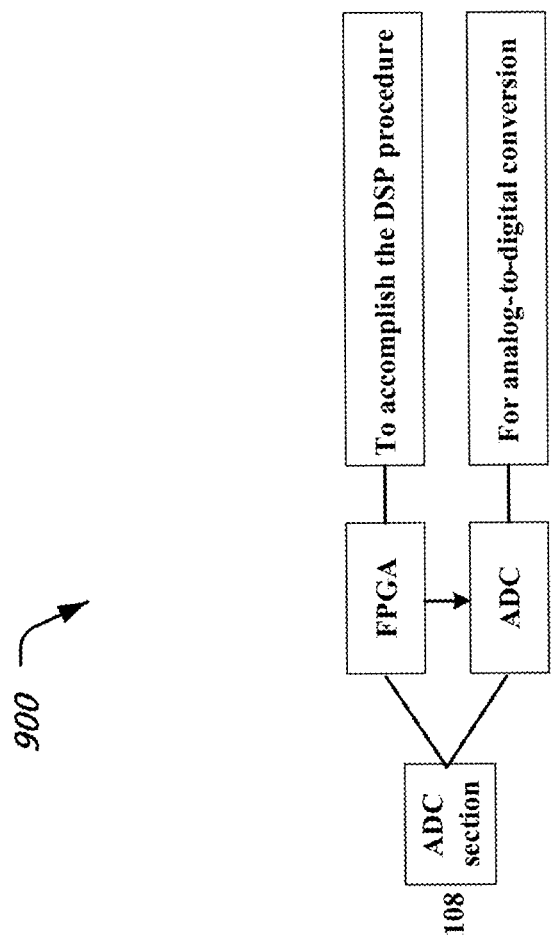
FIG. 9 shows an example block diagram of an analog to digital conversion section in an optical communication receiver.

FIG. 9 shows an example block diagram 900 of possible options for an analog to digital conversion section 108 in an optical communication receiver. The ADC functions may be implemented using a FPGA or a DSP to accomplish certain signal processing tasks described herein, and an ADC implemented using, e.g., semiconductor circuits, to convert signal into digital domain.

Figure 10:
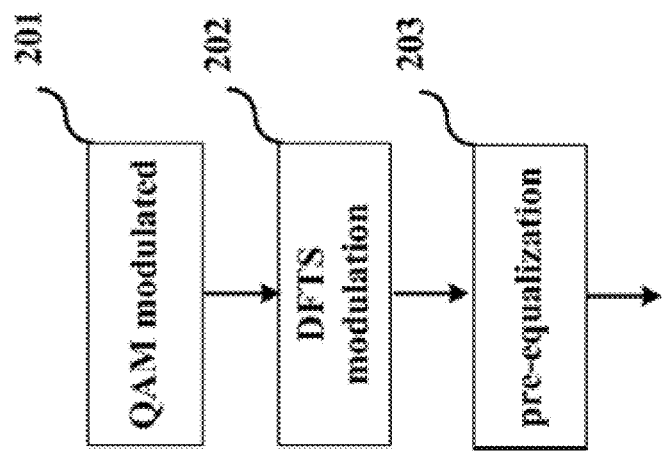
FIG. 10 shows a flowchart for an example of processing performed in an optical transmitter.

FIG. 10 shows a flowchart for an example of processing performed in an optical transmitter. The input digital signal data may be processed through a quadrature amplitude modulation (QAM) module 201 that produces output to the input of a DFTS modulation module 202. The output of the modulation may be pre-equalized in module 203 for transmission to a receiver.

Figure 11:
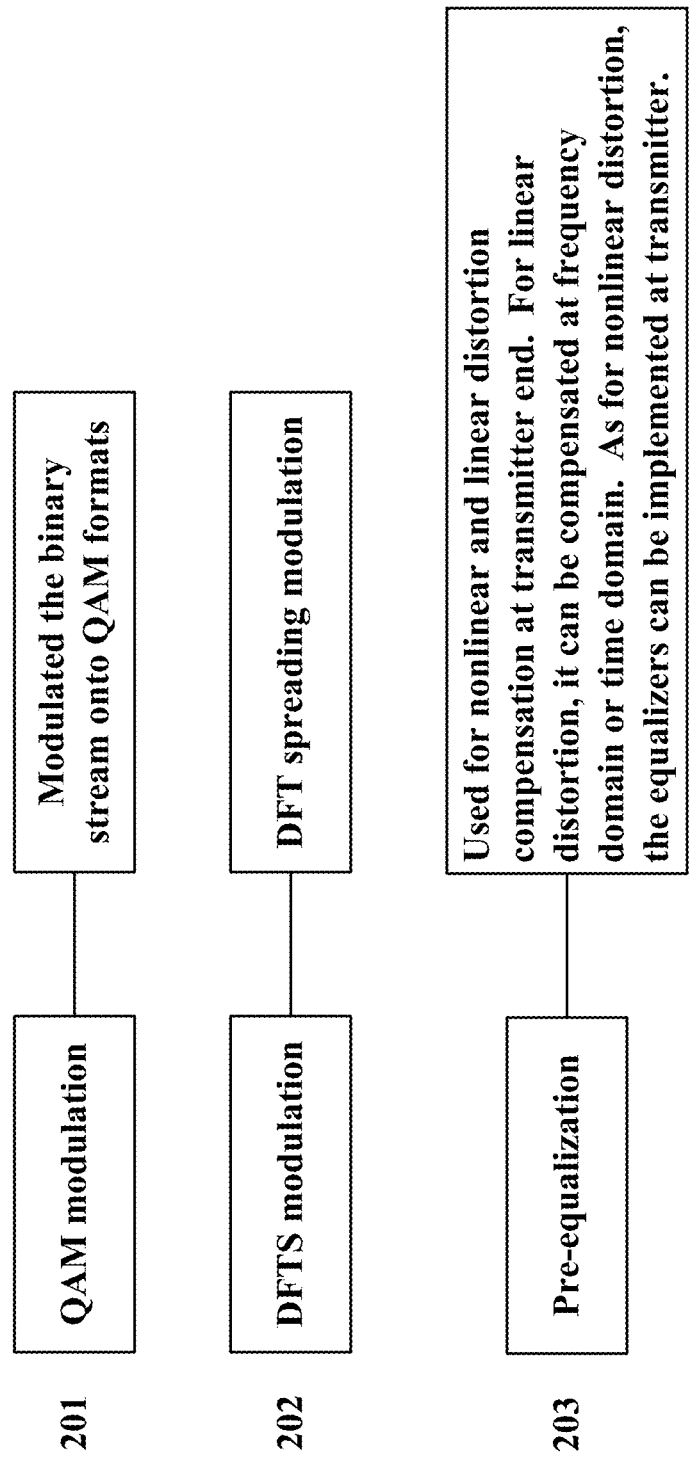
FIG. 11 shows examples of various digital processing tasks performed in an optical transmitter.

FIG. 11 shows examples of various digital processing tasks performed in an optical transmitter. The DFT spreading modulation may be performed as described in the section below titled "Performance Comparison of DFT-Spread and Pre-Equalization for 8×244.2-Gb/s PDM-16QAM-OFDM.". Pre-equalization 203 may be achieved using frequency domain technique, or a time domain technique, as described in the sections below titled "Demonstration of 575-Mb/s downlink and 225-Mb/s uplink bi-directional SCM-WDM visible light communication using RGB LED and phosphor-based LED," and "Time-domain digital pre-equalization for bandlimited signals based on receiver-side adaptive equalizers." Furthermore, non-linearity of transmissions can be mitigated using the techniques described in US2013/0272719 (U.S. application Ser. No. 13/860,616), which is incorporated by reference in its entirety herein.

Figure 12:
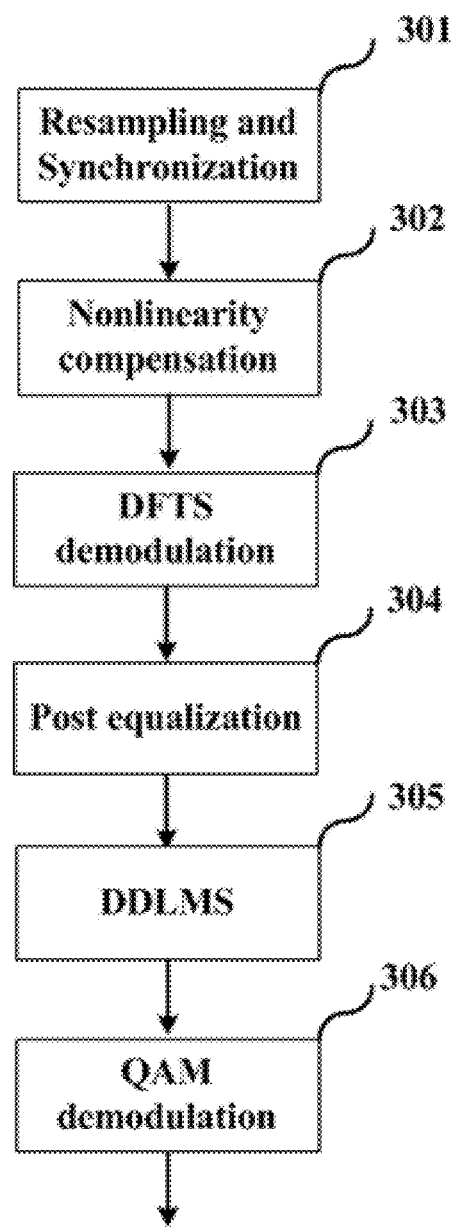
FIG. 12 shows a flowchart of an example method for receiving signals at an optical communication receiver.

FIG. 12 shows a flowchart of an example method for receiving signals at an optical communication receiver. At 301, the received signal may be resampled and synchronized to improve sample timing. At 302, a non-linear compensation may be applied to the single values to correct for nonlinear distortion in the transmit and/or the receive chain. At 303, DFTS demodulation is performed to recover spectrum of modulated QAM signals. The estimates are processed through a post-equalization stage 304 and the results are processed through a decision directed least mean squares (DD-LMS) or similar module 305. The output of the DD-LMS module 305 is demodulated in a QAM demodulator 306 to recover data bits.

Figure 13:
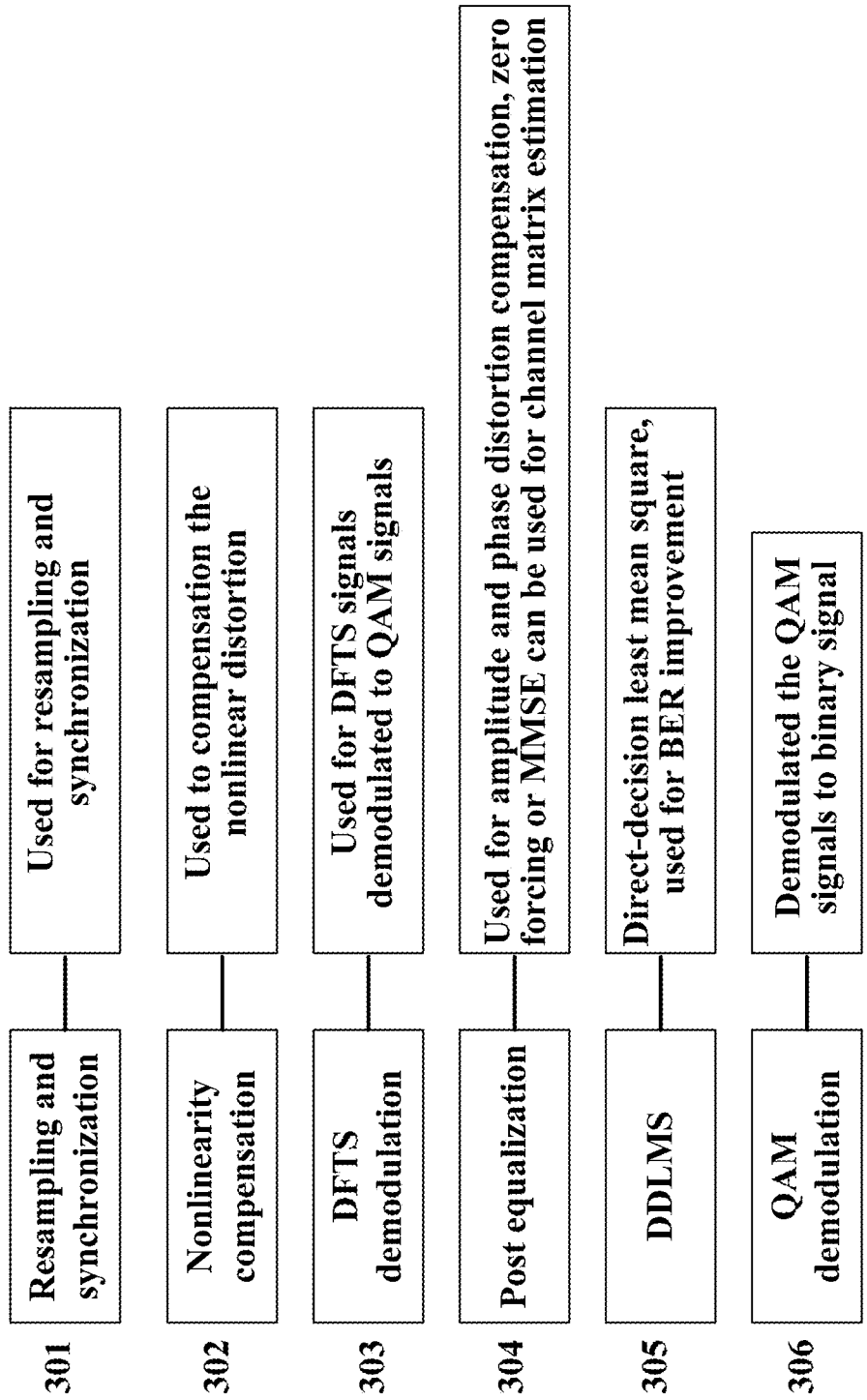
FIG. 13 shows an example block diagram of operations performed in an optical communication receiver.

FIG. 13 shows an example block diagram of possible options for operations that may be performed in an optical communication receiver. The resampling and synchronization task 301 may be performed in a digital signal processor by using a digital phase lock loop to generate better estimates of sampling instances and resampling the signal with more accurate frequency and phase estimates than those used for the original analog to digital conversion.

The nonlinearity compensation may be used to compensate nonlinear distortion. US2013/0272719 (U.S. application Ser. No. 13/860,616), which is incorporated by reference in its entirety herein, describes certain techniques for performing nonlinear compensation. In some embodiments, the compensation may be additive, e.g., a priori calculations may be used to adjust current values by adding correction to the values of sample amplitudes.

The DFTS demodulation module 303 is used to demodulate the DFTS signal to QAM signals. An orthogonal transformation, e.g., an inverse fast Fourier transform (FFT) may be used to de-spread the signals and recover QAM modulated carriers. Other variations of FFT, e.g., inverse DFT or other orthogonal inverse transforms are possible. The resulting output of the DFTS de-spreading may be an orthogonal frequency division modulated (OFDM) signal with every subcarrier being modulated using QAM or QPSK modulation.

Furthermore, the post-equalization module 304 may be used to compensate amplitude and/or phase distortion. Optimization criteria such as zero-forcing or minimum mean square error estimation may be used for channel matrix estimation. The DD-LMS operation, shown in box 305, may be performed without relying on known, or pilot, signals and may perform equalization using previous symbol decisions. Exemplary embodiments of DD-LMS implementations are discussed in the section below titled "Enhanced performance of visible light communication employing 512-QAM N-SC-FDE and DD-LMS." The QAM demodulation 306 may be performed using any of several well-known QAM demodulation techniques.

Figure 14:
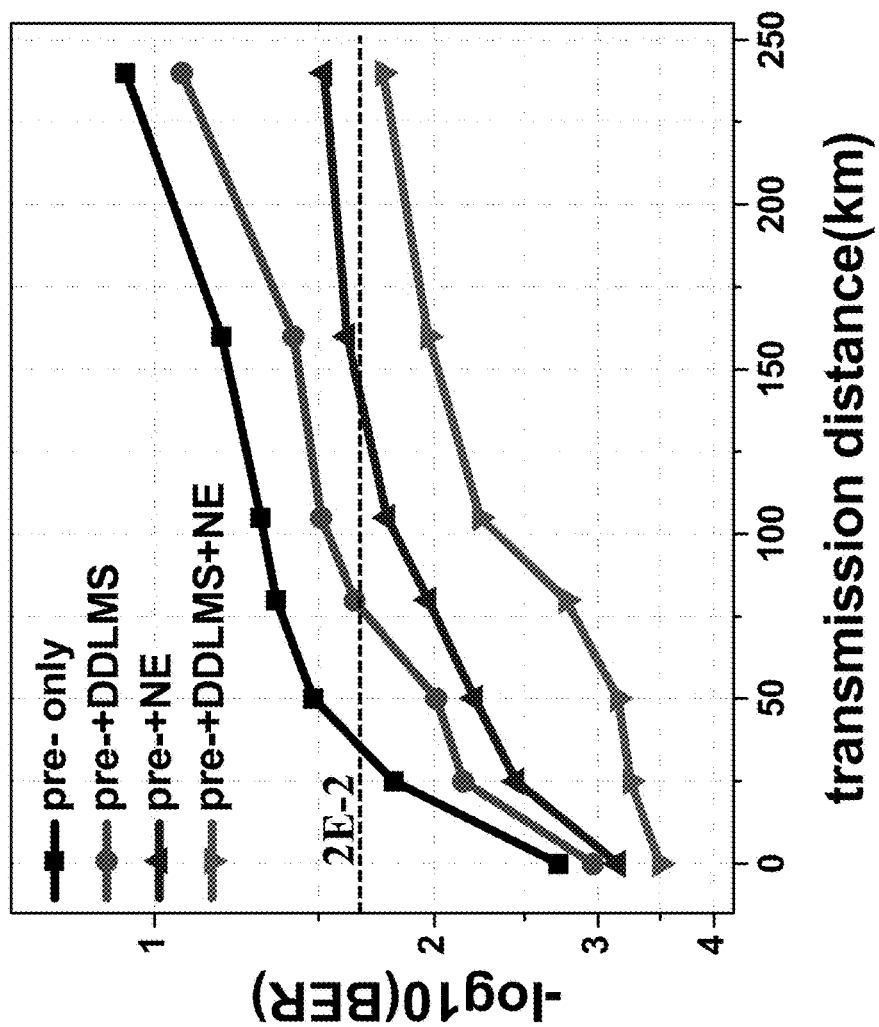
FIG. 14 is a graph showing transmission distance achieved by various signal transmission/reception techniques as a function of bit error rate.

FIG. 14 is a graph showing transmission distance achieved by various signal transmission/reception techniques as a function of bit error rate. As can be seen from the graph, a reception technique that uses pre-equalization, DD-LMS and non-linearity estimation/compensation consistently exhibits better bit error rate (BER) for all transmission distances, when compared with a scheme that uses pre-equalization and non-linearity estimation only, pre-equalization and DDLMS only and pre-equalization only.

Figure 15:
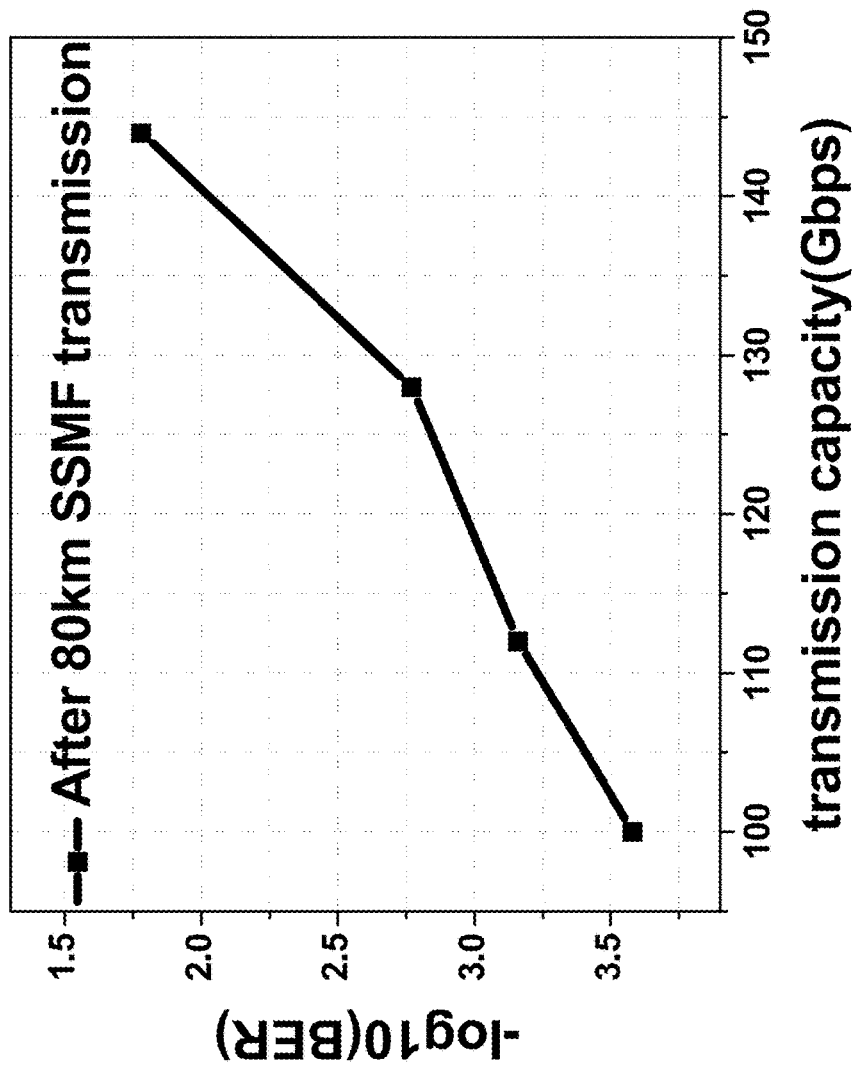
FIG. 15 is a graph showing an example relationship between bit error rate and transmission capacity in gigabits per second.

FIG. 15 is a graph showing an example relationship between bit error rate and transmission capacity in gigabits per second. As can be seen from this graph, for a distance of 80 km, a receive that incorporates technology described herein can still provide excellent bandwidth throughput or BER performance.

Figure 16:
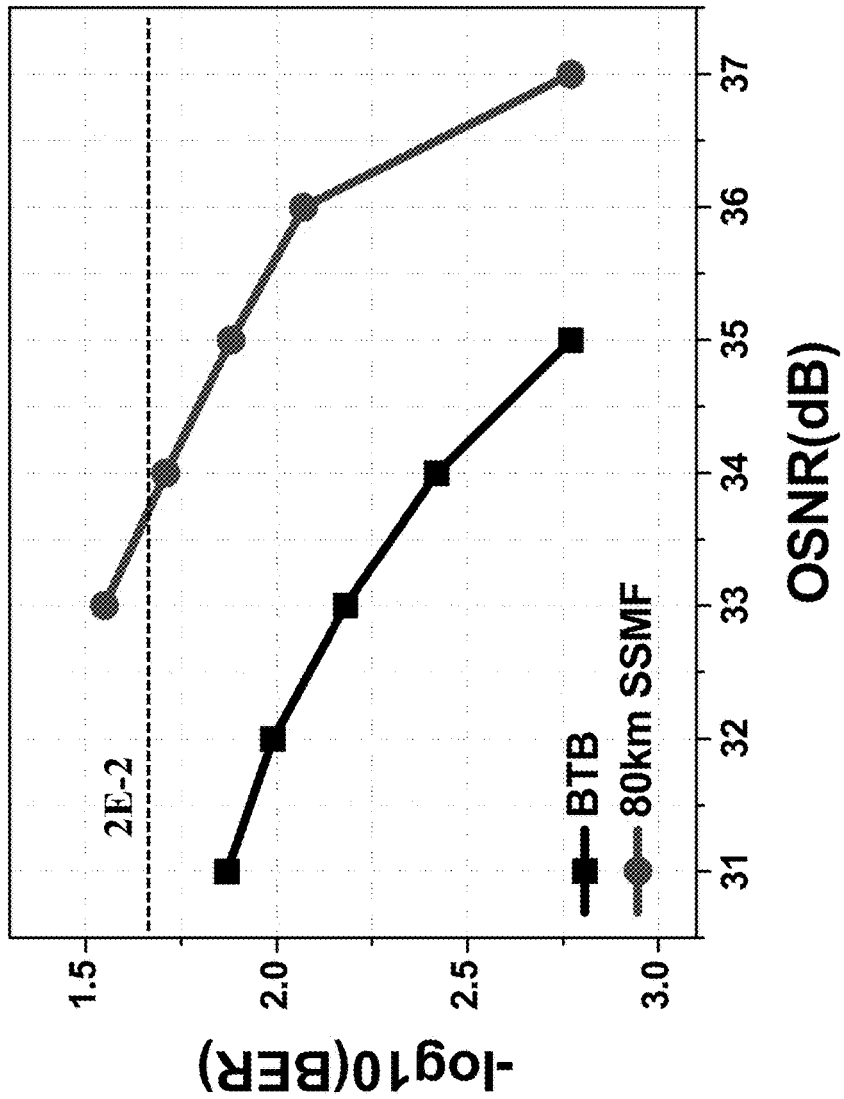
FIG. 16 is a graph showing an example relationship between bit error rate and optical signal to noise ratio.

FIG. 16 is a graph showing an example relationship between bit error rate and optical signal to noise ratio when compared for a back-to-back arrangement of transmitter and receiver and for 80 km SMF fiber channel. As can be seen from the graph, approximately 3.5 dB penalty is seen for 80 Km transmission.

Figure 17:
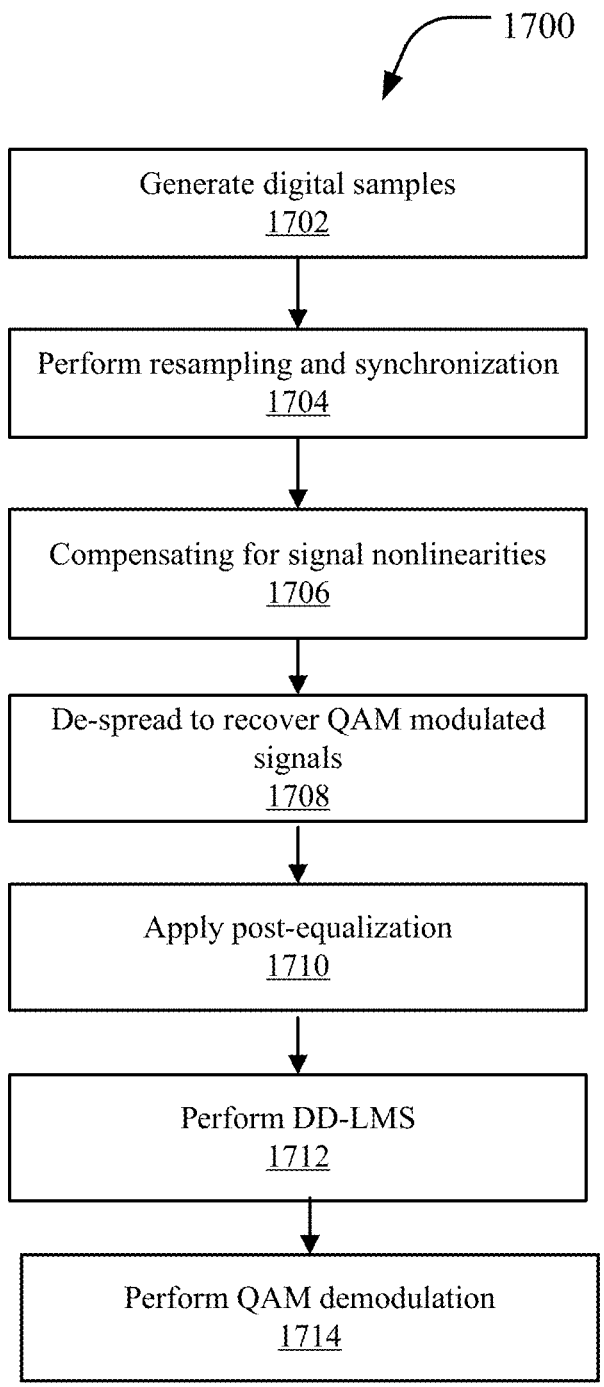
FIG. 17 is a flowchart representation of an example method of optical communication.

FIG. 17 is a flowchart representation of an example method 1700 of optical communication. The method 1700 may be implemented, e.g., at a receiver 1906 in an optical network, to receive a modulated optical signal which has undergone a digital Fourier transform spreading (DFTS).

The method 1700 includes, at 1702, generating digital samples of the modulated optical signal. In some embodiments, the digital sample generation may be performed using an ADC circuit. In some embodiments, the digital sampling may be performed at the Nyquist sampling rate (2 times the maximum bandwidth) and the sampling may generate digital values with 8 bits per sample resolution. In some embodiments, oversampling may be used (e.g., 4×).

The method 1700 includes, at 1704, performing resampling and synchronization of the digital samples to generate time-corrected digital samples from an input signal. The sampling in 1702 may be performed at a nominal frequency, and at 1704, using information about synchronization, the sampled values may be re-sampled to generate more accurate samples.

The method 1700 includes, at 1706, compensating the time-corrected digital samples for nonlinearity (NL) to produce NL-compensated digital samples. In some embodiments, the compensating operation includes additively correcting the time-corrected digital samples. Alternatively, the compensation may be performed in the frequency domain.

The method 1700 includes, at 1708, de-spreading the NL-compensated digital samples using an inverse digital Fourier transform to recover quadrature amplitude modulation (QAM) modulated signals.

The method 1700 includes, at 1710, applying post-equalization to the QAM signals to generate equalized QAM signals. In various embodiments, the post-equalization may be performed in the time domain or in the frequency domain.

The method 1700 includes, at 1712, performing a decision directed least mean square (DD-LMS) equalization to generate blind-optimized QAM signals. In some embodiments, the DD-LMS equalization may include adaptively adjusting values of filter coefficients of an FIR equalization filter. The filter length may be selected based on fiber length and the longest echoes possible in the transmission system.

The method 1700 includes, at 1714, demodulating the blind-optimized QAM signals to recover data bits.

The method 1700 may also be implemented to recover transmitted data bits from a signal that includes polarization division multiplexed component signals. At the receiver, the method 1700 may use polarization de-multiplexing to separate the component signals. The equalization may use a channel filter for each polarization, and further use cross-polarization filters to cancel out cross-polarization degradation. For example, a constant modulus algorithm may be used to separate polarized signals from each other into individual component signals.

In one advantageous aspect, the use of DFTS can reduce the peak to average power ratio (PAPR) of the resulting signal by spreading the modulated subcarrier. Due to the reduced PAPR, signal detriments due to nonlinearity of transmission or reception components will also tend to be lower than when PAPR is higher. Thus, the non-linear correction applied, e.g., at 1706, may be lower that a non-DFTS modulation system. Furthermore, DFTS may spread the signals evenly over the entire bandwidth, and thus the non-linear correction may be uniform bandwidth in frequency domain. Furthermore, in some embodiments, the same modulation format (e.g., 8-QAM or 16-QAM or 32-QAM and so on) may be used for each subcarrier. In one advantageous aspect, the DD-LMS equalization may be simplified, e.g., by using as low as a single tap adaptive filter.

Figure 18:
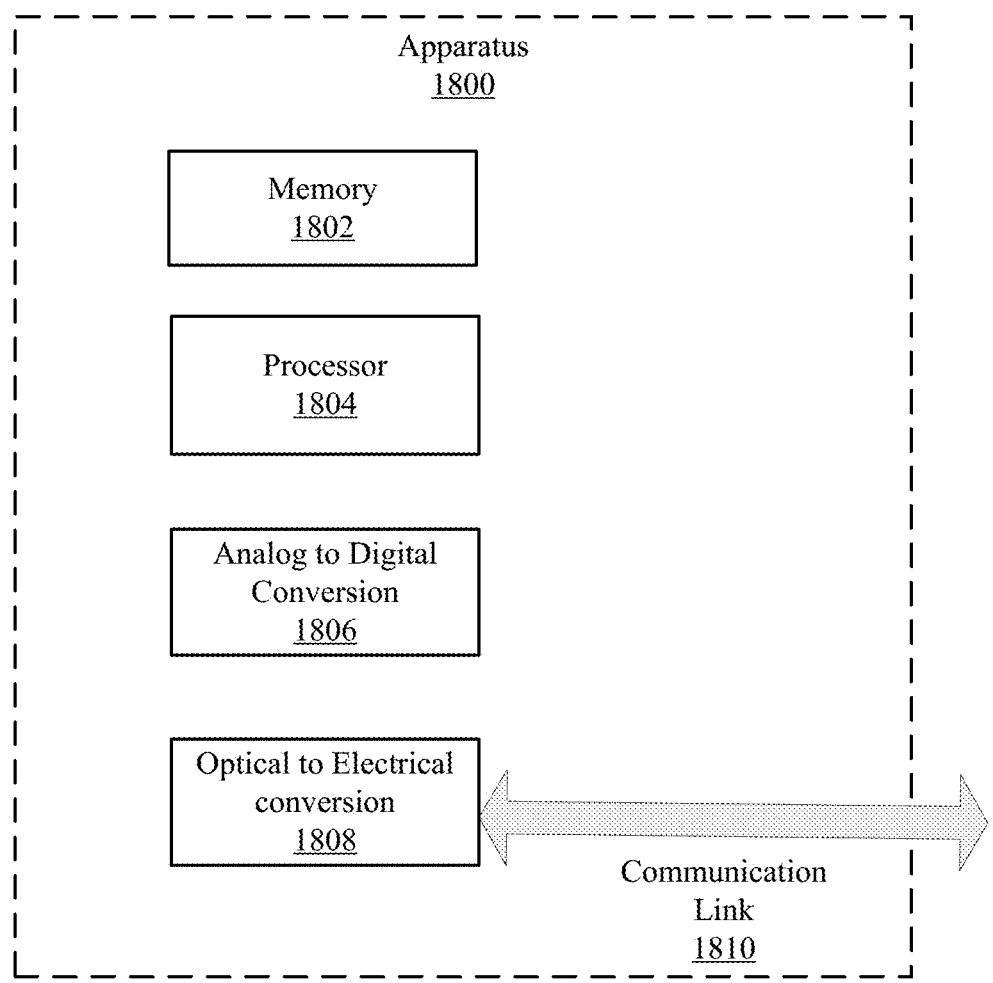
FIG. 18 is a block diagram of an example of an optical communication apparatus.

FIG. 18 is a block diagram of an example of an optical communication apparatus 1800. The apparatus 1800 includes a memory 1802, a processor, e.g., a digital signal processor, 1804, an analog to digital conversion section 1806 and an optical to electrical conversion section 1808, e.g., a photodiode that receives the modulated optical signal via a communication link 1810 and produces an electrical signal. The memory 1802 stores instructions that, when executed, cause the processor 1804 to process the digital samples to generate estimates of transmitted bits. The instructions include instructions for performing resampling and synchronization of the digital samples to generate time-corrected digital samples from an input wireless signal, instructions for compensating the time-corrected digital samples for nonlinearity (NL) to produce NL-compensated digital samples, instructions for de-spreading the NL-compensated digital samples using an inverse digital Fourier transform to recover quadrature amplitude modulation (QAM) modulated signals, instructions for applying post-equalization to the QAM signals to generate equalized QAM signals, instructions for performing a decision directed least mean square (DD-LMS) equalization to generate blind-optimized QAM signals, and instructions for demodulating the blind-optimized QAM signals to recover transmitted data bits.

It will be appreciated that techniques for receiving a DFTS spread signal that includes multiple QAM modulated subcarriers are disclosed. The disclosed techniques also work for the case when the subcarrier modulation is Quadrature Phase Shift Keying (QPSK). While the techniques are described specifically with reference to optical communication embodiments, it will be appreciated that the techniques can also be used for receiving signals transmitted over other physical mediums such as air, copper and coaxial cable.

A. Performance Comparison of DFT-Spread and Pre-Equalization for 8×244.2-Gb/s PDM-16QAM-OFDM This section compares the performance of discrete-Fourier-transform spread (DFT-spread) and pre-equalization in a 244.2-Gb/s polarization-division-multiplexed 16-ary quadrature amplitude-modulation orthogonal frequency-division multiplexing (PDM-16QAM-OFDM) transmission system. The pre-equalization is effective to overcome the high-frequency power attenuation in the channel. However, the acquisition of static channel response for pre-equalization is really complicated and the peak-to-average power ratio (PAPR) of the signal after pre-equalization even becomes a little higher. The DFT-spread can be applied to simultaneously resist high-frequency power attenuation and reduce the PAPR of OFDM signal. The experimental results also show that one band DFT-spread demonstrates the best narrow optical filtering tolerance. The transmission distance for 8×244.2-Gb/s wavelength-division-multiplexing (WDM) PDM-16QAM-OFDM at the soft-decision forward-error correction threshold of $2.4 \times 10^{-2}$ is 2×420 km based on pre-equalization, while extended to over 3×420 km based on one band DFT-spread, which well illustrates one band DFT-spread is more efficient for high-bandwidth coherent WDM-OFDM system.

i. Introduction

These days, optical telecom techniques have been developed in many aspects and especially in advanced modulation formats. With the development of high speed digital-to-analog converter (DAC), coherent optical orthogonal frequency-division multiplexing (CO-OFDM) has attracted a great deal of interest for the transmission systems beyond 100 Gb/s with high spectral efficiencies (SE). The straightest way to increase SE is to use high order modulation formats. Utilization of higher order modulation formats results in higher optical signal-to-noise ratio (OSNR) requirement and an increase of implementation complexity. Therefore, transmission distance drops rapidly with the increase of the modulation formats levels. Taking these factors into consideration, 16-ary quadrature-amplitude modulation (16-QAM) OFDM is regarded as a practical candidate for the next generation 100 G-beyond backbone optical networks. High frequency attenuation is always induced by the insufficient bandwidth of DAC, electrical driver, modulator and analog-to-digital converter (ADC) in the implementation of wideband CO-OFDM system. The subcarriers located on the edges of the OFDM signal are attenuated due to insufficient bandwidth and thereby the SNRs of these subcarriers are severely degraded. The SNRs degradations will obviously lead to a deterioration of the bit-error-ratio (BER) performance. Pre-equalization can be applied to compensate for the power attenuation in high frequency in coherent detection. In order to obtain the channel response for pre-equalization, the channel estimation in the calibration stage is really complicated in optical back-to-back. High peak-to-average power ratio (PAPR) is another drawback of CO-OFDM. Particularly, high PAPR causes serious nonlinear noise in fiber link. Thus the PAPR of OFDM should be reduced to extend transmission distance. In this section, the PAPR of OFDM signal with pre-equalization is found to be a little higher than conventional OFDM. In order to simultaneously overcome the power attenuation in high frequency and reduce the PAPR of OFDM, discrete-Fourier-transform spread (DFT-spread) technique is proposed to apply in the wideband OFDM transmission system. DFT-spread has been well studied in wireless communication for PAPR reduction and adopted for the uplink of 4G mobile standards known as the long term evolution, while DFT-spread is first introduced to reduce the PAPR in optical OFDM communication system. The whole payload subcarriers can be either divided into one band or multi bands in the DFT-spread OFDM. It is worth noting that each 16QAM data symbol within corresponding sub-band is carried on all subcarriers within the sub-band after DFT-spread, so the DFT-spread OFDM is robust to power attenuation in high frequency. Thus, DFT-spread is even better than pre-equalization for broad bandwidth optical 16QAM-OFDM transmission.

extended to over 3×420 km with one band DFT-spread, which well illustrates one band DFT-spread is more efficient for high bandwidth coherent WDM-OFDM system.

ii. Principle of DFT-Spread and Pre-Equalization

Figure 20:
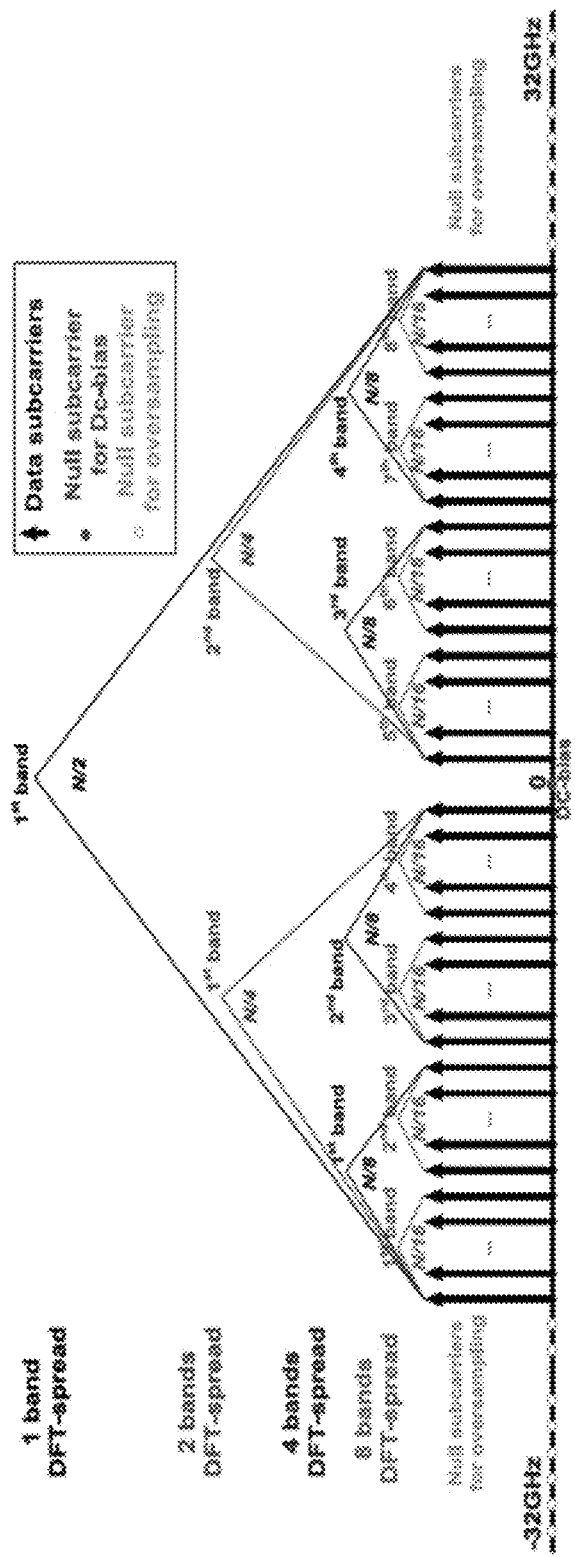
FIG. 20 is the subcarrier structure of k bands DFT-spread OFDM signal.

In this section, the bandwidth of the whole payload subcarriers is set to 32 GHz and the sampling rate of DAC is 64 GSa/s. Thus, if the fast Fourier transform (FFT) size for OFDM generation is N, the number of whole payload subcarriers is N/2. The subcarrier structure of K bands DFT-spread OFDM signal is shown in FIG. 20. In the transmitter of DFT-spread OFDM, the whole payload is first partitioned into K bands. After K groups of N/2K-point FFT is performed on each band, zeros are padded on the higher frequency part and some subcarriers around zero frequency are reserved for the insertion of RF-pilot for frequency offset and phase noise estimation. Another N-point inverse IFFT is used to generate the OFDM signal. The PAPR of OFDM with DFT-spread can be reduced compared with conventional OFDM. All the digital signal processing (DSP) operations are the same between conventional OFDM and DFT spread OFDM with different bands. The additional IFFT/FFT operation computational complexity is compared with different bands. The quantity of multiplications for the FFT/IFFT is used to evaluate the computational complexity. N-point FFT only requires $N/2 \log_2 N$ complex multiplications. The computational complexity penalty with K bands is given in Table I. The additional multiplications percentages of 1, 2, 4 and 8 bands DFT-spread OFDM are shown in Table I compared to conventional OFDM. The one band DFT-spread introduces the highest additional computational complexity. While the additional computational complexity difference gradually reduces with the increase of FFT size for OFDM signal generation. The bandwidth of OFDM signal is very large, which requires the FFT size should be large enough to improve frequency resolutions in the channel estimation and equalization. Since the computational complexity and PAPR of OFDM become higher when the FFT size for OFDM signal generation increases, the FFT size for OFDM signal generation should not be too large. In this section, it is set to 1024 and the number of total payload subcarriers is 512.

TABLE 1

THE COMPUTATIONAL COMPLEXITY PENALTY WITH K BANDS

| K | 1 | 2 | 4 | 8 |
|---|---|---|---|---|
| Additional multiplications Percentage | $\left(\dfrac{100 \times \log_2 \dfrac{N}{2}}{\log_2 N}\right)\%$ | $\left(\dfrac{100 \times \log_2 \dfrac{N}{4}}{\log_2 N}\right)\%$ | $\left(\dfrac{100 \times \log_2 \dfrac{N}{8}}{\log_2 N}\right)\%$ | $\left(\dfrac{100 \times \log_2 \dfrac{N}{16}}{\log_2 N}\right)\%$ |

This section compares the BER performance in optical back to back and nonlinearity tolerance in fiber link of DFT-spread polarization-division-multiplexed (PDM) 16QAM-OFDM with one band or multi bands and pre-equalized PDM-16QAM-OFDM. The experimental results show that one band DFT-spread demonstrates the best performance to simultaneously reduce the PAPR and resist power attenuation in high frequency for PDM-16QAM-OFDM. And the one band DFT-spread is also proved to have the best narrow optical filtering tolerance. The transmission distance for 8×244.2 Gb/s wavelength-division-multiplexing (WDM) PDM-16QAM-OFDM at the soft-decision forward-error correction (SD-FEC) threshold of 2.4×10−2 with 20% overhead is 2×420 km based on pre-equalization while Pre-equalization is proposed to compensate for the attenuation of high frequency components in the CO-OFDM transmission system. Since the bandwidth limitation only exists in DAC, electrical driver, modulator and ADC, only single polarization OFDM signal is tested to avoid the polarization crosstalk. Only the intensity is concerned as the phase of the channel response is always time-varying while the intensity of channel response is relatively stable. In order to compensate for the high frequency attenuation, the channel response should be accurately estimated. Repeated averaging method based channel estimation with training sequences (TS) is used to obtain high accuracy channel response. In the repeated averaging method, all the transmitted OFDM symbols can be regarded as TS. First, 124

QPSK-OFDM TS are transmitted to estimate the channel response and then these estimated channel response samples are averaged to suppress the random noise, and so increasing the number of TS can be effective to resist the random noise. Besides that, frequency offset and phase noise will distort the estimated channel response. In order to avoid frequency offset, one laser is used as both the transmitter light source and optical local oscillator in the system optical back to back calibration stage. The linewidth of the laser should be very small, only 400 Hz in the channel response acquisition, to reduce the phase noise. The pre-equalization process is implemented in the frequency domain after the channel response is acquired with TS.

iii. Experimental Setup

FIG. 21D shows the experimental setup of the eight channels PDM-16QAM-OFDM generation with high-speed DAC, transmission and coherent detection on a 37.5-GHz WDM grid. At the transmitter, there are eight external cavity lasers (ECLs) with linewidth less than 100 kHz and maximum output power of 14.5 dBm. The odd group of ECLs includes ECL1, ECL3, ECL5 and ECL7 ranging from 1553.875 nm to 1555.677 nm, while the even group of ECLs includes ECL2, ECL4, ECL6 and ECL8 ranging from 1554.175 nm to 1555.977 nm. Each group has 75-GHz frequency spacing. The odd or even group of continuous-wavelength lightwaves is first combined by a polarization-maintaining optical coupler (PM-OC), and then modulated by an in-phase/quadrature (I/Q) modulator. The 32-GHz 16QAM-OFDM signal is generated by a 64-GSa/s DAC, in which the in-phase (I) and quadrature (Q) data are generated by the offline DSP blocks in transmitter shown in FIG. 21D. In the OFDM modulation, the IFFT size is 1024 as mentioned in Section II. Among the 1024 subcarriers, 512 subcarriers are allocated for 16QAM data transmission, seven subcarriers around zero frequency are reserved for RF-pilots for frequency offset estimation and phase estimation, and the rest subcarriers at the edges are filled with zero for oversampling. After IFFT, a cyclic prefix (CP) of 32 sampling points is used to resist polarization mode dispersion during transmission and relax the optimization of electrical chromatic dispersion compensation (EDC) for each channel, resulting in an OFDM symbol size of 1056. The 3-dB bandwidth of DAC is only 11.5 GHz. Two RF drivers used for I and Q data amplification are with 25-GHz bandwidth. The I/Q modulators used for optical 16QAM-OFDM modulation are with 27-GHz bandwidth. Therefore, the DAC plays the main role in high frequency attenuation. For optical OFDM modulation, two parallel Mach-Zehnder modulators in the I/Q modulator are both biased at a little deviation from the null point to generate the RF-pilot and the phase difference between the upper and lower branches of the I/Q modulator is controlled at $\pi/2$. The polarization multiplexing is realized by a polarization multiplexer, where an optical delay line is used to remove the correlation between X-polarization and Y-polarization by providing an exact OFDM symbol delay ($1/64\times(1024+32)$ ns=16.5 ns). A pair of time-interleaved TS for de-multiplexing can be constructed in the polarization multiplexer. One pair of TS is inserted before every 122 16QAM-OFDM symbols. The payload bit rate is 64 Gb/s$\times$512/1056$\times$122/124$\times$4$\times$2=244.2 Gb/s after excluding overhead. The generated odd-channel and even-channelPDM-16QAM-OFDMoptical signals are combined by a 3-dB OC and boosted by an Erbium-doped fiber amplifier (EDFA), to obtain 8$\times$244.2-Gb/s WDM PDM 16QAM-OFDM optical signal. The generated WDM signal is then launched into a re-circulating fiber loop, which consists of five spans of 84-km single-mode fiber-28 (SMF-28). Each span has 18-dB average loss and 17-ps/km/nm chromatic dispersion at 1550 nm without optical dispersion compensation. An EDFA is used before each span to compensate for the fiber loss. After 5$\times$84-km SMF-28 transmission, the optical signal passes through a programmable wavelength selective switch (WSS) on a 37.5-GHz grid to remove the amplified spontaneous emission noise. An EDFA is used after the WSS to compensate for the switch loss in the loop. Thus, for each circulation, the optical signal is transmitted over 5$\times$84-km SMF-28 and passes through one WSS.

At the receiver, a tunable optical filter (TOF) with 0.33-nm 3-dB bandwidth is used to select the desired channel. An ECL with linewidth less than 100 kHz is used as LO for the selected channel. Optical-to-electrical (O/E) detection of the signal is implemented with an integrated coherent receiver. The analog-to-digital conversion is realized in the real-time oscilloscope with 80-GSa/s sampling rate and 30-GHz bandwidth. The captured data is then processed with offline DSP shown in FIG. 21D. The DSP can be divided into eight stages: (1) EDC, (2) frequency offset estimation and phase noise estimation with the aid of RF-pilot, (3) timing synchronization, (4) 1024-point FFT, (5) polarization de-multiplexing and channel estimation utilizing Jones Matrix, (6) optionally additional IFFT if there is additional FFT in the transmitter, (7) hard decision feedback phase estimation, (8) 16QAM-Demapping and error counting. In this experiment, the BER is counted over 10$\times$499712 bits (ten data frames, and each frame contains 499712 bits).

In the OFDM transmitter, an additional FFT or pre-equalization operation is implemented to generate DFT-spread OFDM or OFDM with pre-equalization, respectively. The conventional OFDM signal is also generated for comparison. One band and multi bands (two, four and eight bands) DFT-spread OFDM are generated and transmitted, and the total payload subcarriers can be divided into one, two, four and eight groups, respectively. The pre-equalization process is introduced in section A.ii. The total number of TS is 124 and the linewidth of the laser in the channel response acquisition is only 400 Hz. The optical spectra (0.02-nm resolution) of single channel conventional OFDM and OFDM with pre-equalization are shown in inset of FIG. 21A. It can be seen that the high frequency attenuation is compensated after pre-equalization. A little over-compensation occurs in the high frequency after pre-equalization and this over-compensation just counteracts the high frequency attenuation of ADC in the receiver. The electrical spectra of received conventional OFDM signal and OFDM signal with pre-equalization are shown in FIGS. 21B and 21C, respectively. After pre-equalization, the power on different subcarriers is evenly distributed.

iv. Results and Discussions

Figure 22:
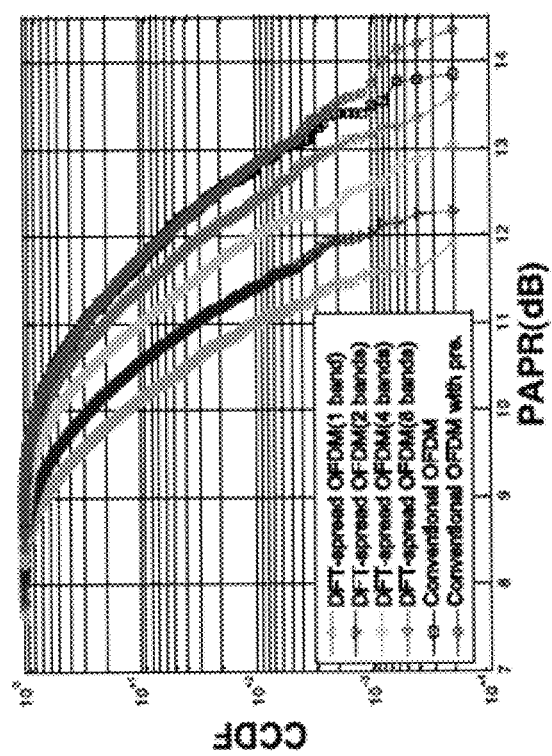
FIG. 22 is the CCDFs of different types of OFDM.

Complementary cumulative distribution function (CCDF) denotes that a probability distribution of the PAPR of current OFDM symbol is over a certain threshold. FIG. 22 gives the calculated CCDF curves. The PAPR of conventional OFDM with pre-equalization is even a little higher than that of conventional OFDM, while the PAPR of DFT-spread OFDM is lower than that of conventional OFDM. This means DFT-spread can enhance the tolerance of the nonlinear effects in optical fiber transmission. The PAPR of DFT-spread drops when the number of bands during DFT-spread decreases. 2-dB and 2.5-dB PAPR improvements are attained for one band DFT-spread OFDM compared to conventional OFDM and conventional OFDM with pre-equalization at the probability of $2\times10^{-4}$, respectively. Each 16QAM data symbol within corresponding sub-band is spread into all subcarriers within the sub-band after DFT-spread, so the DFT-spread OFDM is robust to power attenuation in high frequency. Every 16QAM data is distributed into the whole effective bandwidth of the signal when the overall payload subcarriers is regarded as one band during DFT-spread, and thus the system with one band DFT-spread OFDM shows the best performance to resist power attenuation in high frequency compared to multi bands schemes. From the perspective of these two points, one band DFT-spread outperforms pre-equalization as it can simultaneously overcome the power attenuation in high frequency and reduce the PAPR for high bandwidth 16QAM-OFDM signal.

Figures 24A, 24B:
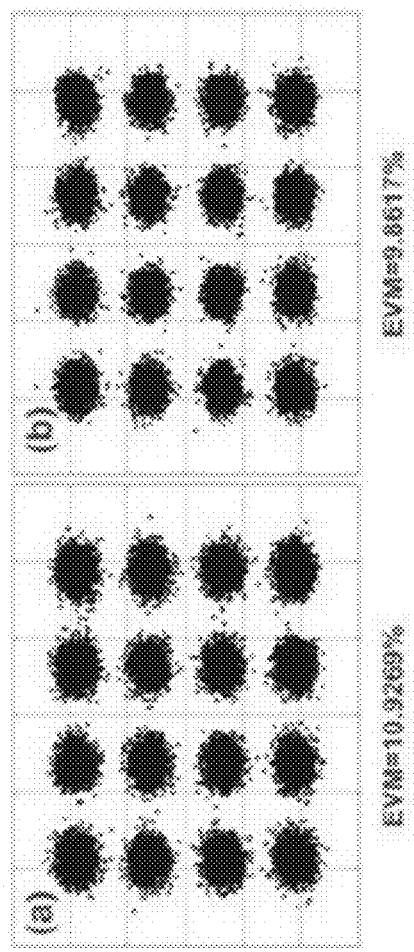
FIGS. 24A and 24B are constellations with narrow band interference and without narrow band interference, respectively.

FIG. 23A gives optical spectrum (0.01-nm resolution) of signal after I/Q modulator when the outputs of DAC are all set to 0. Besides the residual optical carrier, there are two peaks around the residual optical carrier. The frequency spacing between the residual optical carrier and these two peaks is 16 GHz, which means one 16-GHz sine wave is present in the output. As the power of this sine wave is relatively high, it should be regarded as narrow band interference. In order to overcome this narrow band interference, the two subcarriers located at ±16 GHz and four other subcarriers surround ±16 GHz are all set null to guard against the interference at ±16 GHz. After adding these six null subcarriers for narrow band interference elimination, the actual bandwidth of 32-GHz 16QAM-OFDM becomes $(512+7+6)\times 64/1024=32.8125$ GHz. The electrical spectrum of received 32-GHz 16QAM-OFDM signal without frequency offset with null subcarriers is given in FIG. 23B, and two peaks can be seen in the edge of the spectrum. Enlarging the spectrum leads to finding the high peaks just locating at ±16 GHz, while the peaks at −16 and 16 GHz can be seen in FIGS. 23C and 23D, respectively. In order to verify that the null subcarrier is effective to eliminate the narrowband interference, the constellations and error vector magnitudes (EVMs) of one band DFT-spread 32-GHz 16QAM-OFDM is given out in optical back to back with 35-dB OSNR without and with null subcarriers for narrow band interference elimination in FIGS. 24A and 24B, respectively. After reserving null subcarriers at ±16 GHz for interference cancellation, the constellations become more concentrated and the EVM is improved from 10.9269% to 9.8617%.

Figure 25:
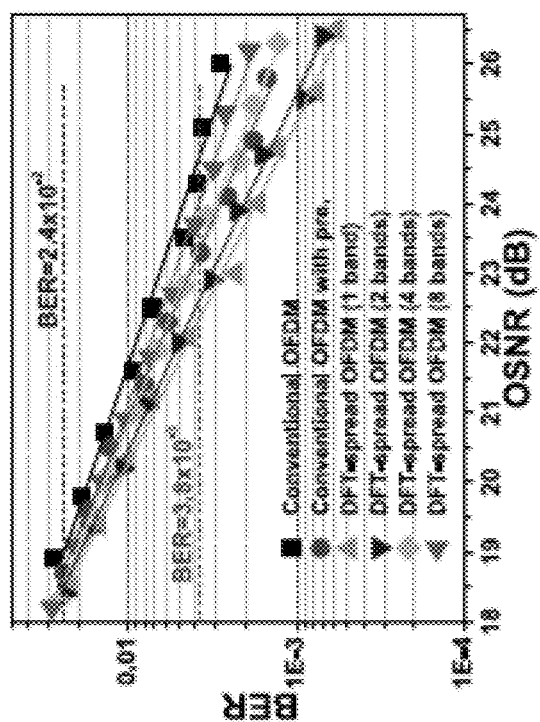
FIG. 25 shows BER versus OSNR (single channel).
Figure 26:
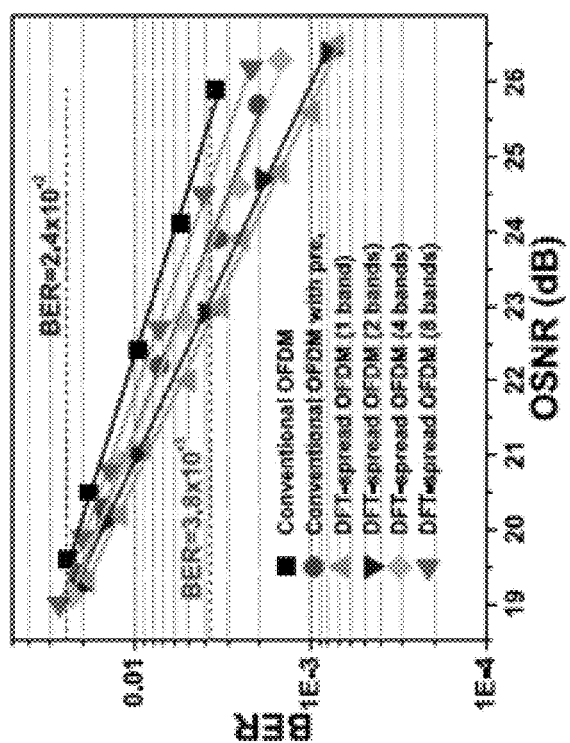
FIG. 26 shows BER versus OSNR (the third channel of eight WDM channels).

The BER versus OSNR of single channel 32-GHz 16QAM-OFDM in optical back to back is measured and the results are shown in FIG. 25. The one band DFT-spread OFDM shows the best performance. The BER performance improves when the number of bands in the DFT-spread decreases. After pre-equalization, the BER performance can be improved as the high frequency attenuation has been compensated, but the increased PAPR limits the improvement of the performance as the nonlinear distortion mainly in the electrical amplifiers induced by high PAPR still exists. Compared to conventional OFDM and conventional OFDM with pre-equalization, 2.3-dB and 1.2-dB OSNR improvements are obtained by utilizing one band DFT-spread OFDM scheme at the BER of $3.8\times 10^{-3}$. The BER versus OSNR of the third channel of eight-channel WDM 32-GHz 16QAM-OFDM in optical back to back with 37.5-GHz channel spacing is measured and the results are given in FIG. 26. Compared with the single channel 32-GHz 16QAM-OFDM, there is no penalty observed for eight-channel WDM 32-GHz 16QAM-OFDM with 37.5-GHz channel spacing. The one band DFT-spread OFDM also shows the best performance.

Figure 27:
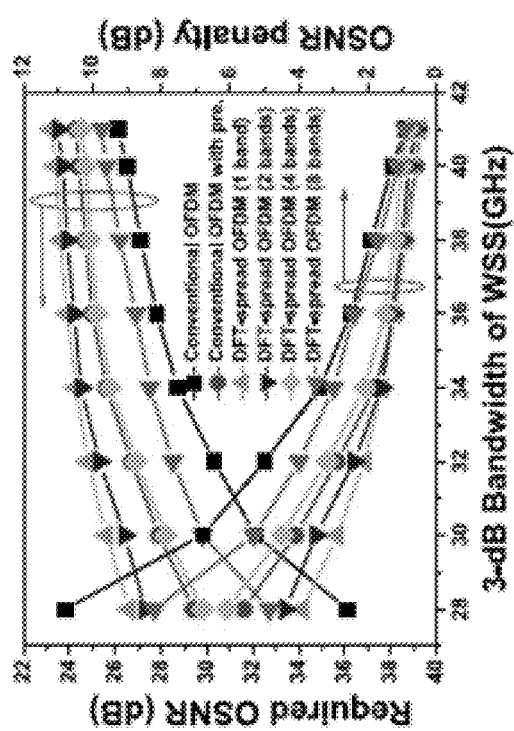
FIG. 27 shows the required OSNR and OSNR penalty versus bandwidth of WSS (BER target=3.8×10−3).
Figure 28:
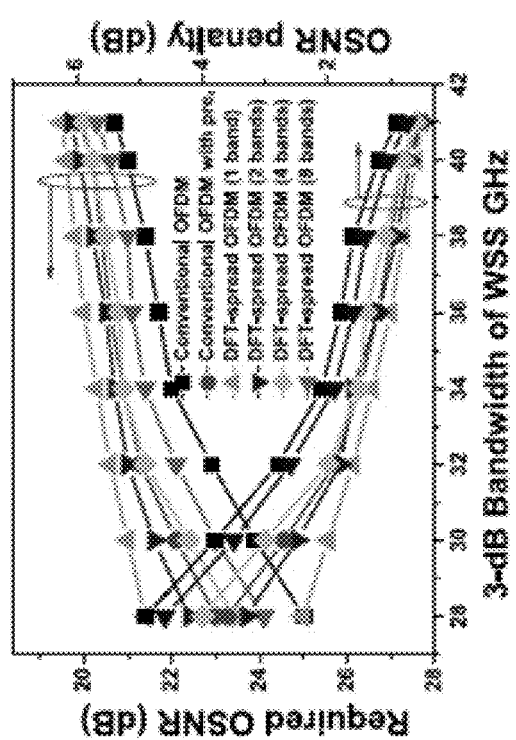
FIG. 28 shows the required OSNR and OSNR penalty versus bandwidth of WSS (BER target=2.4×10−2).

In the optical back to back of single channel 32-GHz PDM-16QAM-OFDM, narrow optical filtering tolerance has been tested. In this test, the 0.33-nm TOF in the receiver is replaced with a WSS (Finisar 4000S) to adjust the optical bandwidth. The required OSNR and OSNR penalty versus 3-dB bandwidth of WSS is shown in FIG. 27 when the target BER is $3.8\times 10^{-3}$, and it can be seen that the required OSNR and OSNR penalty of conventional OFDM increase rapidly when the bandwidth of the WSS is insufficient for 32-GHz conventional 16QAM-OFDM transmission. Among these six different types of 32-GHz 16QAM-OFDM signal, the required OSNR and OSNR penalty of one band DFT-spread OFDM have the slowest increase when the bandwidth of WSS decreases. The pre-equalization is just implemented before adding the WSS, which means the high frequency attenuation appears again when the bandwidth of WSS is insufficient for 32-GHz 16QAM-OFDM transmission. The OSNR penalty for conventional OFDM, conventional OFDM with pre-equalization, one band DFT-spread OFDM, two bands DFT-spread OFDM, four bands DFT-spread OFDM and eight bands DFT-spread OFDM when the bandwidth of WSS is set at 32 GHz are 5, 2.9, 2.1, 2.5, 3.2 and 4 dB, respectively. The required OSNR and OSNR penalty versus bandwidth of WSS was measured when the target BER is $2.4\times 10^{2}$, and the results are shown in FIG. 28. The OSNR penalty for the one band DFT-spread OFDM is 1.5 dB when the bandwidth of WSS is 32 GHz and it is still the lowest. From the results it can be seen that one band DFT-spread OFDM has the best narrow optical filtering tolerance performance.

Figure 29:
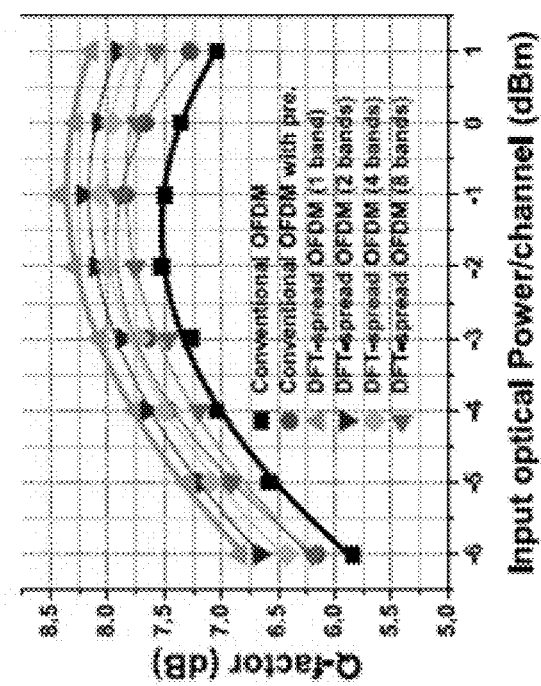
FIG. 29 shows the measured Q-factor of the third sub-channel versus the input power per channel.

FIG. 29 shows the measured Q-factor, which is derived from the BER, versus input power per channel of the third subchannel of eight-channel WDM 32-GHz PDM-16QAM-OFDM after 420-km fiber transmission. The optimal input power per channel for conventional OFDM and conventional OFDM with pre-equalization is −2 dBm, while the optimal input power per channel for one band DFT-spread OFDM, two bands DFT-spread OFDM, four bands DFT-spread OFDM and eight bands DFT-spread OFDM are all −1 dBm. The increase of the optimal input power into fiber results from the reduction of PAPR with DFT-spread. Compared to conventional OFDM and conventional OFDM with pre-equalization, after 420-km SMF-28 transmission the Q-factor of one band DFT-spread OFDM can be improved by 0.9 and 0.4 dB, respectively.

Figure 30:
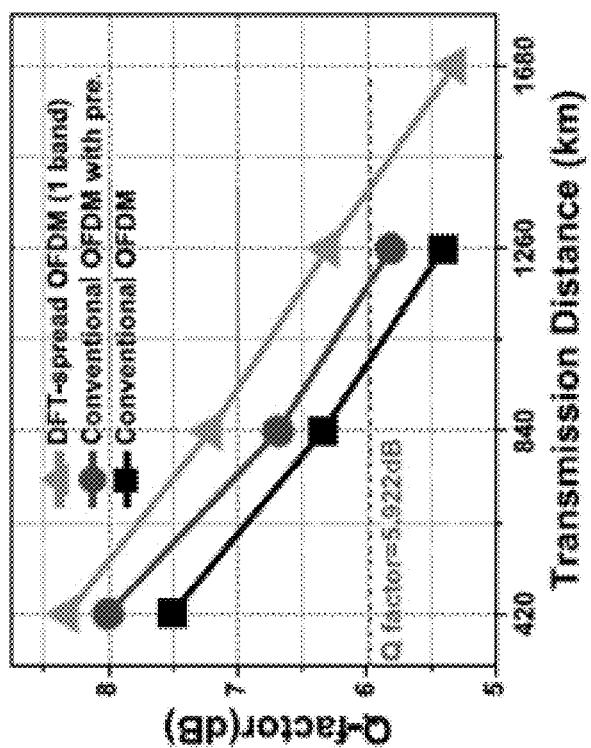
FIG. 30 shows the BER of the third sub-channel versus the transmission distance.
Figure 31:
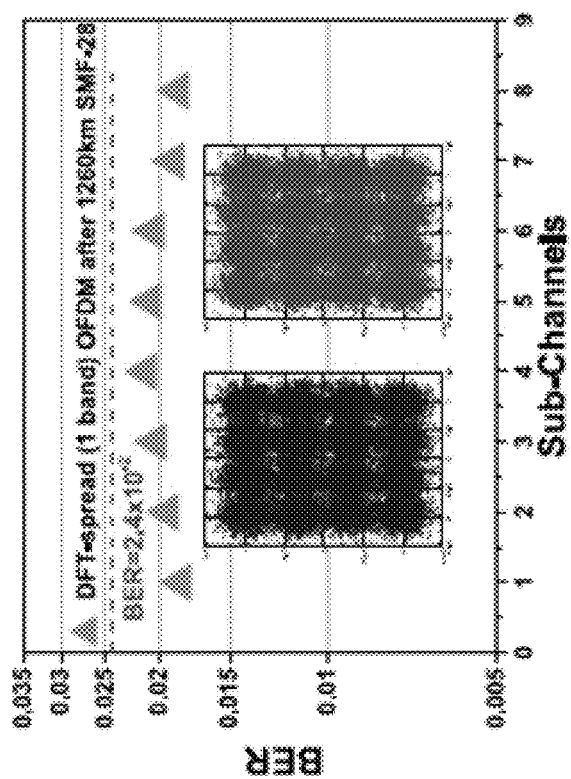
FIG. 31 shows the measured BER of all eight sub-channels one band DFT-spread 32-GHz PDM-16QAM-OFDM after 1260-km SMF-28 transmission.

FIG. 30 shows the Q factor of sub-channel 3 versus the transmission distance, while conventional OFDM, conventional OFDM with pre-equalization and one band DFT-spread OFDM are measured. With pre-equalization, the system performance can be improved by reducing these bandwidth limiting impairments. After 1260-km SMF-28 transmission, the Q factor of 32-GHz conventional PDM-16QAM-OFDM signal is 5.406 dB. With pre-equalization, the A factor can be improved to 5.815 dB, but the Q factor is still beyond the threshold of SDFEC (5.922 dB). The maximum transmission of sub-channel 3 is 840 km if the transmitted signal is conventional OFDM or conventional OFDM with pre-equalization. The maximum transmission distance can be extended to 1260 km when one band DFT-spread is applied to the 32-GHz PDM-16QAM-OFDM signal. After 1260-km SMF-28 transmission, the Q factor of one band DFT-spread 32-GHz PDM-16QAM-OFDM is 6.304 dB. For all eight sub-channels one band DFT-spread 32-GHz PDM-16QAM-OFDM, the measured BER after 1260-km SMF-28 transmission is presented in FIG. 31. The BERs for all channels are below the $2.4\times 10^{-2}$ (20% SD-FEC BER threshold) after 1260-km SMF-28 transmission. The received X- and Y polarization constellations of the fourth sub-channel one band DFT-spread 32-GHz PDM- 16QAM-OFDM are both inserted in FIG. 31 as insets. These results demonstrate that one band DFT spread OFDM show the best performance to reduce the PAPR and resist power attenuation in high frequency at the same time.

v. Conclusion

This section experimentally compares the performance of one band or multi bands DFT-spread PDM-16QAM-OFDM and PDM-16QAM-OFDM with or without pre-equalization in terms of robustness to power attenuation in high frequency and nonlinear effects in fiber link. The experimental results show that one band DFT-spread shows the best performance to reduce the PAPR and resist power attenuation in high frequency for PDM-16QAM-OFDM, and it has also been proved to have the best narrow optical filtering tolerance. The transmission distance for 8×244.2-Gb/s WDM PDM-16QAM-OFDM at the SD-FEC threshold of $2.4 \times 10^{-2}$ is 2×420 km based on pre-equalization while extended to 3×420 km with one band DFT-spread.

B. Demonstration of 575-Mb/s Downlink and 225-Mb/s Uplink Bi-Directional SCM-WDM Visible Light Communication Using RGB LED and Phosphor-Based LED This section experimentally demonstrate a novel full-duplex bi-directional subcarrier multiplexing (SCM)-wavelength division multiplexing (WDM) visible light communication (VLC) system based on commercially available red-green-blue (RGB) light emitting diode (LED) and phosphor-based LED (P-LED) with 575-Mb/s downstream and 225-Mb/s upstream transmission, employing various modulation orders of quadrature amplitude modulation (QAM) orthogonal frequency division multiplexing (OFDM). For the downlink, red and green colors/wavelengths are assigned to carry useful information, while blue chip is just kept lighting to maintain the white color illumination, and for the uplink, the low-cost PLED is implemented. In this demonstration, pre-equalization and post-equalization are also adopted to compensate the severe frequency response of LEDs. Using this scheme, 4-user downlink and 1-user uplink transmission can be achieved. Furthermore, it can support more users by adjusting the bandwidth of each sub-channel. Bit error rates (BERs) of all links are below pre-forward-error-correction (pre-FEC) threshold of 3.8× 10−3 after 66-cm free-space delivery. The results show that this scheme has great potential in the practical VLC system.

i. Introduction

Visible light communication (VLC) based on white light emitting diodes (LEDs) is garnering increasing attention as LEDs are considered to be a major candidate for future illumination. The VLC system offers several advantages such as cost-effective, license-free, electromagnetic interference free and security. There are two types of white-light LED used for lighting: devices which use separate red-green-blue emitters and which use a blue emitter in combination with a phosphor that emits yellow light. Both kinds of white LEDs can be applied for VLC system. The former type enables easy color rendering by adjusting each colour individually, which is very promising for high-speed transmission because of wide bandwidth. The latter type is cost-efficient mainly due to its simple technological design, but the bandwidth is limited to several MHz due to the slow relaxation time of the phosphor. The feasibility of unidirectional VLC systems based on both kinds of white LEDs has been widely investigated. The data rate of 3.4 Gb/s at a distance below 30 cm has been achieved over a RGB white LED by using discrete multi-tone (DMT) modulation and avalanche photodiode (APD). And the transmission data rate of 200 Mbit/s over a phosphorescent white LED (P-LED) has been reported by using DMT modulation. However, bi-directional VLC transmission is still a main challenge due to the lack of good resolution of the uplink of an indoor VLC system. There have been some reports on bidirectional VLC transmission, such as retro-reflecting link and time-division-duplex, but the data rates of uplink are only few Mb/s.

This section proposes and experimentally demonstrates a novel full-duplex bidirectional VLC system using RGB LED and a commercially available phosphor-based LED in downlink and uplink, respectively. In this demonstration, subcarrier multiplexing (SCM) and wavelength division multiplexing (WDM) are adopted to realize the bi-directional transmission; quadrature amplitude modulation (QAM) and orthogonal frequency division multiplexing (OFDM) modulation are also employed to increase the data rate. Additionally, pre- and post-equalizations are both implemented to compensate the severe channel response of LEDs. For downlink, signals are only modulated on red and green chips, while the blue chip is just lighted by direct current (DC) voltage to maintain white colour illumination. Each LED chip has two SCM channels without channel guardband. A downstream at 575 Mb/s and an upstream at 225 Mb/s after 66-cm free-space transmission are achieved, and the measured bit error rates (BERs) for all channels are under hard-decision FEC limit of $3.8 \times 10^{-3}$. The interference caused by bi-directional transmission is also discussed. Moreover, this scheme has good scalability for supporting more terminals and advantage of dynamic traffic reconfiguration by adjusting different bandwidth and modulation orders for uplink and downlink transmissions.

ii. Experimental Setup

Figure 32:
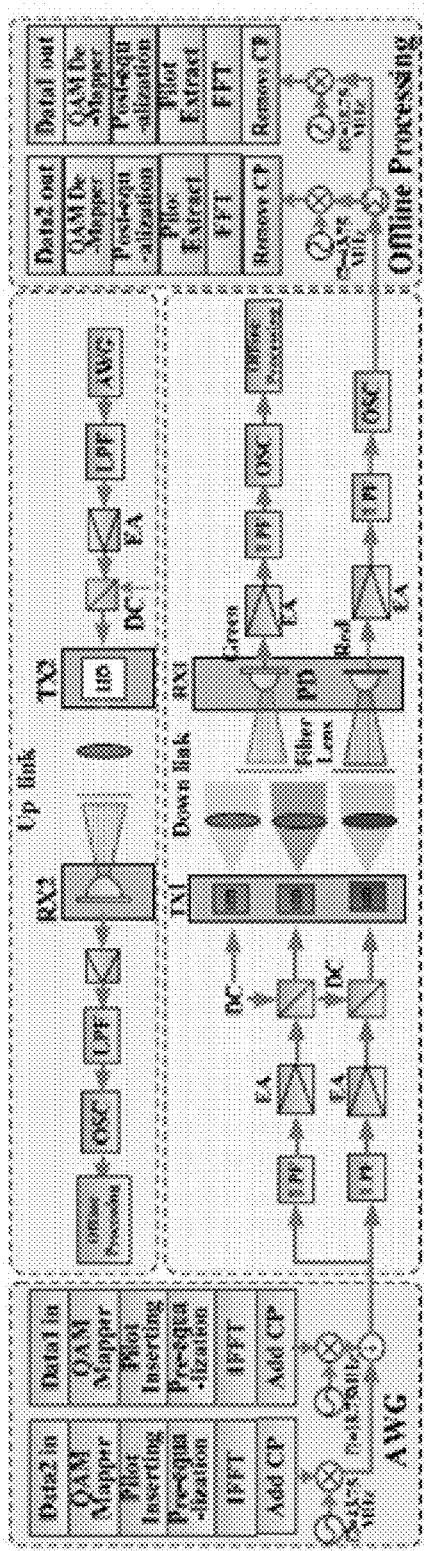
FIG. 32 illustrates block diagrams of proposed bi-directional VLC system (AWG: arbitrary waveform generator, EA: electrical amplifier, LPF: low-pass filter, OSC: real-time oscilloscope, DC: direct current, PD: photodiode, DL: downlink, UL: uplink).

The block diagram of bi-direction VLC System is presented in FIG. 32. In this scheme, SCM and WDM are employed to realize flexible frequency allocation and bi-directional transmission. RGB LED (Cree Xlamp MC-E) was utilized for downlink and phosphorescent white-light LED (Cree Xlamp XML) for uplink. This type of RGB LED consists of four chips radiating in the wave length regions of 625 nm (red), 530 nm (green) and 455 nm (blue) and white colour, which generates a luminous flux of about 106 lm (red: 30.6 lm, green: 67.2 lm and blue: 8.2 lm) at 350 mA bias currents with 110° Lambertian emission, and the P-LED generates a luminous flux of about 280 lm at 700 mA bias currents with 120° Lambertian emission. The red and green lights of RGB LED are used to carry useful information, while the blue light is only supplied with DC to maintain white colour illumination. In this way, the collision between uplink and downlink can be eliminated.

At the transmitter, the input binary sequences are modulated using QAM format, and then passed to OFDM encoder. Then, the QAM-OFDM signals are up-converted to different subcarriers with center frequency at f1=18.75 MHz (sub1), f2=43.75 MHz (sub2) without SCM channel guardband in radio frequency (RF) domain and added up. The bandwidths of all sub-channels are 25 MHz. From DC to 5 MHz, the transfer curve is not good in this demonstration, and the 25 dB bandwidth point is around 50 MHz, therefore the signal frequency band from 6.25 MHz to 56.25 MHz was chosen. Moreover, the center frequency and bandwidths of sub-channels can be adjusted to meet the demands of different users. Subsequently, the multiplexed QAM-OFDM signals came from AWG are filtered by a low-pass filter (LPF) and amplified by EA. The electrical QAM-OFDM signals and DC-bias voltage are combined via bias tee, and applied to different LEDs serving as the transmitter. In red color chip, 64QAM is applied both in sub1 and sub2. However, in green color chip the modulation format of sub2 is 32QAM, and 64QAM is used in sub1. For uplink, the modulation formats of sub1 and sub2 are 32QAM and 16QAM, respectively. As each sub-channel is independent, it can be used to support multiple users for upstream and downstream transmission.

In this experiment, QAM-OFDM signals which consist of 64 subcarriers are generated by an arbitrary waveform generator (AWG). Up-sampling by a factor 20 is employed, and the sample rate of AWG is 500 MS/s. Pre-equalization is used before inverse fast Fourier transform (IFFT) to compensate the distortions of AWG, LED, EA and free-space channel, while training-symbols-based post-equalization is used for other channel impairments such as phase noise. At the receiver, the electrical QAM-OFDM signals are detected by low-cost PDs and recorded by a digital real-time oscilloscope (OSC) with 500 MS/s sampling rate. Additionally, in front of each PD, the corresponding optical filter is implemented to filter out the undesired wavelength. Then the received signals are down-converted to baseband and further offline processing which is an inverse procedure of QAM-OFDM encoder.

iii. Experimental Results and Discussions

The experimental setup for the bi-directional VLC system based on LEDs is shown in FIGS. 33A-33C. In this experiment, Tektronix AWG 710 (output 1 for uplink) and Tektronix AWG 7122C (output2 for red chip, output 3 for green chip in downlink) are used to generate three different QAM-OFDM signals. And the signals are first amplified by an electrical amplifier (Minicircuits, 25-dB gain) to obtain an appropriate input power of LED. The data is recorded by a commercial high-speed digital oscilloscope (Tektronix TDS 6604) with the maximum bandwidth of 6 GHz and the maximum sampling rate of 20 GSa/s. A lens (100-mm focus length, 75-mm diameter) was used to collect the light onto the PD. The PD (Hamamatsu S6968, 0.24 A/W responsivity at 440 nm) is with 150 mm2 active area and about 50 MHz bandwidth. The distance between the TX and RX in the different side is 66 cm. And the bias currents of P-LED, red chip and green chip are 190 mA, 170 mA and 160 mA.

Figures 34A, 34B:
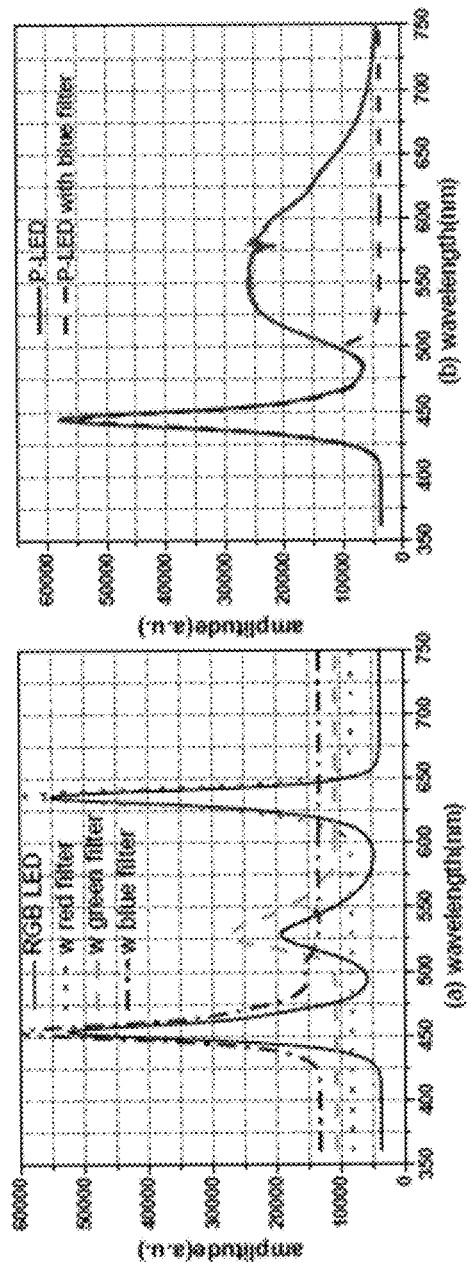
FIG. 34A shows a measured optical spectrum of RGB LED.
FIG. 34B shows a measured optical spectrum of P-LED.

First of all, the optical spectra of different LEDs used in this experiment were measured as shown in FIGS. 34A and 34B. The resolution is 0.35 nm. As can be seen, the unwanted spectrum component can be filtered out by the corresponding R/G/B optical filter, and the yellow phosphor of the P-LED can also be filtered out by blue filter. The optical spectra of these LED chips with RGB filter are not overlapping, which can be easily concluded that the interference between uplink and downlink will be quite small.

Figure 35:
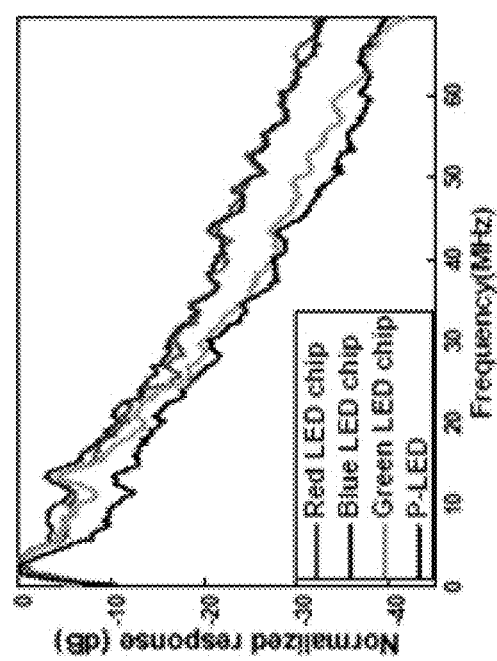
FIG. 35 shows a channel response of individual LED.
Figure 36A:
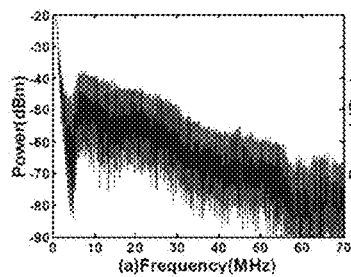
FIG. 36A shows the electrical spectra of different wavelengths for a P-LED (w/o pre-).
Figure 36B:
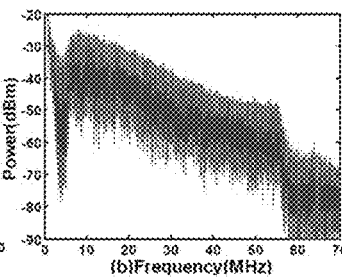
FIG. 36B shows the electrical spectra of different wavelengths for a red LED (w/o pre-).
Figure 36C:
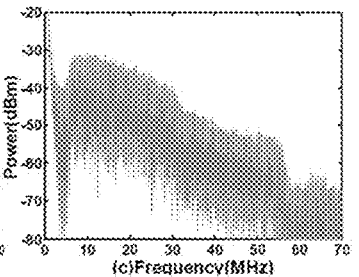
FIG. 36C shows the electrical spectra of different wavelengths for a green LED (w/o pre-).
Figure 36D:
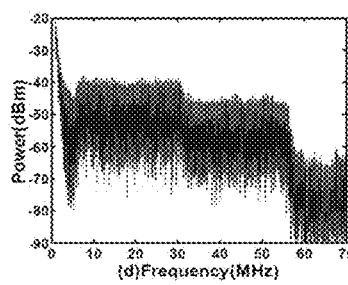
FIG. 36D shows the electrical spectra of different wavelengths for a P-LED (w pre-).
Figure 36E:
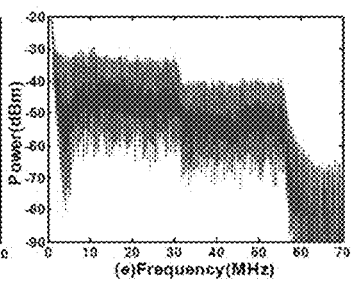
FIG. 36E shows the electrical spectra of different wavelengths for a red LED (w pre-).
Figure 36F:
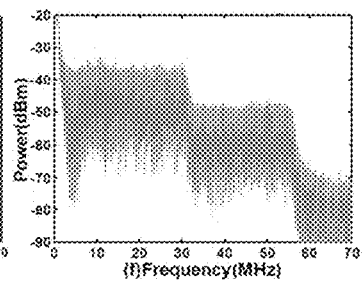
FIG. 36F shows the electrical spectra of different wavelengths for a green LED (w pre-).
Figure 36G:
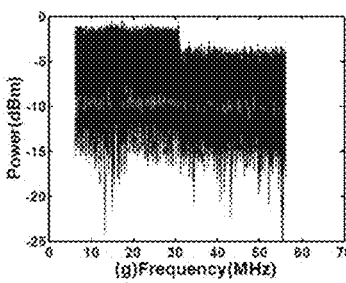
FIG. 36G shows the electrical spectra of different wavelengths for a P-LED (w post).
Figure 36H:
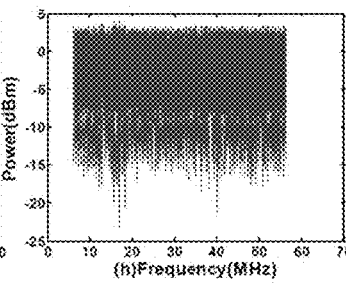
FIG. 36H shows the electrical spectra of different wavelengths for a red LED (w post).
Figure 36I:
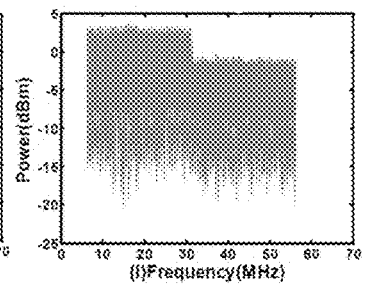
FIG. 36I shows the electrical spectra of different wavelengths for a green LED (w post).

The frequency characteristics of the electro-optical-electro channel are measured for all LED chips as shown in FIG. 35. As can be observed, the frequency responses of blue and red chip of RGB LED are almost the same, and the green chip and the P-LED behave similarly. The bandwidths around 20 dB point of the two groups are about 25 MHz and 30 MHz, respectively. Noting that the higher frequency is fast fading, equalization at frequency domain is needed. According to the channel knowledge, pre-equalization has been designed and applied. The amplitudes of the 64 sub-carriers are appropriately pre-equalized. The electrical spectra of the received signals with (w) and without (w/o) equalizations at each wavelength are measured by Spectrum Analyzer HP8562 A depicted in FIGS. 36A-36I (the spectra with post-equalization are offline processed). The spectra of each sub-channel are much more flatten after using pre-equalization and post-equalization. The power ratio of sub1 to sub2 is precisely assigned to obtain an optimal performance.

Figure 37:
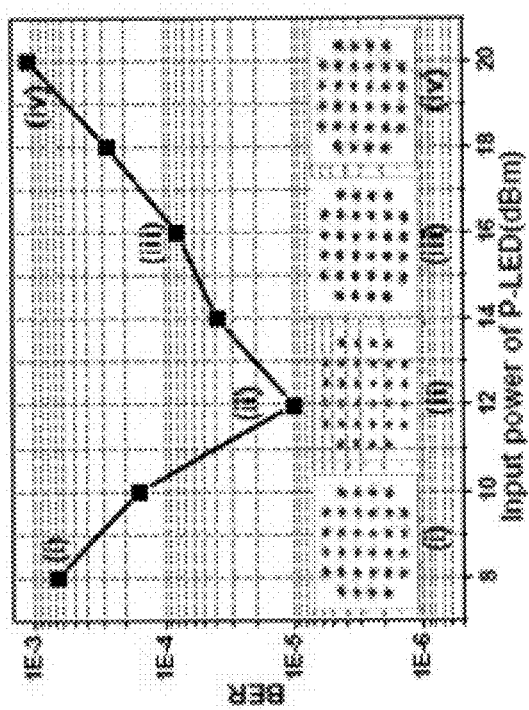
FIG. 37 shows the measured BER versus input power of P-LED.

Then, the nonlinearity effect introduced by LED chips is observed. As these two types of LEDs behave similarly on nonlinearity, P-LED is taken for discussion. In this demonstration, sub-channel1 of P-LED is utilized. The input power of P-LED is varied from 8 dBm to 20 dBm with 2-dB step, and the results are presented in FIG. 37. As can be seen, the optimal input power is 12 dBm. A lower input power will reduce the signal-to-noise-ratio (SNR) and cause low modulation depth, while a higher one will cause nonlinearity and clipping. The same conclusion can be reached from the constellation diagrams inserted in FIG. 37. The nonlinearity should be addressed by current source driver instead of voltage source driver or adopt nonlinearity compensation. In this experiment, the input power of P-LED is fixed at 12 dBm. The calculated modulation indexes of these three chips are all 1.

Figures 38A, 38B:
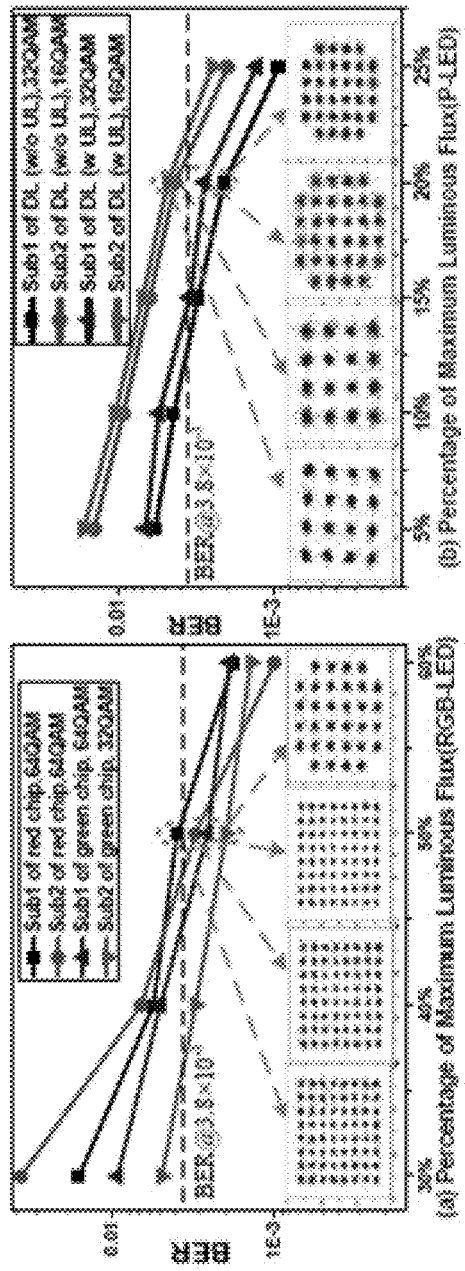
FIG. 38A shows the measured BERs of downlink.
FIG. 38B shows the measured BERs of uplink.
Figure 39:
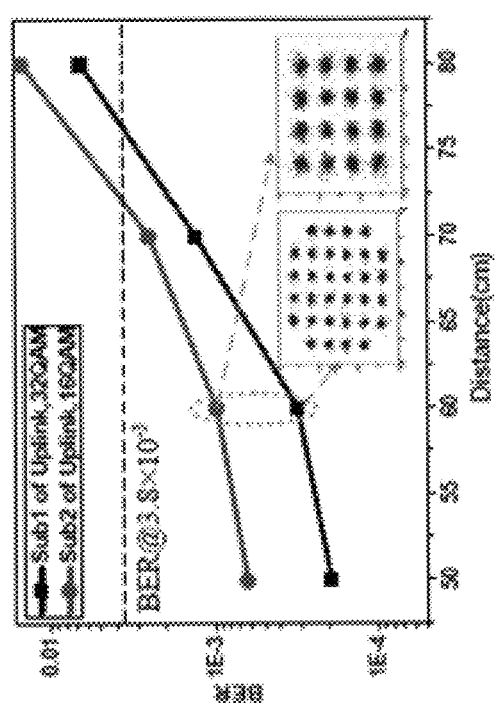
FIG. 39 shows the measured BERs of uplink versus distance.

Finally, the measured BERs (by comparing the received data and transmitted data) versus different luminous flux of all chips are presented in FIGS. 38A-38B. For downlink, the luminous flux of each chip is set at no more than 60% of the maximum luminous flux of each chip with red chip is 30.6 lm and green chip is 67.2 lm. The illuminances through filters at the receiver side of both links are all below 350 lx. It can be seen that all BERs of four channels at downlink and two channels at uplink can be below the pre-FEC limit of $3.8 \times 10^{-3}$. At the red and green wavelengths, the BERs of sub1 and sub2 are almost the same, while at the blue wavelength the BER of sub1 is around 0.3 dB degradation than sub2. The cross talk caused by bi-directional transmission is also analyzed. As the uplink and downlink behave similarly, the uplink was chosen for discussion. FIG. 38B shows the BER performance of uplink with and without downlink. It can be easily seen that there is almost no degradation, which shows that the cross talk is quite low. The BER performance versus different distances is also discussed. As both links behave similarly, uplink is taken for discussion. The results are shown in FIG. 39. The BER performance will be degrade as the distance become longer. And the distance can be much longer by employing multiple chips. In this proposed scheme, the same modulation format for the individual sub-channel is adopted for system simplicity. However as the frequency response of the LED is not flatten, one can use adaptive modulation format for different sub-carriers. In this way the maximum data rate would be further improved.

iv. Conclusion

This section reports a bi-directional VLC system based on a commercially available RGB-LED, a P-LED and a low-cost photodiode. A data rate of 225 Mb/s upstream and 575 Mb/s downstream transmissions enabled by SCM, WDM and QAM-OFDM has been achieved. Pre- and post-equalization at frequency domain has been adopted to compensate the distortions. A four-user access for downlink and one-user access for uplink can be achieved. The crosstalk of bi-directional transmission is also analyzed. BERs of all channels are under pre-FEC limit of $3.8 \times 10^{-3}$ after 66-cm free-space transmission. Moreover, the capacity of downlink and uplink can be easily dynamically reconfigured by adjusting the bandwidths and modulation formats of sub-channel. The results show that this scheme is a good candidate for bi-directional transmission in the real VLC system.

C. Time-Domain Digital Pre-Equalization for Bandlimited Signals Based on Receiver-Side Adaptive Equalizers This section theoretically and experimentally investigates a time-domain digital pre-equalization (DPEQ) scheme for bandwidth-limited optical coherent communication systems, which is based on feedback of channel characteristics from the receiver-side blind and adaptive equalizers, such as least-mean-squares (LMS) algorithm and constant or multi-modulus algorithms (CMA, MMA). Based on the proposed DPEQ scheme, its performance is theoretically and experimentally studied in terms of various channel conditions as well as resolutions for channel estimation, such as filtering bandwidth, taps length, and OSNR. Using a high speed 64-GSa/s DAC in cooperation with the proposed DPEQ technique, band-limited 40-Gbaud signals was successfully synthesized in modulation formats of polarization-diversion multiplexed (PDM) quadrature phase shift keying (QPSK), 8-quadrature amplitude modulation (QAM) and 16-QAM, and significant improvement in both back-to-back and transmission BER performances are also demonstrated.

i. Introduction

With the advent of high speed digital-to-analog converter (DAC), signal generation based on DAC becomes an attractive method due to the simple configuration and flexible signal generation capability, and it has been attracting a great deal of interest in recent years for the transmission of 100G and beyond. DAC for signal generation allows the software defined optics (SDO) with arbitrary waveform generation, which can be used for signal software switch in different modulation formats. On the other hand, it also allows the digital signal processing (DSP) at the transmitter side (TX) with pre-compensation or pre-equalizations. One of the first electronic pre-equalization technologies for chromatic dispersion was demonstrated in 5,120 km transmission for a 10 Gb/s Differential Phase Shift Keying (DPSK) system. In order to achieve high speed signal generation, the industrial research communities have made great effort to increase the bandwidth and sample rate of DAC.

However, the 3-dB analog bandwidth of state-of-the-art DACs is still much less than the half of its sample rate, which means that the generated signals suffer the distortions caused by the bandwidth limitation, especially for generated signals with high baud rate. Meanwhile, when it operates at high baud rate, other opto-electronic devices, such as the electrical drivers and modulators which work beyond their specified bandwidth, can further suppress the signal spectrum. Due to such cascade bandwidth narrowing effect, the system performance is seriously degraded by inter-symbol interference (ISI), noise and inter-channel crosstalk enhancement. Electrical domain pre-equalization for the bandwidth-limitation impairments, which is a well-known technique in optical communication, has been widely utilized in recent publications. The first pre-equalization of the filtering penalty for the 43 Gb/s optical DQPSK signals is reported using DAC. In previous works, zero-forcing frequency domain equalizations are carried out to pre-equalize the linear band-limiting effects. The inverse transfer function of DAC and other opto-electronic devices is measured by calculating the fast Fourier transform (FFT) of both transmitted and received binary data using a known training signal sequence. However, from the perspective of system implementation, such approach may not be easily utilized in current 100G or 400G systems since an additional DSP block at the receiver needs to be developed to deal with the channel estimation. Furthermore, to remove the fluctuation caused by signal and noise randomness, more than 100 measurements are required to be carried out for averaging. Also, strict time-domain synchronization is also required. On the other hand, to increase the measurement accuracy in the high frequency region, the spectrum of the De Bruijin binary PSK signal needs special process with pre-emphasized.

Alternatively, a time-domain pre-equalization method can be a good solution. In most band-limited systems, adaptive equalizers are used for ISI equalization at the receiver side (post-equalization). Theoretically, in a zero-ISI system, the receiver-side linear adaptive equalizers approach the channel inverse within the sampling rate of equalization taps, to compensate the bandwidth limitation. In fact, this channel inverse is also effective for pre-equalization. It is worth noting that, the channel used here describes the transfer function of the transmitter hardware, but not the outside plant of the transmitter. The linear equalizers used in the receiver side is a good tool for channel estimation, which has been employed in digital cable television (CATV) and wireless transmission system for pre-equalizations. Significant signal BER gain can be obtained using this method. Numerical results in also show that the pre-equalization outperforms post equalization only in band-limited system with narrowband filtering impairments. In optical coherent communication system, such as constant modulus algorithm (CMA), multi-modulus algorithm (MMA) or decision-directed least-mean-squares (DD-LMS), these adaptive equalizers' transfer function is naturally modeled with the inverse Jones matrices of the channel. However, when there is no polarization mode dispersion (PMD), the frequency response of these adaptive equalizers is just the inverse transfer functions of the channel. With this feature in mind, one can simply get the inverse of channel transfer function for pre-equalization. Since the adaptive equalizers are blind to the data pattern, there is no need to do data pattern alignment. Only clock recovery is need for symbol synchronization. Compared to the prior arts, the proposed method, featuring no additional DSP, no precise symbol alignment, is advantageous for system implementations. Using this scheme, recently the improved performance for DAC generated signals was demonstrated. A band-limited 480-Gb/s dual-carrier PDM-8QAM transmission has been realized and the BER performance improvements have been demonstrated by experimental results.

Figure 40:
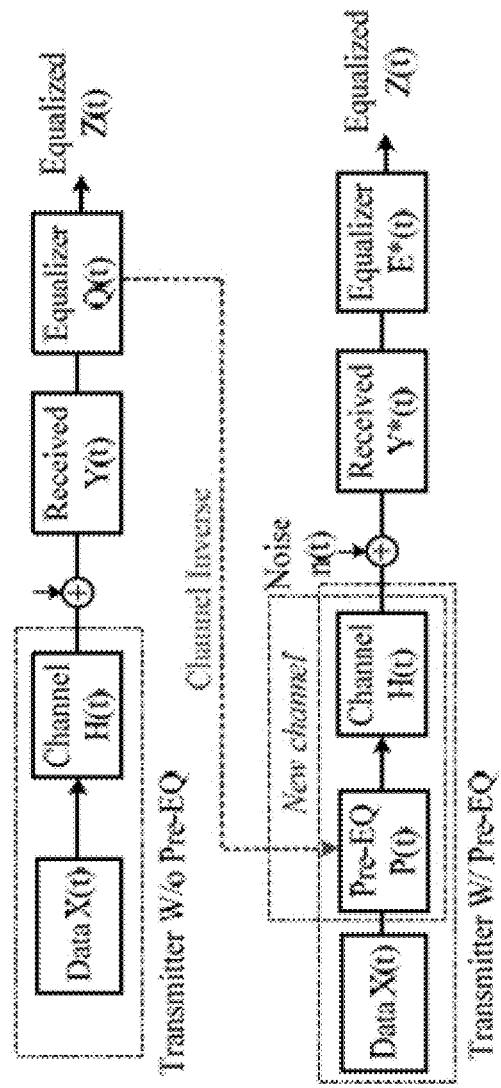
FIG. 40 shows the principle of the proposed pre-equalization by leveraging the inverse channel information given by the receiver-side adaptive equalizer.

This section extends the study by both theoretical analysis and experimental demonstration on this digital pre-equalization (DPEQ) scheme for bandwidth-limited signals in optical communication systems. The linear pre-equalization is based on the receiver-side blind and adaptive equalizers for channel estimation, such as least-mean-squares (LMS) algorithm and constant or multi-modulus algorithms (CMA, MMA). Based on the proposed channel estimation scheme, the DPEQ performances was theoretically and experimentally studied under different implementation conditions, such as filtering bandwidth, taps length and OSNR. For bandwidth-limited systems, improved bit-error ratio (BER) performance can be obtained by using DPEQ compared with post-equalization only scheme. As a proof of the concept, the performance improvements by DPEQ are demonstrated by both simulation and experiment results. By using the high speed 64 GSa/s DAC with pre-equalization, both improved back-to-back and transmission BER performances of 40-Gbuad polarization-diversion multiplexed (PDM) quadrature phase shift keying (QPSK), 8-quadrature amplitude modulation (QAM) and 16-QAM are obtained.

ii. The Principle of Digital Time-Domain Pre-Equalization Based on Receiver-Side Adaptive Equalizer ii.a. The Principle of DPEQ FIG. 40 shows the principle of the proposed pre-equalization by leveraging the estimated inverse channel given by the receiver-side adaptive equalizer, which comes with two stages. The first stage is the channel estimation, where a data X(t) without pre-equalization is transmitted and passes through the channel H(t). The channel is band-limited with a channel response of H(t), which cause the signal distortion with ISI due to the narrow filtering effect. In a coherent optical system, such channel response H(t) represents an end-to-end transfer function taking the analog bandwidths of the DAC, the driver, the modulator at the transmitters, and that of the photo-detector and the analog-to-digital convertor (ADC) at the receivers into consideration. Again, it is worth noting that, the channel used here describes the transfer function of the transmitter hardware, but not the outside plant of the transmitter.

Assuming the noise n(t) is additive white Gaussian noise (AWGN), then the received signal can be expressed as $$Y(t)=X(t)*H(t)+n(t) \quad (1)$$

The received signal Y(t) suffers distortions with ISI caused by bandwidth limitation. To compensate the channel distortion, a linear filter with adjustable taps can be employed to equalize the received signal $$Z(t)=Y(t)*Q(t)=X(t)*H(t)*Q(t)+n(t)*Q(t), \quad (2)$$

where Z(t) is the equalized signal. Q(t) is the impulse response of an adaptive linear equalizer for channel equalization. Q(t) can be implemented using either zero-forcing or minimum-mean-square-error (MMSE) criterions. In practice, MSE-criterion equalizers are better and are more widely used since the zero-forcing equalizers may result in noise amplification. Here, Q(t) is chosen as a MSE-criterion based equalizer using stochastic gradient algorithms, such as CMA and LMS. These two algorithms are widely adopted in optical coherent communication system. Since CMA- and LMS-based equalizers take both ISI and noise into account in the filter taps updating, the final goal is to find the optimal filter Q(t) having minimum MSE. In this case, the noise can be minimized in order to obtain the exact channel response. Assuming the noise n(t) is small and negligible, the noise part in Eq. (2) can be removed and have $$Z(t) \approx X(t)*H(t)*Q(t) \quad (3)$$

Therefore, it is clear that Q(t)=H(t)−1 if Z(t)=X(t). In this case, H(t)*Q(t)=1. It shows that, the equalizer is the channel inverse when the noise is small. More specifically, in practice, the ISI is limited to a finite number of samples in real channels. Therefore, the channel equalizer is approximated by a finite duration impulse response (FIR) with symbol-spaced or fractionally spaced taps.

Considering the common CMA or DD-LMS equalizer in coherent optical communication system, in which four T/2-spaced FIRs are used as the channel equalizer with T-spaced updating and detector loop. The error function is approaching zero during the convergence, therefore, ISI can approach zero at the T sampling points when noise is negligible.

Since only T sampling points are calculated during the updating and convergence, the output symbols of equalizer Q(t) after convergence (ISI is 0 at the T sampling points) can be expressed as $$Z(t)=X(kT)*X_N(t) \quad (4)$$

where XN(t) is a Nyquist pulse-shaping criterion filter, and comparing Eqs. (3) and (4), $$Q(t) \approx H(t)^{-1}*X_N(t) \quad (5)$$

In frequency domain, the response of the equalizer Q(t) can be expressed as $$Q(f) \approx 1/H(f) |f| < 1/2T \quad (6)$$

Here the H(f) is the frequency response of the bandwidth-limited channel. It shows that the frequency response of the equalizer is the inverse of the channel response H(f) within the Nyquist bandwidth when the noise is negligible. In this way, for the T/2-spaced DD-LMS with T-spaced detection and updating loop, the channel response within Nyquist bandwidth can be estimated, otherwise, it approaches 1. Therefore, a time-domain pre-equalization method can be employed based on the receiver-side adaptive equalizer. For optical coherent transmission system, one can simply records the FIR tap coefficients the output of those commonly-used linear equalizers (such as CMA, CMMA and DD-LMS equalizers), and feedback that information to the transmitter for pre-equalization.

Note that the analysis above excludes the factor of noise, which, however, represents in real systems. On the other hand, the performance of channel estimation by adaptive filter is significantly affected by the filter taps length and also the OSNR in channel. Therefore, considering all the factors, the channel inverse calculated by adaptive filter taps is a function of channel response, noise level, taps length, which can be expressed as $$Q(f)=F[H(f) \cdot N_0 \cdot L], \quad (8)$$

where $N_0$ is the AWGN power spectrum density and L is the taps length. These factors should be considered in practical implementation.

The benefit of the pre-equalization can be proved by the smaller MSE of the recovered signal compared with post-equalization-only case in symbol detection systems. Assuming filter taps is long enough and the step size is small enough, one can obtain an optimal filter taps, which has the minimum MSE based on the MMSE criterion algorithms as $$Q(f)_{MMSE}=1/(N_0+H(f)) |f|<1/2T \quad (9)$$

The minimum MSE achievable by a linear equalizer using above optimal filter is given by $$MSE_{min\_post-eq}=T\int_{-f/2}^{f/2} N_0/[N_0+H(f)]df \quad (10)$$

The minimum MSE determined by the noise power and also the channel response. The minimum MSE can be very large even with linear equalizations when the H(f) is small, which means the bandwidth of channel is significantly limited. For pre-equalization case, assuming the channel response is exactly estimated as Eq. (7), the bandwidth limitation can be fully compensated. In this way, the new channel response including the pre-equalization is Hpre(f)=Q(f)H(f)=1. Therefore, the minimum MSE can be given by $$MSE_{min\_Pre-eq}=T\int_{-f/2}^{f/2} N_0/[N_0+1]df \quad (11)$$

Therefore, the minimum MSE of pre-equalization case is smaller than post-equalization only case when the channel is bandwidth limited with narrow filtering effect. Lager gain can be obtained using the pre-equalization for narrower filtering bandwidth. Equation (8) gives a qualitative analysis of the factors that affect the estimation results. The estimated channel response is determined by the OSNR, taps length and bandwidth. The required OSNR or taps length can be different under different BER tolerance and different channel response. One should adjust and optimize these factors for practical use.

ii.b. Implementation of DPEQ for Coherent Optical System

Figure 41:
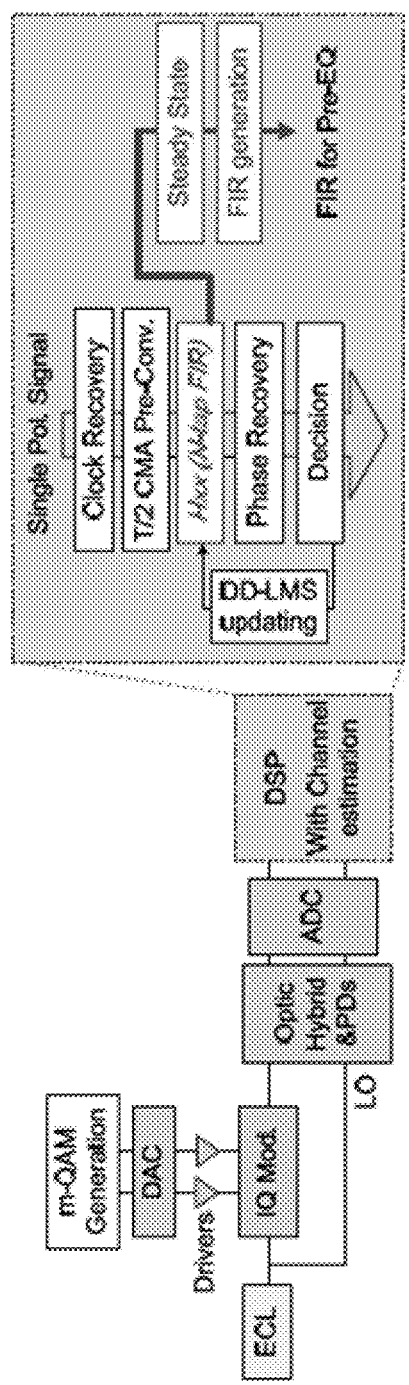
FIG. 41 shows the principle of channel estimation for the adaptive pre-equalization based on DDLMS.

FIG. 41 shows the principle of channel estimation for the proposed DPEQ at the transmitter. The linear pre-equalization is based on the receiver-side blind and adaptive equalizers for channel estimation. The DAC is first used to generate the mQAM data without pre-equalization for channel estimation. Since the bandwidth limitation impairment is mainly caused by the DAC, the electrical drivers, the modulator, the receiver-side PDs and the analog-to-digital converter (ADC), only single-polarization signal is used to avoid the polarization crosstalk. One continuous-wave (CW) lightwave external-cavity-laser (ECL) is used as both the signal source and the local oscillator (LO) for the self-homodyne coherent detection. In this case, the traditional post-equalization methods for polarization demultiplexing, e.g., CMA and DD-LMS, are actually the channel equalizers for the bandwidth limitation impairment, which can be used for channel estimation. The amplitude frequency response of these equalizers is the inverse transfer function of the channel. The DD-LMS loop, which is after CMA for pre-convergence, consists of four complex-valued, Ntap, finite-impulse-response (FIR) filters for equalization. After convergence, these FIR filters achieved the steady state. After normalization and frequency symmetrization, the time domain FIR for pre-equalization can be regenerated. It is worth noting that, although the m-QAM data is used as training sequence, the symbol information does not need to be known. The only information needed for the training sequence is the modulation formats. On the other hand, as analyzed in section 1, in order to get the highly accurate channel response, the noise should be kept negligible. Thus, the channel estimation can be implemented under high OSNR condition using back to back (BTB) measurement. Since the channel estimation is based on the commonly-used linear equalizers in regular coherent receiver-side DSP, the proposed method, featuring no additional DSP, is promising for system implementation.

iii. Numerical Simulation Results

To investigate the performance of DPEQ for band-limited signal in optical coherent system and the impact of different implementation conditions, such as the filtering bandwidth, OSNR, receiver-side adaptive equalizer tap length, step value and modulation formats, a numerical simulation model is firstly setup to emulate various operating situations. The system setup configuration consists of both DSP units and electro and optical components at transmitter (Tx) and receiver (Rx) sides for the DPEQ.

iii.a. System Model Setup

Figure 42:
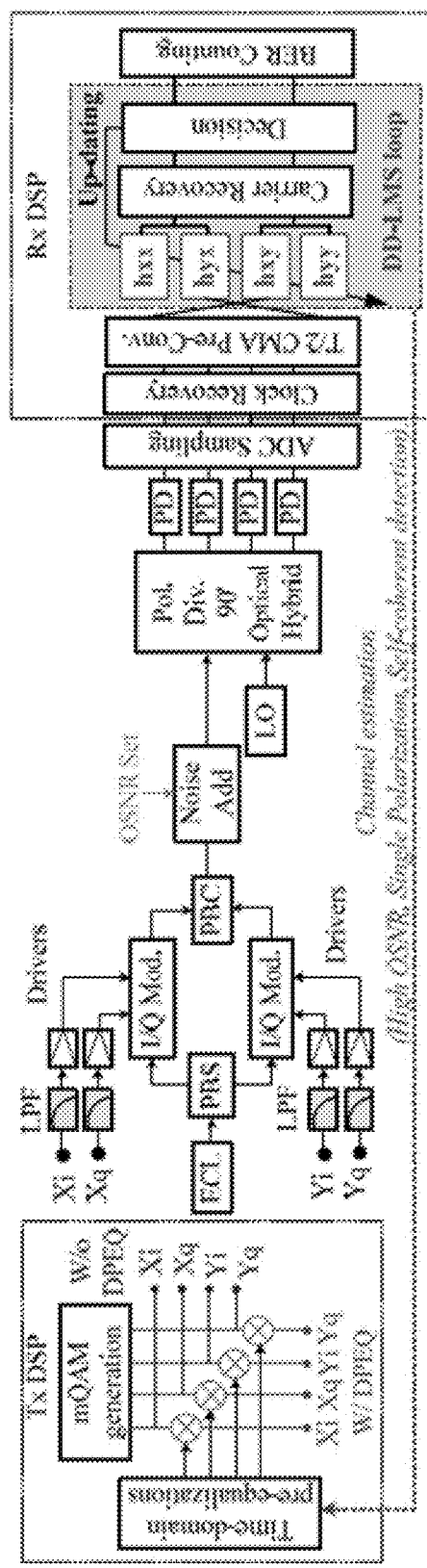
FIG. 42 shows the simulation system setup for the digital pre-equalization based on receiver-side adaptive equalizer in optical coherent system.

FIG. 42 shows the numerical simulation model setup for DPEQ based on receiver-side adaptive equalizer using commercial optical simulation software. The input data consists of 4 components (Real and imaginary data in X and Y polarizations). These data components drive two I/Q modulators for signal modulation. The data components are generated by using Tx DSP without and with DPEQ as shown in FIG. 42. For data without DPEQ, the data components are generated by mQAM mapping. For DPEQ case, a time-domain pre-equalization is applied by convolution with a FIR, which is the inverse of channel response. The I/Q modulators are ideal with two parallel Mach-Zehnder modulators, which are both biased at the null point and driven at linear region. The phase difference between the upper and the lower branch of the I/Q modulator is controlled at $\pi/2$. After modulation, the two polarization signals are combined and transmitted together.

As a proof of concept, two pairs of low-pass filters (totally 4 LPFs) are used after data generation to simulate the bandwidth limitation effect. The LPFs are identical, which are general 3-order Bessel low pass filter with adjusted 3-dB bandwidth. Except the LPFs, other components, such as the driver and I/Q modulator, are ideal without any bandwidth limitation. The electrical drivers are identical and ideal without noise figure. One external cavity laser (ECL) is used as the light source with the linewidth of 100 kHz. The AWGN is added after the polarization multiplexing with different OSNR value.

For the receiver-side, the polarization and phase diversity coherent detection is employed using one polarization diversity optical hybrid and four balanced photo detectors (PDs). One ECL is used as local oscillator (LO) at the same frequency of ECL used in the Tx and linewidth of LO is also 100 kHz. The balanced PDs are based on PIN model with 1 A/W responsivity and $10 \times 10^{-12}$ A/(Hz)$^{0.5}$ thermal noise figure. The bandwidth of the PDs is wide enough with 1× baud rate pass-band. The analog to digital converter (ADC) is ideal with 2× sampling rate. After that, the receiver-side DSP is applied based on the regular optical digital coherent DSP blocks, including clock recovery, the channel equalization and polarization demultiplexing based on T/2 CMA and DD-LMS and carrier recovery. The bit-error-ratio (BER) is measured after the equalizations and decision. In simulation, the data baud rate is set at 32-Gbaud. Errors are counted over 1 million bits, and OSNR is loaded with 0.1-nm noise resolution bandwidth in the simulation model.

For pre-equalization, the implementation is based on the scheme proposed in Section ii.b, where the channel estimation is based on the filter taps of adaptive equalizer (CMA or DDLMS) under the high OSNR, single-polarization, self-coherent detection conditions. Since the four LPFs are identical, the channel estimation for X polarization is the same with Y polarization. The same FIR can be used for the four port Xi, Xq, Yi and Yq data pre-equalization. As analyzed in Section ii.a, the channel estimation performance is a function of channel bandwidth, tap length, and OSNR. Therefore, in the following simulations, the impact of these key factors will be studied.

iii.b. DPEQ Performance Under Different LPF Bandwidth

The DPEQ performance of the 32-GBaud PDM-QPSK signals under different LPF bandwidth is studied and compared with those in the post-EQ only case. To simulate the bandwidth limitation effect, the LPFs is set under different one-sided 3-dB electrical bandwidth (EBW). To obtain the channel response, the channel estimation method proposed in Section ii.b based on the DD-LMS is used.

Figures 43A, 43B, 43C, 43D:
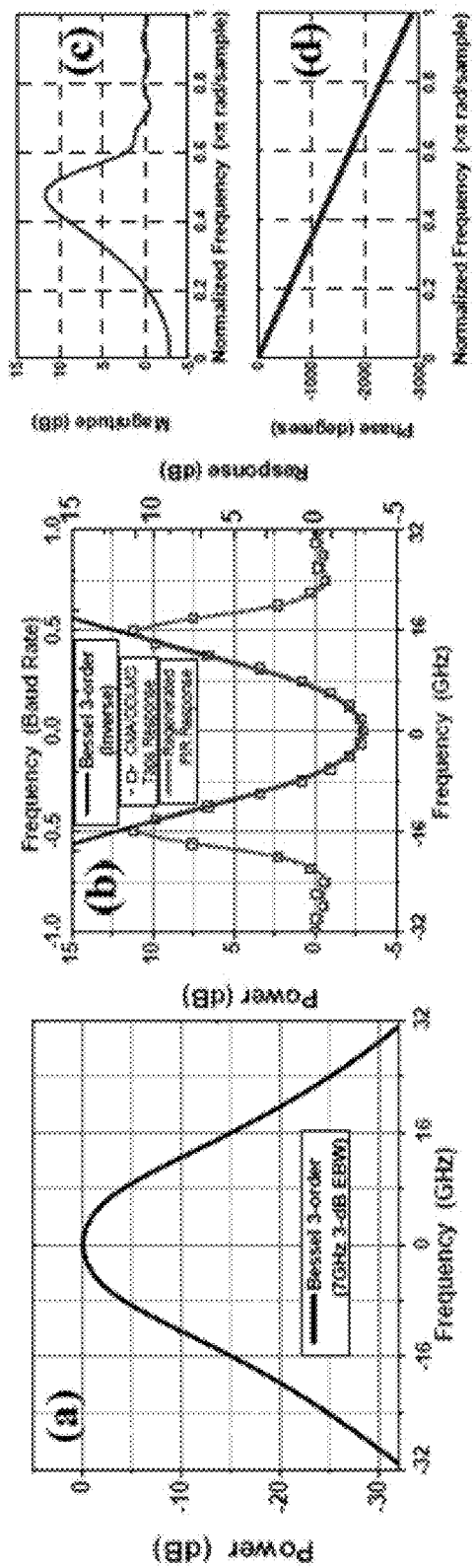
FIG. 43A shows the frequency response of LPF.
FIG. 43B shows the frequency response of DD-LMS taps and regenerated FIR with the ideal channel inverse.
FIGS. 43C and 43D are the magnitude and phase frequency response of DD-LMS taps, respectively.

FIG. 43A shows the transfer function of the LPF with 7-GHz EBW. FIG. 43B shows the frequency response of CMA/DD-LMS and also the regenerated FIR for pre-equalization. The ideal channel inverse of 7-GHz EBW LPF is also plotted in FIG. 43B. The DD-LMS taps response is calculated under 45-dB OSNR and the taps length is 33. The updating step size is set at $5 \times 10^{-4}$. From FIG. 43B, it can be seen that the taps response matches well with the ideal channel inverse using the proposed channel estimation method. Therefore, the generated FIR is used for pre-equalization based on the response of DD-LMS. For QPSK signal, the response of DD-LMS is the same with that of CMA since the constellations of QPSK are within the same modulus. FIGS. 43C and 43D shows the magnitude and phase frequency response of DD-LMS taps. It can be seen that, the phase of the DD-LMS taps is linear. The FIR response shape is liked "M" in FIG. 43B. It is determined by the adaptive equalization scheme used. The T/2-spaced FIR taps are used; therefore, the frequency response can cover a 2Nyquist frequency range (from −32 to 32 GHz for a 32GBuaud signal). However, since only T sampling points are calculated during the updating and convergence, zero-ISI needs only to be achieved at the sampling points and thus the response of the FIR approaches the channel inverse only within the Nyquist bandwidth.

Figures 44A, 44B, 44C, 44D:
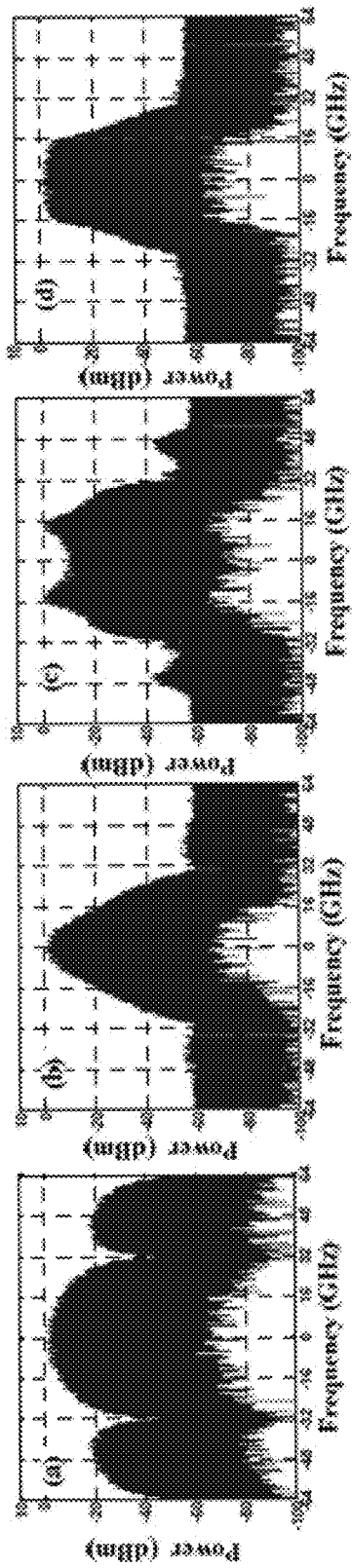
FIG. 44A shows the signal spectrum of an ideal 32GBaud QPSK signal without bandwidth limitation.
FIG. 44B shows the signal spectrum of the 32GBaud QPSK signal under 7-GHz LPF.
FIG. 44C shows the signal spectrum of the 32GBaud QPSK signal with pre-equalization before the 7-GHz LPF.
FIG. 44D shows the signal spectrum of the 32GBaud signal with pre-equalization after the 7-GHz LPF.

FIGS. 44A-44D show the signal spectrum of the 32-GBaud QPSK signals under different stages without and with pre-equalization. The spectrum of ideal 32-Gbaud QPSK signal without bandwidth limitation is shown in FIG. 44A. The spectrum of the 32-Gbaud QPSK signal under 7-GHz LPF is shown in the FIG. 44B. FIGS. 44C and 44D shows the signal with pre-equalization using time-domain FIR shown in FIG. 43B before and after the 7-GHz LPF. It can be seen that, the high frequency components within the Nyquist bandwidth is enhanced after pre-equalization.

Figure 45B:
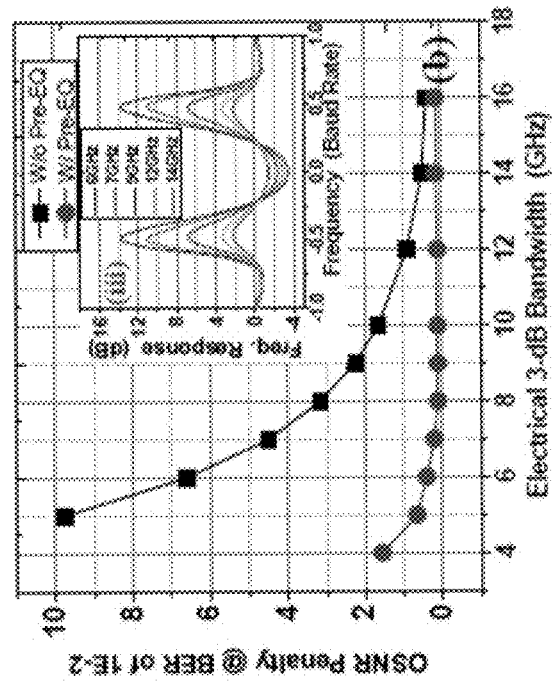
FIG. 45B shows the OSNR penalty at BER of 1×10−2 for 32-GBaud PDM-QPSK signal without and with DPEQ under different filtering bandwidth. Inset (i) is the estimated channel inverse by DD-LMS under different filtering bandwidth.
Figure 45A:
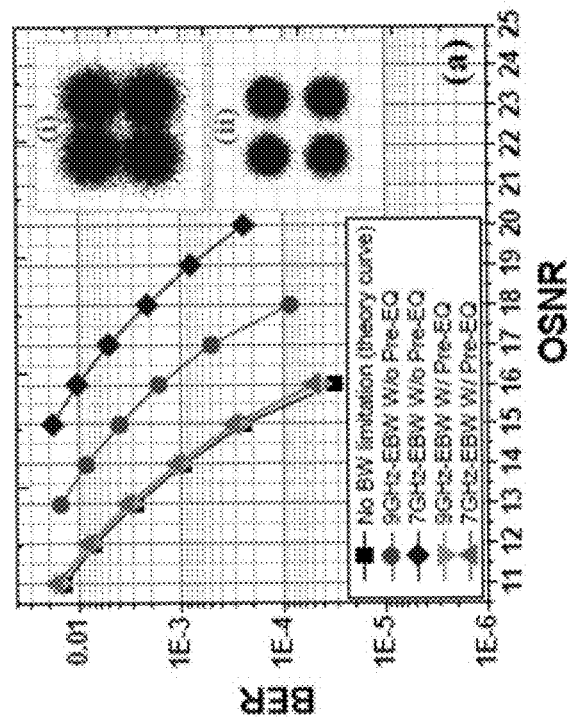
FIG. 45A shows the BER results of 32-GBaud PDM-QPSK signal versus the OSNR with and without DPEQ under different filtering bandwidth. Insets (i) and (ii) show the eye diagrams of signal without and with Pre-EQ for 7-GHz EBW filtering at the OSNR of 16 dB.

FIG. 45A shows the back-to-back (BTB) BER results of the 32-GBaud PDM-QPSK signal without and with DPEQ under different filtering different filtering bandwidth (7-GHz and 9-GHz EBW). Without pre-equalization, the system performance suffers degradation caused by ISI under significant bandwidth limitation as analyzed in Eqs. (9)-(11). There are about 4.5-dB and 2.5-dB OSNR improvements for signal generation using proposed DPEQ for 7-GHz and 9-GHz filtering, respectively. Insets (i) and (ii) show the eye diagrams of recovered signal without and with DPEQ for 7-GHz EBW filtering under the OSNR of 16 dB.

FIG. 45B shows the OSNR penalty at BER of $1\times10^{-2}$ for 32-GBaud PDM-QPSK without and with DPEQ under different filtering bandwidth from 4 GHz to 16 GHz. Inset (i) shows frequency response of generated FIR based on the estimated channel inverse using DD-LMS under different filtering bandwidth. It can be seen that, the OSNR penalty increase with the decrease of LPF bandwidth. The OSNR penalty can be larger than 6-dB when the EBW of LPF smaller than 6 GHz. However, the OSNR penalty in the DPEQ case is still lower than 2 dB even though the EBW is as small as 4 GHz. When using the proposed DPEQ method, the OSNR penalty is lower than 0.5 dB for EBW of LPF lager than 6 GHz. From the results, it can be seen that, large OSNR improvement can be obtained by using the proposed DPEQ method. These simulation results are in good agreement with the theoretical analysis in Section ii.a.

iii.c. The Impact of Adaptive Equalizer Taps Length

As analyzed in Section ii, the inverse channel calculated by adaptive filter is affected by the tap length. In practice, the taps length should sufficiently large enough so that the equalizer spans the length of ISI. However, since the FIR has a finite length, the linear equalizer cannot completely eliminate ISI. However, as the length of taps L increase, the residual ISI can be reduced. Therefore, the inverse channel estimation can be more accurate with longer tap length.

FIGS. 46A-46D show the frequency response of the DD-LMS taps compared with the ideal channel inverse of the LPF with 7-GHz EBW with different taps length in channel estimation. For the 5-taps DD-LMS, the response difference is even larger than 5 dB at the frequency of ±16 GHz (±0.5 Baud rate). It can be seen that, with the tap length increases, the frequency response of DD-LMS matches the ideal channel inverse closer and closer, especially at the high-frequency response within the Nyquist bandwidth.

The pre-equalization performance of the FIR generated by different length of DD-LMS tap under different channel filtering bandwidth is also studied as shown in FIG. 46E. Here, the DD-LMS taps response is calculated at 45-dB OSNR and the taps updating step size is set at $5\times10^{-4}$. The tap length is only changed for channel estimation and DPEQ FIR generation. The OSNR after pre-equalization is kept at 14 dB. For BER measurement, the post-equalization for all cases is the same with 33-taps DD-LMS. Therefore, the performance differences are only influent by the channel filtering bandwidth and the channel estimation tap length. It can be seen that, for 7-GHz channel filtering, the required DD-LMS taps length should larger than 13 for channel estimation and DPEQ FIR generation. For 9-GHz, 9 taps DD-LMS is enough for channel estimation. However, for 6-GHz filtering, the required taps length should be larger than 17. That is, for narrower channels, the required tap length for channel estimation at the adaptive equalizer would be larger. This is because the tap length should be large enough so that the equalizer can cover the length of ISI in order to obtain accurate channel estimation.

iii.d. The Impact of OSNR on Channel Estimation

As analyzed in Eqs. (6) and (9) of Section ii.a, the noise should approach 0 to get the exact inverse channel by using an adaptive equalizer. However, in practice, the noise always exists and cannot be removed. Therefore, the frequency response of adaptive equalizer by MMSE method always has difference with the ideal channel inverse. In this section, the impact of the OSNR on channel estimation is studied in simulation.

Figures 47A, 47B:
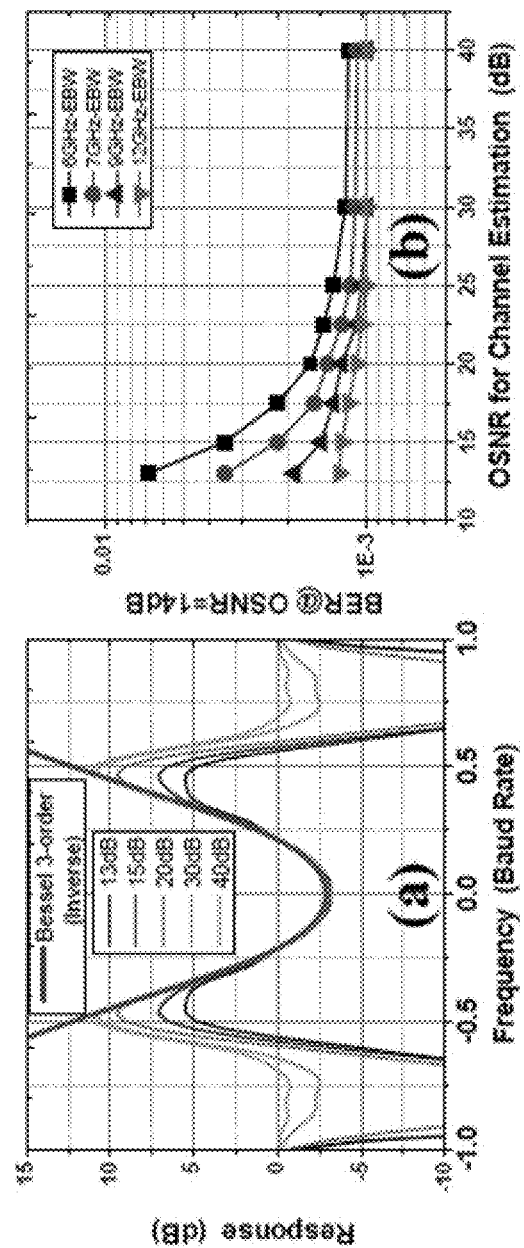
FIG. 47A shows the frequency response of generated FIR based on DD-LMS under different OSNR for channel estimation, compared with ideal channel inverse.
FIG. 47B shows the BER performance of DPEQ based on channel estimation under different OSNR for different channel filtering bandwidth. The BER of 32-GBaud PDM-QPSK signal with DPEQ is measured at OSNR of 14 dB.
Figures 48A, 48B, 48C, 48D:
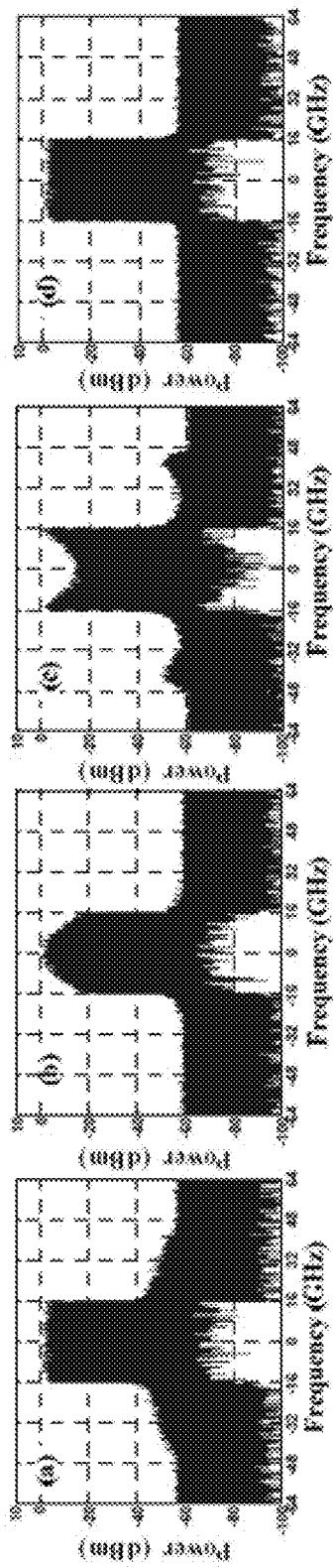
FIG. 48A shows the signal spectrum of a 32GBaud Nyquist-QPSK signal without bandwidth limitation.
FIG. 48B shows the signal spectrum of the 32GBaud Nyquist-QPSK signal under 7-GHz LPF.
FIG. 48C shows the signal spectrum of the 32GBaud Nyquist-QPSK signal with pre-equalization before the 7-GHz LPF.
FIG. 48D the 32GBaud Nyquist signal with pre-equalization after the 7-GHz LPF.

FIG. 47A shows the frequency response of generated FIR based on the DD-LMS taps at different OSNR for channel estimation. As analyzed in Eq. (9), the frequency response of the adaptive equalizer is the inverse of noise-loaded band-limited channel added with noise power. Therefore, as shown in FIG. 47A, the frequency response of FIR under low OSNR is far away from the ideal channel inverse due to the large noise power, especially for high-frequency components with in Nyquist bandwidth. Here, the DD-LMS is kept with a tap length of 33 and the updating step size of $5\times10^{-4}$. When the channel estimation is under OSNR of 13 dB, the frequency response difference compared with ideal channel inverse is larger than 6 dB at the frequency of ±16 GHz (±0.5 Baud rate). The difference decreases with the increase of OSNR for channel estimation. These results are in good agreement with analysis in Section ii.a. FIG. 47B shows the BER performance of DPEQ based on channel estimation at different OSNR for different channel filtering bandwidth. The BER of 32-GBaud PDM-QPSK signal with DPEQ is measured at a fixed OSNR of 14 dB. FIGS. 47A-47B reveal that, first, the DPEQ performance is improved with the increasing of OSNR for channel estimation. It can be proved by the results in FIG. 47B and also the analysis in Section ii, since the response of DPEQ approaches the ideal channel inverse with the decreasing of noise. Second, the noise power has more significant influence on the DPEQ performance when estimating narrower channels. It can be seen that, for 6-GHz filtering bandwidth, the gain of DPEQ is the highest by increasing the OSNR for channel estimation from 13 to 30 dB. Therefore, higher OSNR is required for channel estimation under narrower filtering channel bandwidth.

iii.e. The Pre-Equalization for Nyquist and Super-Nyquist WDM Cases

In above simulation and analysis, the ideal signals are without any spectrum shaping for WDM transmission. For practical use, one may apply nearly rectangular Nyquist for a more tight WDM system. In the Nyquist WDM (N-WDM) system, the carrier frequency spacing is equal to the signal baud rate to form a zero guard-band frequency-division multiplexing. On the other hand, recently, the super-Nyquist WDM (SN-WDM) transmission has also attracted lots of research interest. In the SN-WDM system, one can use narrow spectrum shaping to multiplexing the signals in frequency domain with carrier spacing less than baud rate. To realize the SN-WDM, instead of using pre-equalization to compensate the narrow filtering, one can use additional DSP in the receiver side to suppress the enhanced noise and crosstalk after regular channel post-equalization with the multi-symbol detection, such as maximum-likelihood sequence detection (MLSD). The performance of MLSD with quadrature duo-binary (QDB) processing in filtered optical communication systems, especially for the SN-WDM systems has been previously investigated. Here, a comparison is conducted of the performances with or without pre-equalization using different processing techniques in both single channel and WDM under different carrier spacing.

Using the same implementation of DPEQ for coherent system descripted in section ii.b, the pre-equalization for Nyquist spectrum shaped signals can be done. Using the simulation setup in FIG. 42, the Nyquist signal with roll-off of 0 is sent for channel estimation. FIGS. 48A-48D show the spectrum of 32-GBaud Nyquist QPSK signals under different stages without and with pre-equalization. The spectrums of ideal 32-Gbaud Nyquist QPSK signal before and after the 7-GHz LPF are shown in FIGS. 9A and 9B. FIGS. 9C and 9D shows the signal with pre-equalization using time-domain FIR shown before and after the 7-GHz LPF, respectively.

FIG. 10A shows the frequency response of the DD-LMS taps under the 45-dB OSNR and with tap length of 33. From FIG. 49A, it can be seen that the taps response also matches well with the ideal channel inverse using the proposed channel estimation method. Therefore, the generated FIR can be used for pre-equalization based on the response of DD-LMS.

Figures 49A, 49B, 49C:
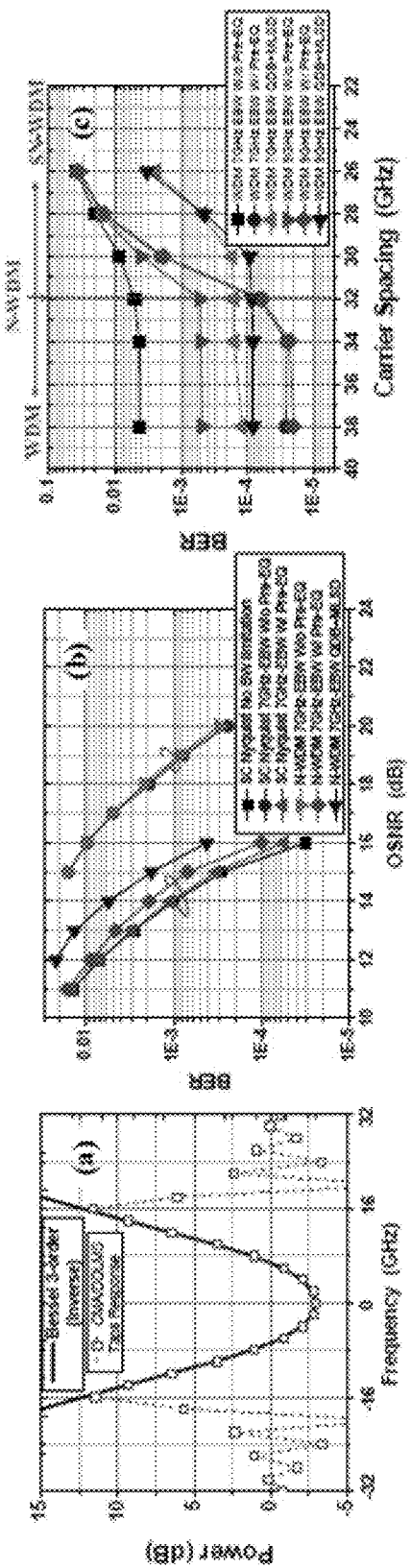
FIG. 49A shows the frequency response of DD-LMS taps with the ideal channel inverse in Nyquist spectrum shaping case.
FIG. 49B shows the BTB BER results versus the OSNR for Nyquist spectrum shaped signal in single channel and N-WDM cases using different processing method.
FIG. 49C shows the BER results for WDM signals under 7-GHz and 9-GHz narrow filtering with different carrier spacing.

FIG. 49B shows the BTB BER results of the 32-GBaud Nyquist QPSK signals versus OSNR in single channel and N-WDM case with or without DPEQ. The carrier spacing is kept at 32-GHz in N-WDM case. The roll-off factor is 0. The BER of N-WDM signals is also measured under the 7-GHz narrow filtering without DPEQ but using the previously reported QDB processing with MLSD as a comparison. Several conclusions can be made from FIG. 49B. First, without pre-equalization, the system performance suffers degradation caused by ISI under significant bandwidth limitation as analyzed above. There are about 4.5-dB OSNR improvements for signal generation using proposed DPEQ for 7-GHz filtering at the BER of $1\times10^{-3}$, with Nyquist spectrum shaping as shown in FIGS. 48A-48D. Second, for the N-WDM case, there is about 0.5-dB penalty due to the channel crosstalk for the signals with DPEQ. Since the signals without DPEQ are greatly suppressed at high spectrum components, the crosstalk is smaller in N-WDM case. Negligible OSNR penalty is observed for the N-WDM signal without DPEQ. However, the BER performance N-WDM signal with DPEQ is still better than that without DPEQ. About 4-dB OSNR improvement are obtained by using DPEQ in NWDM cases. Finally, compared with the results using QDB processing with MLSD, the DPEQ still shows better performances in N-WDM case with 1-dB OSNR improvement. Since the QDB processing with MLSD using additional DSP to equalize the ISI, the BER performance is better than that using only regular QPSK DSP in narrow filtering case. About 3-dB OSNR improvement can be observe under the 7-GHz narrow filtering in N-WDM case as shown in FIG. 49B. However, it is worth noting that the QDB processing with MLSD requires additional DSP with a considerable increase in computational complexity.

The BER results of WDM signals under narrow filtering with different carrier spacing are shown in FIG. 49C. The signal baud rate is kept at 32-GBaud, with roll-off factor of 0 and the carrier spacing is changed from 38 to 24-GHz. As shown in FIG. 49C, the BER performance of pre-equalized signal drops quickly as the channel spacing narrows down with more severe inter-channel interference (ICI) brought by neighboring channels. Therefore DPEQ schemes are not best choice for the situation that strong ICI exists, when the channel spacing is smaller than the baud rate in super-Nyquist WDM cases. For carrier spacing larger than and equal to 32 GHz (WDM or N-WDM cases), the DPEQ shows the best performances under both 7-GHz and 9-GHz narrow filtering. However, for signals in SN-WDM case with carrier spacing less than 32-GHz, the QDB processing with MLSD shows the best performance compared under the narrow filtering. Therefore, the QDB processing with MLSD shows better ICI tolerance capability for SN-WDM cases and it is widely used in previously SN-WDM reports.

iv. Experiment Results

Figure 50:
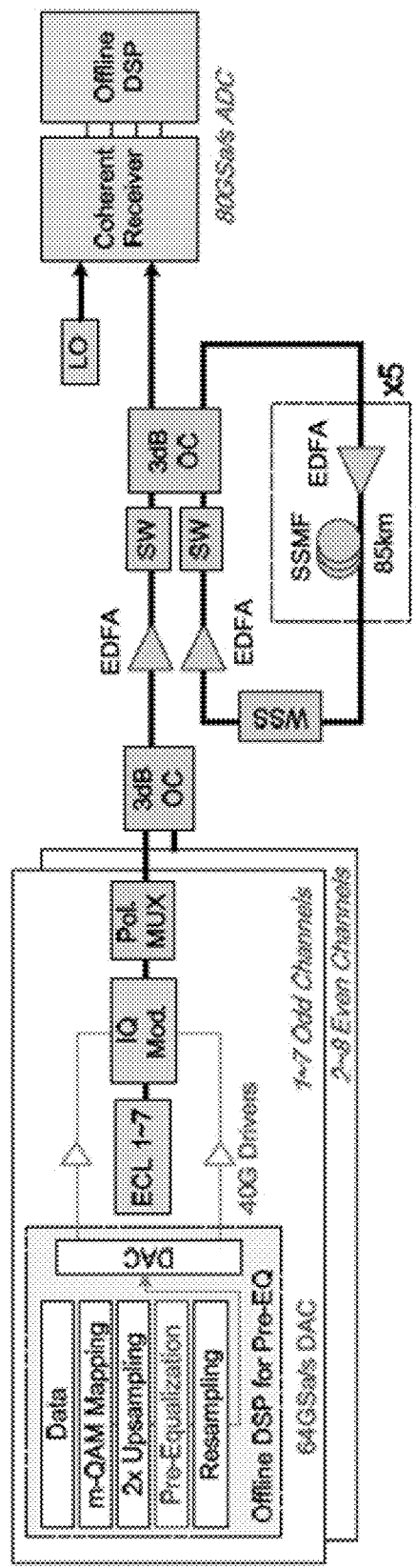
FIG. 50 shows the experiment setup for the 8 channels 40-Gbaud. QPSK/8QAM/16QAM generation with the adaptive pre-equalization and WDM transmission.

As a proof of concept, FIG. 50 shows the experimental setup of the 40-Gbaud PMQPSK/8QAM/16QAM generation based on high speed DAC with adaptive pre-equalization, transmission and coherent detection in a 50-GHz WDM grid. Eight tunable external cavity lasers (ECLs) ECL1 to ECL8 as 8 channels are used in the system with the linewidth less than 100 kHz and the output power of 14.5 dBm. The carrier-spacing of ECLs is 50 GHz. Before the independent in-phase and quadrature (I/Q) modulation, the odd and even channels are implemented with two sets of polarization-maintaining optical couplers (PM-OCs). The QPSK/8QAM/16QAM signals with 40-GBaud are generated by a 64-GSa/s DAC. The 3-dB analog bandwidth of the DAC is about 11.3-GHz. As shown in FIG. 50, the inphase (I) and quadrature (Q) data are generated by the Tx DSP blocks. The transmitted data is firstly mapped to m-QAM (m: 4/8/16), then up-sampled to 2 Sa/symbol. The pre-equalization is implemented to for the up-sampled data to compensate the bandwidth limitation impairment caused by the DAC, the drivers, the I/Q modulator and the ADC. In this case, the DPEQ is implemented and the FIR is obtained by the adaptive scheme as shown in FIG. 41. The polarization multiplexing of the signal is realized by the polarization multiplexer, which comprises a PM-OC, an optical delay line to provide a delay of 150 symbols, and a polarization beam combiner (PBC) to recombine the signal. The even and odd channels are modulated and polarization multi-plexed individually. Then, they are combined by a 3-dB optical coupler. At the receiver side, the polarization and phase diversity coherent detection is employed. Here, the linewidth of receiver-side local oscillator (LO) is around 100 kHz. A digital oscilloscope with the sample rate of 80 GSa/s and bandwidth of 30 GHz is used for analog-to-digital conversion (ADC) before offline processing.

Figures 51A, 51B:
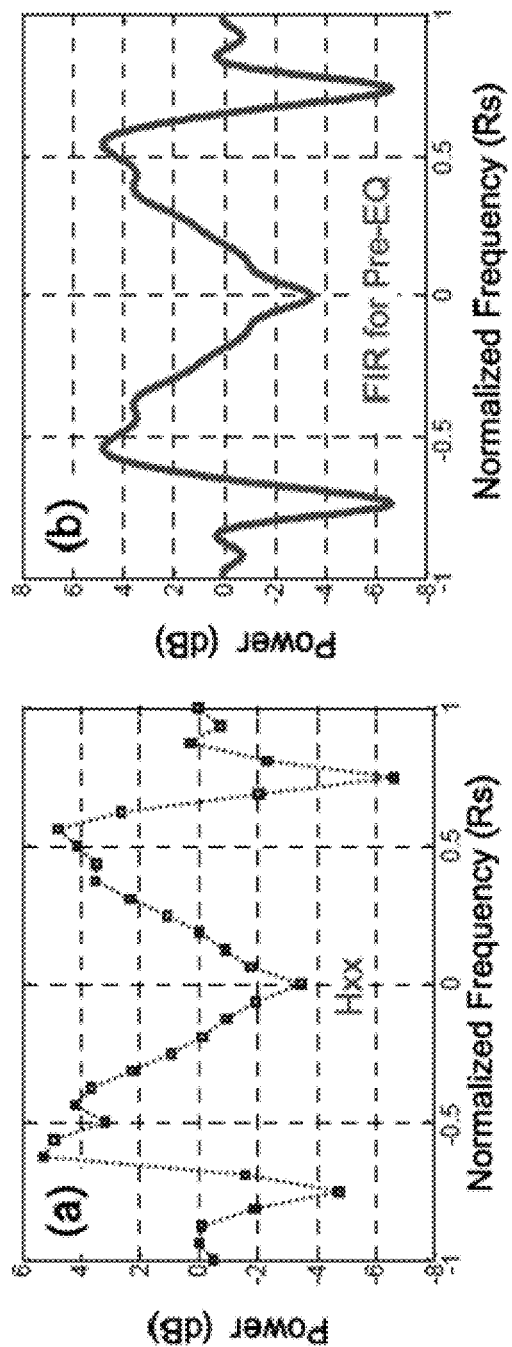
FIGS. 51A-51B show the frequency response of Hxx and regenerated FIR, respectively.
Figures 52A, 52B, 52C:
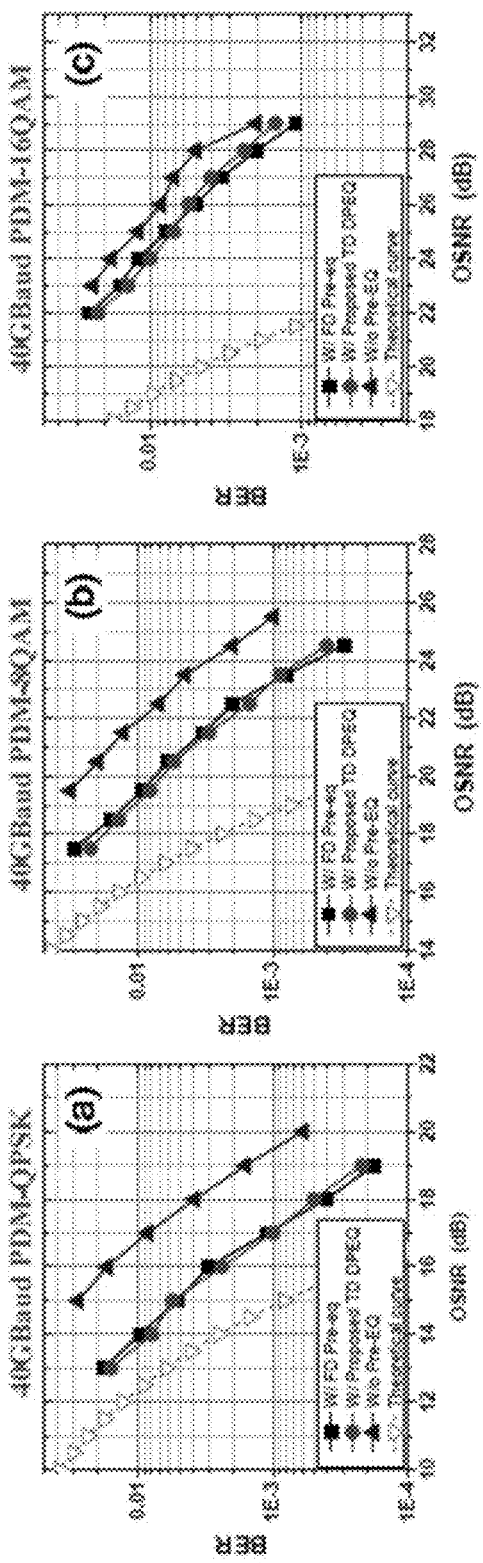
FIG. 52A shows the BTB BER results versus the OSNR with and without pre-equalization for 40-GBaud PDM-QPSK.
FIG. 52B shows the BTB BER results versus the OSNR with and without pre-equalization for 40-GBaud PDM-8QAM.
FIG. 52C shows the BTB BER results versus the OSNR with and without pre-equalization for 40GBaud PDM-16QAM signals.

The results of channel estimation and pre-equalization are shown in FIGS. 51A-51B. First, the 64-GSa/s DAC is used generate the QPSK data without pre-equalization for channel estimation to get the channel transfer function as shown in FIG. 41. Since the bandwidth limitation impairment is mainly caused by the DAC, the electrical drivers, the modulator and the ADC, only single-polarization signal is used to avoid the polarization crosstalk. Self-homodyne coherent detection is applied using the same CW lightwave (ECL1) as both the signal source and the LO source. FIGS. 51A and 51B show the frequency response of 33-taps FIR filter Hxx in DD-LMS and the regenerated FIR for DPEQ, which indicates the inverse transfer functions of the channel. It is worth noting that, the same source is used in channel estimation only for convenience and also easy operation, since no frequency offset is needed for channel estimation. However, it is not the central to this technique, since the frequency offset can be compensated before the channel estimation. Other parts of the experiment, such as back to back and transmission performance measurement are done using different lasers FIGS. 52A-52C show the back-to-back (BTB) BER performance versus the OSNR for single carrier 40-Gbaud PM-QPSK, PM-8QAM, and PM-16QAM signal with and without pre-equalization, respectively. Here, 33-taps FIR filters are used. It can be seen that, about 3.5 dB, 2.5 dB and 1.5 dB OSNR improvement can be obtained at the BER of $1 \times 10^{-3}$ by DPEQ based on DD-LMS method for the 40-Gbaud PM-QPSK/8QAM/16QAM signals, respectively. As a comparison, the theoretical BER curves can also be plotted in these figures. The BER results of signals with a previously reported frequency domain pre-equalization (FD Pre-eq) method are also plotted. The results of the proposed DPEQ has similar performance with the frequency domain method, since both scheme use the signals with very high OSNR for channel estimation. On the other hand, the OSNR penalties compared with the theoretical performances can be observed. About 1.5, 2.5 and 4.5-dB OSNR penalties are observed for signals with pre-equalization compared with the theoretical curves. Since higher modulation formats require higher OSNR and they are more sensitive to the ISI, the pre-equalization shows less effective for the high modulation formats.

Figures 53A, 53B:
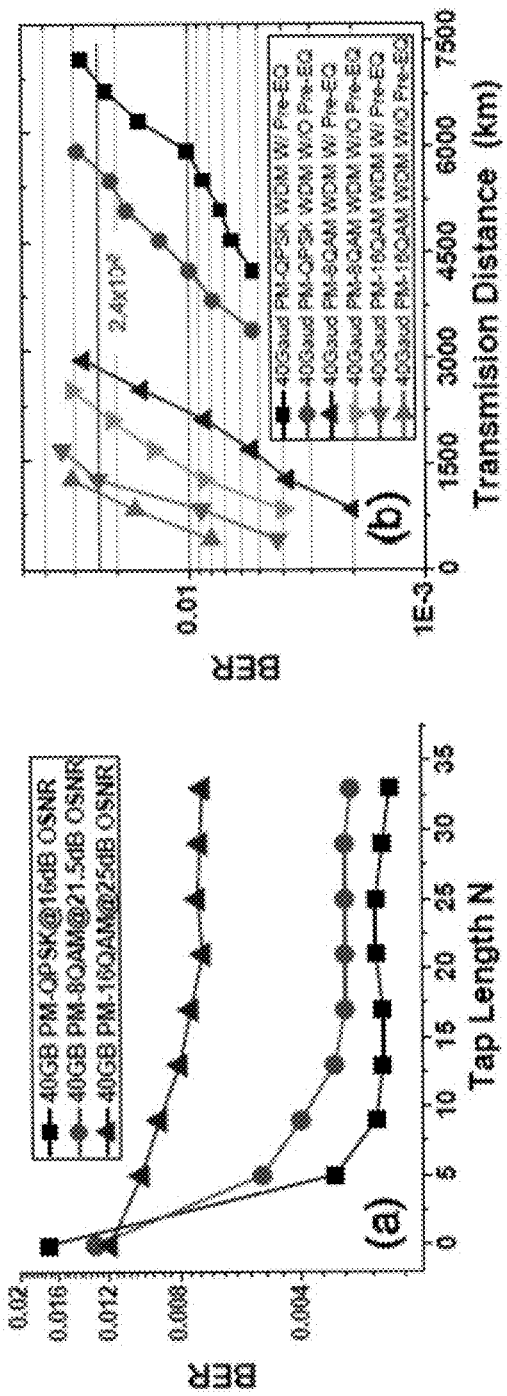
FIG. 53A shows the BTB BER versus the taps length.
FIG. 53B shows the BER of WDM PM-QPSK, 8QAM, and 16QAM signals without and with pre-equalization versus the transmission distance.

FIG. 53A shows the experiment results of BTB BER results of 40-Gbaud PMQPSK/8QAM/16QAM with adaptive pre-equalization versus the tap length N of Hxx used in DD-LMS. Here, the QPSK is kept as the training data modulation format and the OSNR of these signals measured is 16, 21.5 and 25-dB for 40-Gbaud PM-QPSK, 8QAM and 16QAM. From FIGS. 52A-52C, it can be seen that, QPSK is less sensitive to the tap length, and 9 taps is sufficient for pre-equalization. However, higher modulation formats 8QAM and 16QAM requires more taps for pre-equalization.

FIG. 53B shows the transmission BER performance with and without pre-equalization for the 8 channels WDM PM-QPSK/8QAM/16QAM signals. The combined 8 channels WDM signals are launched into a re-circulating transmission loop, which consists of 5 spans of 85-km conventional SMF-28 with average loss of 18.5 dB and chromatic dispersion (CD) of 17 ps/km/nm, loop switches (SWs), optical coupler (OC), and Erbium-doped fiber amplifier (EDFA)-only amplification without optical dispersion compensation. In the loop, one wavelength-selected switch (WSS) programmed as an optical band-pass filter is placed to suppress the ASE noise. The BER of WDM PM-QPSK, 8QAM, and 16QAM signals without and with pre-equalization versus the transmission distance is shown in FIG. 53B. Longer distance can be achieved for signal with pre-equalization. Without DPEQ, the system performance is seriously degraded by ISI, noise enhancement and inter-channel crosstalk due to the bandwidth limitation and filtering effect. The system performance can be improved by reducing these bandwidth limiting impairments using the proposed DPEQ scheme.

Figures 54A, 54B:
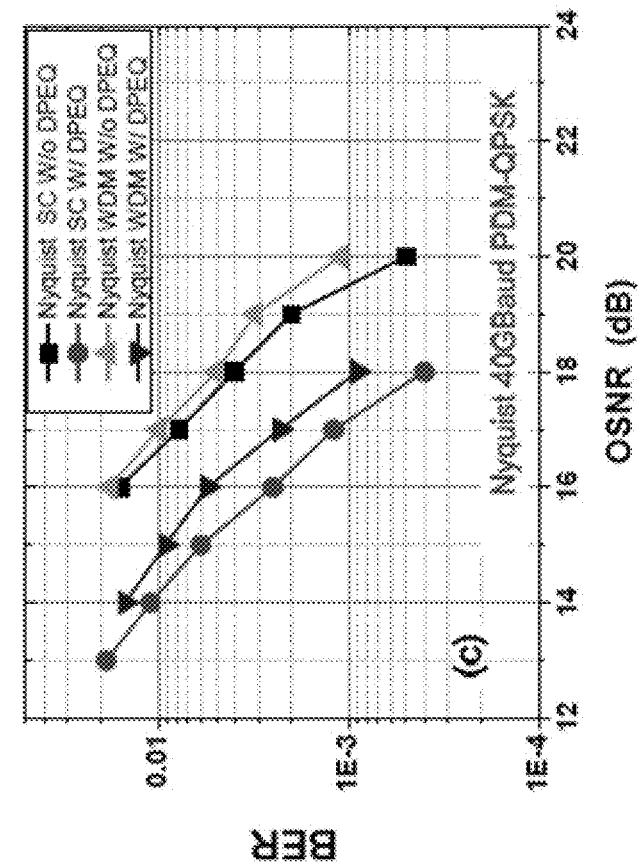
FIGS. 54A and 54B show the FFT spectrum after ADC for 40-GBaud Nyquist QPSK signal (A) without and (B) with DPEQ.
Figure 54C:
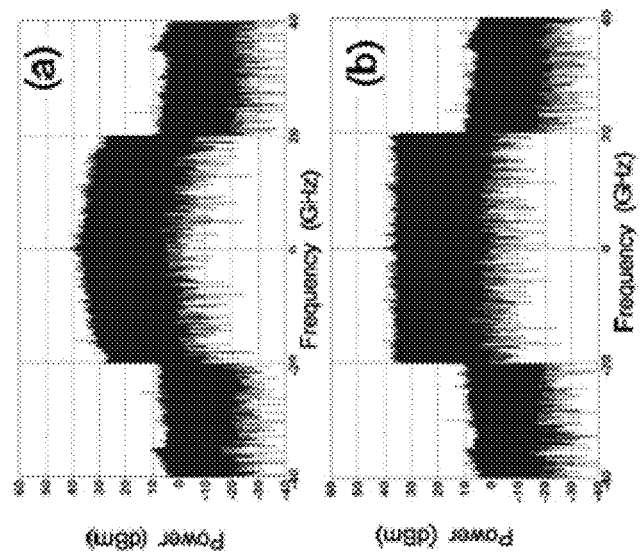
FIG. 54C shows the BER performance of 40-GBaud Nyquist QPSK signals in SC and NWDM cases without and with DPEQ.

Finally, the DPEQ performances are measured for the Nyquist signals in N-WDM cases. The 40GBuad Nyquist signal with roll-off factor of 0 is generated by the 64 GSa/s DAC for test. FIGS. 54A and 54B shows the FFT spectrum of the Nyquist signals after coherent detection and ADC sampling without and with proposed DPEQ, respectively. As shown in FIG. 54B, it can be seen that the Nyquist signals are pre-compensated with flat spectrum shape with DPEQ. FIG. 54C shows the BTB BER results versus OSNR for the Nyquist 40GBaud PDM-QPSK signals in SC and N-WDM cases without and with DPEQ. Again, improved OSNR performances can be observed by using the DPEQ scheme. Therefore, the proposed DPEQ method is also effective for the Nyquist signals in N-WDM case.

v. Conclusions

This section theoretically and experimentally investigates the time-domain DPEQ scheme for bandwidth-limited signals in optical coherent communication systems. Based on the proposed channel estimation scheme, the DPEQ performances are theoretically and experimentally studied under different implementation conditions, such as filtering bandwidth, taps length, and OSNR. For bandwidth-limited systems, improved BER performance can be obtained by using DPEQ compared with post-equalization only scheme. As a proof of the concept, the performance improvements by DPEQ are demonstrated by both simulation and experiment results.

D. Enhanced Performance of Visible Light Communication Employing 512-QAM N-SC-FDE and DD-LMS In this section, a novel hybrid time-frequency adaptive equalization algorithm based on a combination of frequency domain equalization (FDE) and decision-directed least mean square (DD-LMS) is proposed and experimentally demonstrated in a Nyquist single carrier visible light communication (VLC) system. Adopting this scheme, as well with 512-ary quadrature amplitude modulation (512-QAM) and wavelength multiplexing division (WDM), an aggregate data rate of 4.22-Gb/s is successfully achieved employing a single commercially available red-green-blue (RGB) light emitting diode (LED) with low bandwidth. The measured Q-factors for 3 wavelength channels are all above the Q-limit. This is the highest data rate ever achieved by employing a commercially available RGB-LED.

i. Introduction

Recently, white light emitting diodes (LEDs) has attracted more and more attention for simultaneous illumination and visible light communication (VLC). As the main device for next generation illumination, it provides several advantages over traditional incandescent or fluorescent lamp, such as high efficiency, long lifetime and low power consumption. The feasibility of VLC has been both demonstrated by employing red-green-blue (RGB) LED and phosphor-based LED. But one of the technical limits is the intrinsic small modulation bandwidth of commercially LED. Therefore, spectrally efficient modulation scheme such as discrete multi-tones (DMT) and orthogonal frequency division multiplexing (OFDM) have been widely implemented to mitigate the severe frequency response of VLC system. The highest data rate in the case of bi-directional transmission and the record data rate in unidirectional transmission at a distance of 10-cm are achieved by both adopting OFDM. But the high peak to average power ratio (PAPR), frequency offset and phase noise sensitivity of OFDM is main drawbacks.

Previously an alternative VLC modulation scheme using Nyquist single carrier frequency domain equalization (N-SC-FDE) was suggested. This scheme has the similarity of spectral efficiency performance to the aforementioned OFDM technology, but with a reduced PAPR. In SC system, the adaptive equalization is critical. The equalization method can be performed either in time domain such as cascaded multi-modulus algorithm (CMMA) or in frequency domain such as pre-FDE and post-FDE. Generally speaking, time domain equalization typically requires a number of multiplications per symbol that is proportional to the maximum channel impulse response length. FDE appears to offer a better complexity trade-off than time domain equalization when large taps are needed.

This section proposes and experimentally demonstrate a novel hybrid time-frequency adaptive algorithm in an N-SC-VLC system based on a combination of FDE and decision-directed least mean square (DD-LMS). The non-flat frequency response of VLC system can be first mitigated by FDE, and the system performance can be further improved by DD-LMS via symbol decision with an optimum tap number of 33. In this demonstration, the Q-factor performance can be further enhanced at the modulation format of 512-QAM assisted by DDLMS after FDE. 512-ary quadrature amplitude modulation (512QAM) and wavelength multiplexing division (WDM) are also employed in this system. The aggregate data rate of three wavelength channels are 4.22-Gb/s implementing a commercial commercially available RGB LED and an avalanche photodiode (APD) with 3-dB bandwidth of 100 MHz, which are both far below the signals bandwidth of 156.25 MHz. The measured Q-factors for all channels are above the Q-limit.

ii. Principle of QBD-OFDM

Figure 55:
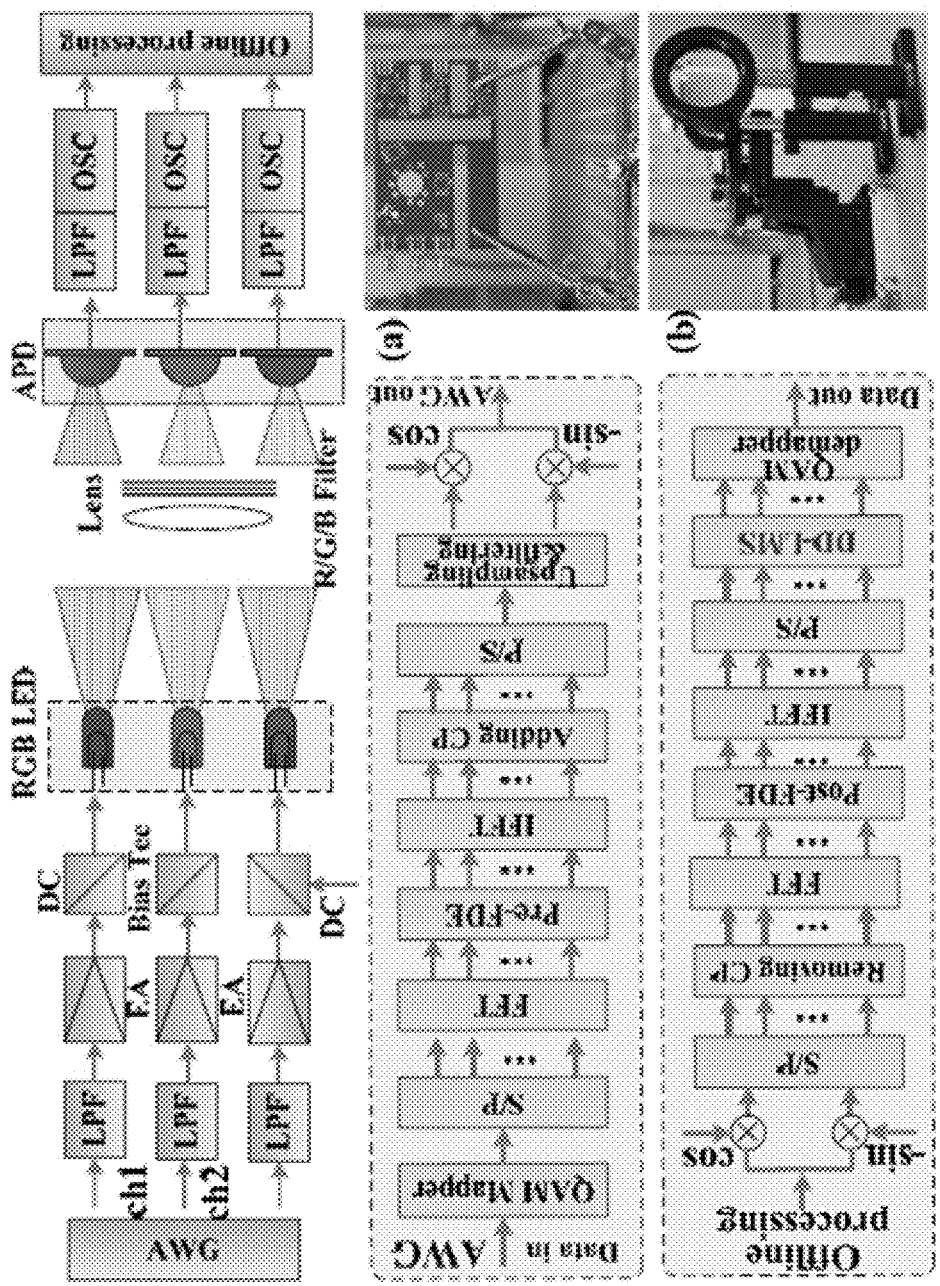
FIG. 55 shows the architecture of the proposed VLC system based on hybrid time-frequency adaptive equalization algorithm (AWG: arbitrary waveform generator, P/S: parallel to serial, EA: electrical amplifier, LPF: low-pass filter, DC: direct current, OSC: real-time oscilloscope).

The architecture and principle of the VLC system with the proposed hybrid time-frequency equalizer is shown FIG. 55. In this demonstration, a commercial available RGB LED (Cree, red: 620-nm; green: 520-nm; blue: 470-nm) generating a luminous flux of about 6 lm used as the transmitters (TXs) and an avalanche photodiode (Hamamatsu, 0.42-A/W sensitivity at 620-nm and gain=1, the maximum gain is 30) used as the receiver (RX) are adopted. The concept of Nyquist SC-FDE is very similar to that of OFDM. If no pre-FDE is employed, the only difference is that, in SC-FDE, the inverse fast Fourier transform (IFFT) block is moved from the transmitter to the receiver. The binary data would be firstly mapped into 512-QAM format and then the training sequences (TSs) are inserted into the signals. After making pre-equalization in frequency domain and up-sampling, cyclic prefix (CP) is added. CP is used to mitigate the multipath distortion. Then the real and imaginary components of signals are multiplied with sine function and cosine functions, respectively.

Low-pass filters are used to remove out-of-band radiation. Subsequently, amplified by electrical amplifier (EA) ((Mini-circuits, 25-dB gain), combined with direct current (DC)-bias via bias tee, and then applied to these three different color chips. Passing through free-space transmission, lens (50-mm diameter) and optical R/G/B filter, the signals are recorded by a commercial high-speed digital oscilloscope (Tektronix MSO5104) and sent for off-line processing.

Figure 56:
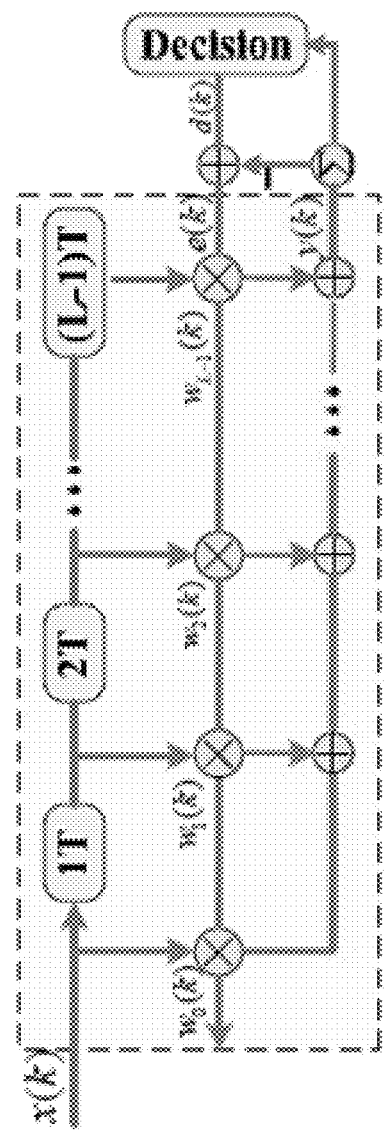
FIG. 56 shows the skeleton structure of DD-LMS equalizer.

At the receiver, after synchronization, resampling and removing CP, a two-fold hybrid time-frequency equalization method jointly employing FDE and DD-LMS is carried out. First, the non-flat frequency response is compensated by FDE via zero forcing (ZF) algorithms, then to switch to DD-LMS equalizer once the bit error rate (BER has dropped to a sufficiently low level around $10^{-1}$ to $10^{-2}$. The signals in frequency domain are transformed to time domain and pass through the DD-LMS equalizer. DD-LMS is a stochastic gradient descent algorithm, and does not depend on the statistics of symbols but rely on the symbol decisions. The skeleton structure of DD-LMS equalizer is illustrated in FIG. 56.

The output y(k) of DD-LMS equalizer with L taps is shown as:

$$y(k)=w^H(k)X(k) \quad (1)$$

$$w(k)=[w_0(k),w_1(k),w_2(k),\ldots,w_L(k)]^T \quad (2)$$

$$X(k)=[x(k),x(k-1),x(k-2),\ldots,x(k-L+1)]^T \quad (3)$$

where X (k) and w(k) represent the input signal and weight vectors, respectively of the $k^{th}$ DD-LMS section. $(\cdot)^H$ denotes the Hermitian matrix of ($\cdot$).

The error signal e(k) and weight vector for adaptive updating DD-LMS at the $k^{th}$ iteration are given by $$e(k)=d(k)-y(k) \quad (4)$$

$$w(k+1)=w(k)+\mu e^*(k)X(k) \quad (5)$$

Of which d(k) is expected output, $\mu$ is the step size, $(\cdot)^*$ denotes the complex conjugate matrix of ($\cdot$). The DD-LMS error term in Eq. (4) assumes zero values at the symbol points and hence the excess mean-squared error (EMSE) is greatly reduced.

iii. Experimental Results and Discussion

The experimental setups are depicted in the insets (A) and (B) of FIG. 55. In this demonstration, the N-SC-FDE signals are generated by Tektronix AWG 7122C with the maximum sampling rates of 24-GS/s and bandwidths of 6-GHz, and detected by an APD with 3-dB bandwidth of 100-MHz. The up-sampling factor is 16, and the sample rates of AWG and OSC are set to 2.5-GS/s and 5-GS/s, respectively. The CP length is set to 1/16 symbol length. In order to obtain the same spectral efficiency as OFDM, a square function with roll factor of 0 is used as the filter in the TX and RX. The square filters are employed in the frequency domain.

Figure 57:
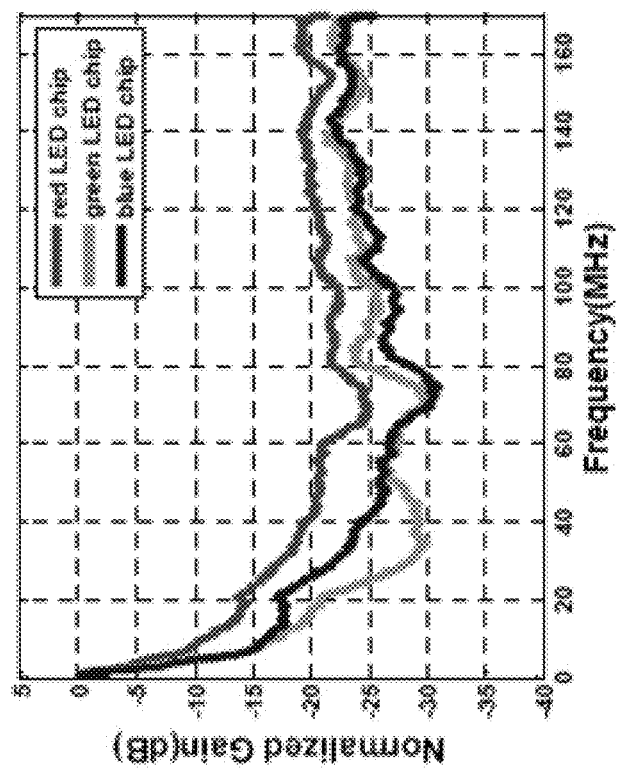
FIG. 57 shows the measured frequency response of three individual VLC links.

First of all, the frequency response is measured of the overall system including LED, bias tee, electrical amplifier, and APD. The results are shown in FIG. 57. From FIG. 57 the gradient of the frequency response is different. However, in order to obtain a relatively flat frequency response, the occupied frequency is starting from 9.76-MHz. Thus, the valid occupied bandwidth of signals is 156.25-MHz ranging from 9.76-MHz to 166.01-MHz. It should be noted that the voltages of bias tee and amplitudes of signals are finely adjusted to render the whole system work at the quasi-linear region of LED. And the mean signal to noise rate (SNR) of red, green and blue LED chips is 30-dB, 25-dB and 25-dB, respectively.

The measured spectra of original SC-FDE signals from the output of AWG, captured signals after red/green/blue LED transmission are depicted in FIGS. 58A-58D, respectively. Compared with the original spectrum, the high frequency components of transmitted signals have larger power attenuation. This is mainly caused by the frequency attenuation of indoor channel and bandwidth limitation of APD.

Figure 59:
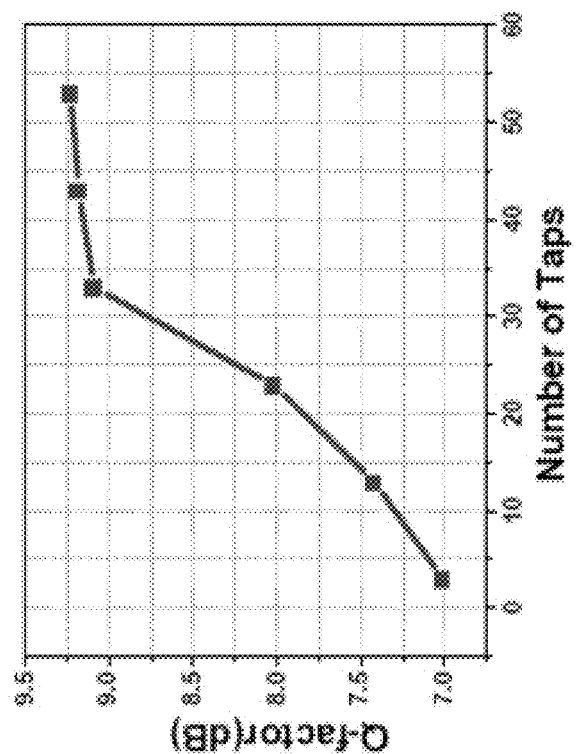
FIG. 59 shows the Q-factor performance versus number of taps.

The optimal number of taps is investigated in red link. In this investigation, two TSs are employed and the modulation format for red LED chip is 512-QAM. The number of taps is ranging from 3 to 53. The results are shown in FIG. 59. The system performance can be improved with the increasing tap number of the equalizer. Considering the system performance and computational complexity, the proper number of taps can be set at 33.

Figures 60A, 60B, 60C:
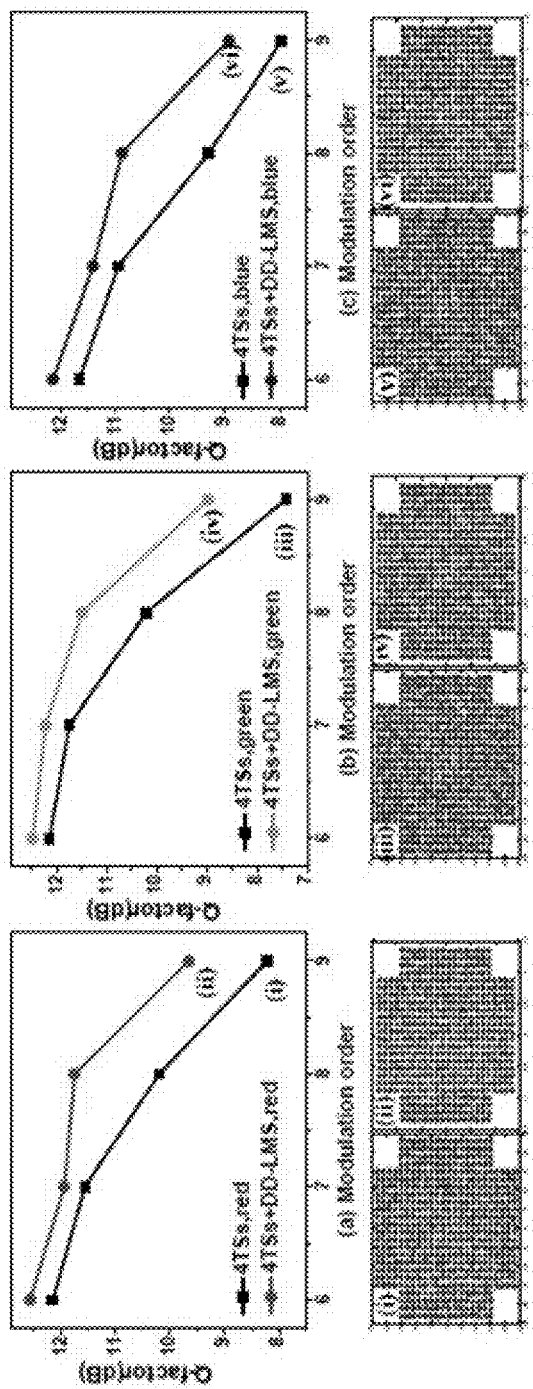
FIG. 60A shows the Q-factor performance w- and w/o DD-LMS of a red color LED.
FIG. 60B shows the Q-factor performance w- and w/o DD-LMS of a green color LED.
FIG. 60C shows the Q-factor performance w- and w/o DD-LMS of a blue color LED.

Then the Q-factor performance is measured versus different modulation orders ranging from 6 to 9 with and without DD-LMS adaptive equalizer. The results are illustrated in FIGS. 60A-60C. In the case of 512-QAM modulation and 4% TSs in FDE, the Q-factor performance of red, green and blue LED can be further enhanced by 1.4-dB, 1.6-dB, and 1.0-dB, respectively, assisted by DD-LMS. The constellations of 512-QAM before and after DD-LMS equalizer are also depicted in FIGS. 60A-60C. The aggregate data rate is 156.25×9×3=4.22-Gb/s at a distance of about 1-cm, including the CP and TSs. The Q-factor results after DD-LMS are all above the Q-limit of about 8.5-dB, which corresponds to a BER target of 3.8×10−3 (7% preforward error correction threshold).

Figures 61A, 61B, 61C:
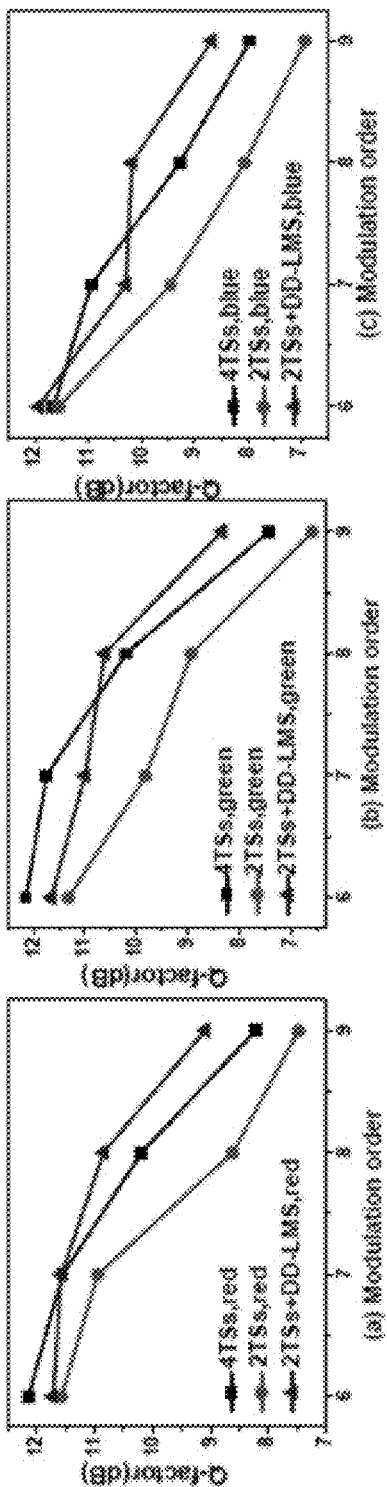
FIG. 61A shows the Q-factor performance with different TSs and w- or w/o DD-LMS of a red color LED.
FIG. 61B shows the Q-factor performance with different TSs and w- or w/o DD-LMS of a green color LED.
FIG. 61C shows the Q-factor performance with different TSs and w- or w/o DD-LMS of a blue color LED.

Next, the joint parameters and performance of FDE and DD-LMS are discussed. The Q-factor versus different numbers of TSs in FDE is depicted in FIGS. 61A-61C. It can be found that the Q-factor can be about 1 dB improved assisted by DD-LMS and with half TSs in the case of high-order modulation format. As mentioned in Section ii, FDE is used to make a coarse equalization to open the channel eye, a more reliable and precise decision can be made during the adaptive tap update process of DD-LMS. The EMSE can be reduced and the overall system performance improvement can be achieved.

Figure 62:
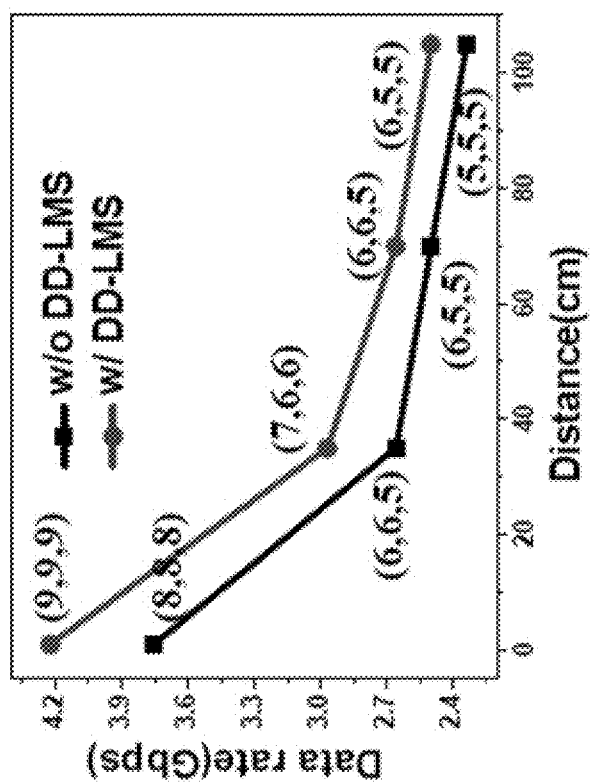
FIG. 62 shows the measured overall data rate as a function of transmission distance.

At last, the maximum data rates versus transmission distance are measured and depicted in FIG. 62. The symbol of (A, B, C) in FIG. 62 denotes the highest modulation level of red, green and blue transmission links. For example, (7,6,6) means that at a distance of 35-cm, the maximum modulation orders of red, green and blue links are 7 (128QAM), 6 (64QAM) and 6 (64QAM), respectively. The data rates with DD-LMS equalizer at the distance of 35-cm and 105-cm are 3-Gb/s and 2.5-Gb/s, respectively. And it can be found that after adopting DD-LMS, the maximum data rate can also be increased. In this demonstration, only a single RGB-LED is used. The illuminances are about 50-lx and 5-lx at the distance of 35-cm and 105-cm, respectively, which are far below the indoor illuminance standard of about 400-lx. Arrays of LEDs can be implemented to increase the illuminance, whilst maintaining the bandwidth of individual devices. By this way, a longer transmission distance can be realized.

iv. Conclusion

In conclusion, a hybrid time-frequency adaptive equalization algorithm in a RGB-LED-based Nyquist SC VLC system is experimentally demonstrated. The system performance can be improved by a combination of FDE and DD-LMS. An aggregate data rate of 4.22-Gb/s enabled by this hybrid equalization, as well with high-order modulation scheme and WDM is successfully investigated. This is the highest data rate ever achieved by using a single commercially available RGB-LED in VLC system. And the capacity of this system can be further improved by a larger bandwidth APD. The data rate is achieved in offline transmission system, and the next goal is to realize high-speed and low cost real time VLC transmission system.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method, implemented at a receiver in an optical network, of receiving a modulated optical signal that has undergone a digital Fourier transform spreading (DFTS), comprising:
generating digital samples of the modulated optical signal;
performing resampling and synchronization of the digital samples to generate time-corrected digital samples from an input signal;
compensating the time-corrected digital samples for nonlinearity (NL) to produce NL-compensated digital samples;
de-spreading the NL-compensated digital samples using an inverse digital Fourier transform to recover quadrature amplitude modulation (QAM) modulated signals;
applying post-equalization to the QAM signals to generate equalized QAM signals;
performing a decision directed least mean square (DD-LMS) equalization to generate blind-optimized QAM signals; and
demodulating the blind-optimized QAM signals to recover data bits.

2. The method of claim 1, wherein the compensating operation includes additively correcting the time-corrected digital samples.

3. The method of claim 1, wherein the compensating operation is performed in frequency domain.

4. The method of claim 1, wherein the applying post-equalization is performed in time domain.

5. The method of claim 1, wherein the performing the DD-LMS equalization includes optimizing filter coefficients of a finite impulse response (FIR) equalization filter.

6. The method of claim 1, wherein the received modulated optical signal includes polarization division multiplexed signals, and wherein the method further includes performing polarization division de-multiplexing of the received modulated optical signal.

7. An optical receiver apparatus for receiving a modulated optical signal that has undergone a digital Fourier transform spreading (DFTS), comprising:
a photodiode capable of receiving the modulated optical signal and producing an electrical signal;
an analog to digital conversion circuit that is capable of generating digital samples of the modulated optical signal;
a memory that is capable of storing instructions; and
a digital signal processor that is capable of reading the instructions from the memory and processing the digital samples to generate estimates of transmitted bits, wherein the instructions include:
instructions for performing resampling and synchronization of the digital samples to generate time-corrected digital samples from an input signal;
instructions for compensating the time-corrected digital samples for nonlinearity (NL) to produce NL-compensated digital samples;
instructions for de-spreading the NL-compensated digital samples using an inverse digital Fourier transform to recover quadrature amplitude modulation (QAM) modulated signals;
instructions for applying post-equalization to the QAM signals to generate equalized QAM signals;
instructions for performing a decision directed least mean square (DD-LMS) equalization to generate blind-optimized QAM signals; and
instructions for demodulating the blind-optimized QAM signals to recover transmitted data bits.

8. The optical receiver apparatus of claim 7, wherein the instructions to compensate includes instructions to additively correct the time-corrected digital samples.

9. The optical receiver apparatus of claim 7, wherein the instructions to apply post-equalization includes instructions to perform post-equalization in time domain.

10. The optical receiver apparatus of claim 7, wherein the instructions to apply post-equalization includes instructions to perform zero-forcing equalization.

11. The optical receiver apparatus of claim 7, wherein the instructions to apply post-equalization includes instructions to perform minimum mean square error estimation.

12. The optical receiver apparatus of claim 7, wherein the instructions for performing the DD-LMS equalization include instructions for optimizing filter coefficients of a finite impulse response (FIR) equalization filter.

13. The optical receiver apparatus of claim 7, wherein the received modulated optical signal includes polarization division multiplexed signals, and wherein the instructions further include instructions for performing polarization division de-multiplexing of the received modulated optical signal.

14. The optical receiver apparatus of claim 13, wherein the instructions for performing polarized division de-multiplexing include instructions for implementing one or more channel filters for each polarization.

15. The optical receiver apparatus of claim 13, wherein the instructions for performing polarized division de-multiplexing further include instructions for implementing cross-polarization filters to cancel out cross-polarization degradation.

16. The optical receiver apparatus of claim 7, wherein the photodiode comprises a PIN photodiode.

17. The optical receiver apparatus of claim 7, wherein the photodiode comprises an avalanche photodiode (APD).

18. The optical receiver apparatus of claim 7, further comprising an amplifier capable of amplifying the electrical signal.

19. The optical receiver apparatus of claim 7, wherein the digital signal processor is capable of using a digital phase lock loop to resample and synchronizing the digital samples to generate time-corrected digital samples from the input signal.

20. An optical communication system, comprising:
a transmitter and a receiver communicatively coupled to each other through an optical communication channel, wherein the transmitter generates and transmits an optical signal comprising information bits modulated on multiple subcarriers and spread using a digital Fourier transform spreading (DFTS) transform, and wherein the receiver comprises:
a photodiode capable of receiving the modulated optical signal and producing an electrical signal;
an analog to digital conversion circuit that is capable of generating digital samples of the modulated optical signal;

a memory that is capable of storing instructions; and
a digital signal processor that is capable of reading the instructions from the memory and processing the digital samples to generate estimates of transmitted bits, wherein the instructions include:
instructions for performing resampling and synchronization of the digital samples to generate time-corrected digital samples from an input signal;
instructions for compensating the time-corrected digital samples for nonlinearity (NL) to produce NL-compensated digital samples;
instructions for de-spreading the NL-compensated digital samples using an inverse digital Fourier transform to recover quadrature amplitude modulation (QAM) modulated signals;
instructions for applying post-equalization to the QAM signals to generate equalized QAM signals;
instructions for performing a decision directed least mean square (DD-LMS) equalization to generate blind-optimized QAM signals; and
instructions for demodulating the blind-optimized QAM signals to recover transmitted data bits.

21. The optical system of claim 20, wherein the multiple subcarriers include quadrature amplitude modulation (QAM).

22. The optical system of claim 20, wherein the multiple subcarriers include quadrature phase shift keying (QPSK).

23. The optical communication system of claim 20, wherein the instructions to compensate include instructions to additively correct the time-corrected digital samples.

24. The optical communication system of claim 20, wherein the instructions to apply post-equalization include instructions to perform post-equalization in time domain.

25. The optical communication system of claim 20, wherein the instructions to apply post-equalization include instructions to perform zero-forcing equalization.

26. The optical communication system of claim 20, wherein the instructions to apply post-equalization include instructions to perform minimum mean square error estimation.

27. The optical communication system of claim 20, wherein the instructions for performing the DD-LMS equalization include instructions for optimizing filter coefficients of a finite impulse response (FIR) equalization filter.

28. The optical communication system of claim 20, wherein the received modulated optical signal includes polarization division multiplexed signals, and wherein the instructions further include instructions for performing polarization division de-multiplexing of the received modulated optical signal.

29. The optical communication system of claim 28, wherein the instructions for performing polarized division de-multiplexing further include instructions for implementing one or more filters for each polarization.

30. The optical communication system of claim 28, wherein the instructions for performing polarized division de-multiplexing further include instructions for implementing cross-polarization filters to cancel out cross-polarization degradation.

31. The optical communication system of claim 20, wherein the photodiode comprises a PIN photodiode.

32. The optical communication system of claim 20, wherein the photodiode comprises an avalanche photodiode (APD).

33. The optical communication system of claim 20, further comprising an amplifier capable of amplifying the electrical signal.

34. The optical communication system of claim 20, wherein the digital signal processor is capable of using a digital phase lock loop to resample and synchronizing the digital samples to generate time-corrected digital samples from the input signal.

* * * * *